(12) United States Patent
Peterson

(10) Patent No.: US 6,788,648 B1
(45) Date of Patent: Sep. 7, 2004

(54) METHOD AND APPARATUS FOR LOAD BALANCING A DISTRIBUTED PROCESSING SYSTEM

(75) Inventor: Diane L. Peterson, Addison, TX (US)

(73) Assignee: Atitania Ltd., Dallas, TX (US)

( * ) Notice: Subject to any disclaimer, the term of this patent is extended or adjusted under 35 U.S.C. 154(b) by 283 days.

(21) Appl. No.: 09/915,910

(22) Filed: Jul. 25, 2001

Related U.S. Application Data

(63) Continuation-in-part of application No. 09/887,494, filed on Jun. 22, 2001, which is a continuation-in-part of application No. 09/879,571, filed on Jun. 12, 2001, which is a continuation-in-part of application No. 09/841,135, filed on Apr. 24, 2001.

(51) Int. Cl.[7] .................................................. H04J 1/16
(52) U.S. Cl. ........................ 370/252; 370/386; 709/105
(58) Field of Search ................................. 709/232, 201, 709/105, 223, 226; 714/47, 48; 707/203; 455/445; 370/252, 238, 216, 389, 437, 386

(56) References Cited

U.S. PATENT DOCUMENTS

| | | | |
|---|---|---|---|
| 5,634,125 A | * 5/1997 | Li | ............................... 707/203 |
| 6,101,189 A | 8/2000 | Tsuruoka | |
| 6,282,562 B1 | * 8/2001 | Sidi et al. | .................... 709/105 |
| 6,370,381 B1 | 4/2002 | Minnick et al. | ............ 455/445 |
| 6,581,104 B1 | * 6/2003 | Bereiter | ...................... 709/232 |

* cited by examiner

*Primary Examiner*—John Pezzlo
(74) *Attorney, Agent, or Firm*—Howison & Arnott, L.L.P.

(57) ABSTRACT

Method and apparatus for load balancing a distributed processing system. A method for load balancing a distributed processing system having a plurality of processing nodes associated therewith is provided. A portion of a process is first received at one of the processing nodes for processing of that portion thereat. The amount of processing at that node is then determined that will be required to complete the received portion of the process as a processing load on that one processing node. A determination is then made if the amount of processing exceeds a predetermined threshold. If the amount of processing exceeds the predetermined threshold, then information is transferred to other nodes in the network that the one of the processing nodes is unavailable for further processing.

15 Claims, 35 Drawing Sheets

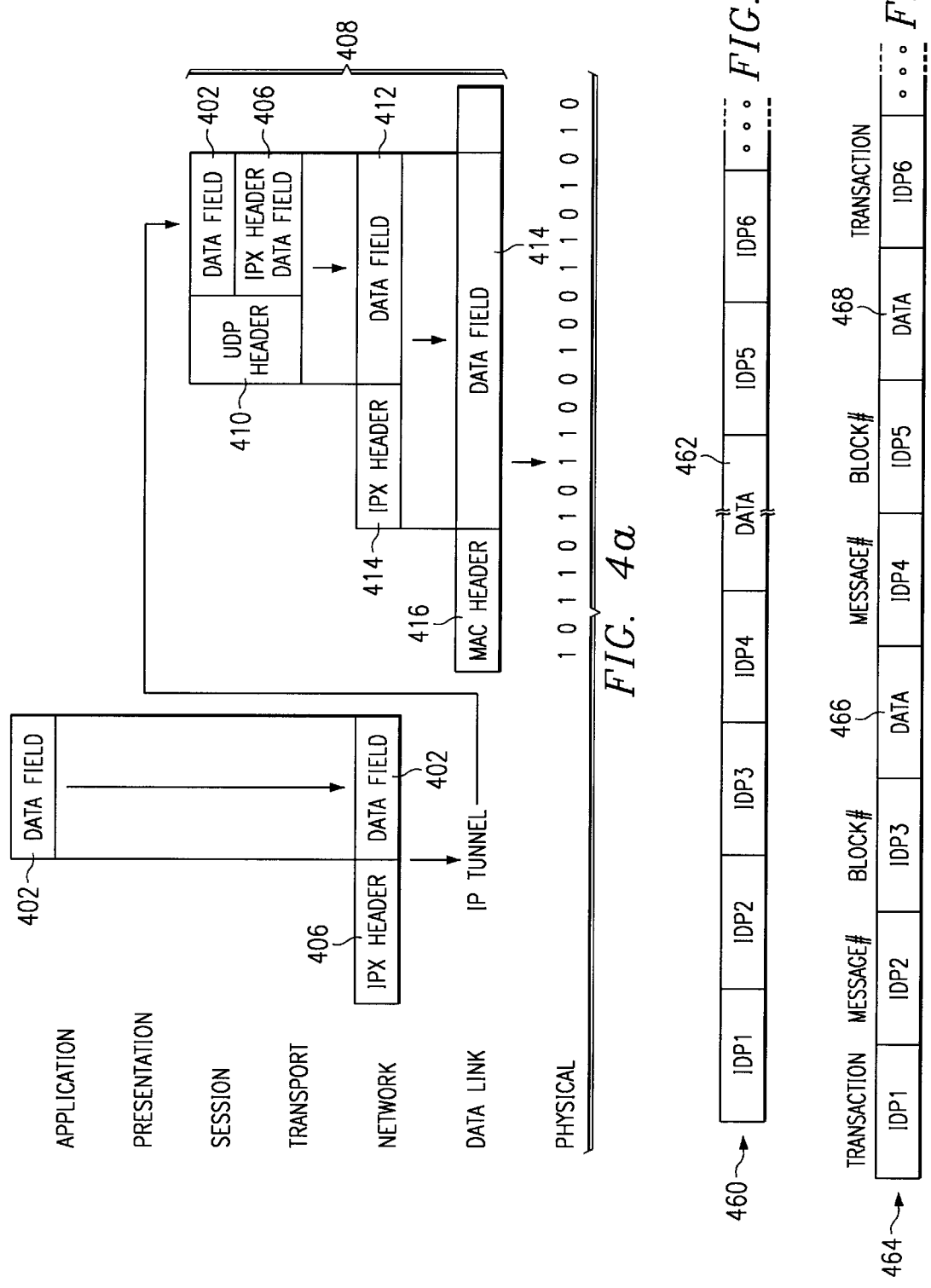

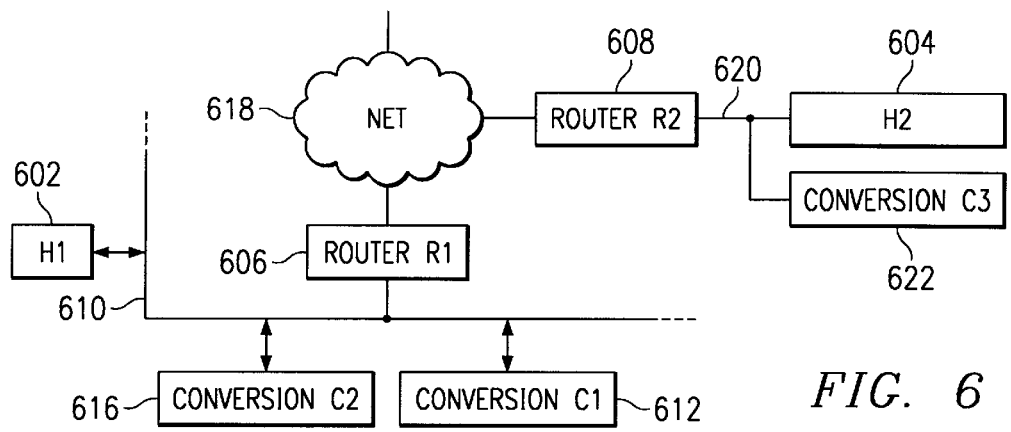
FIG. 6
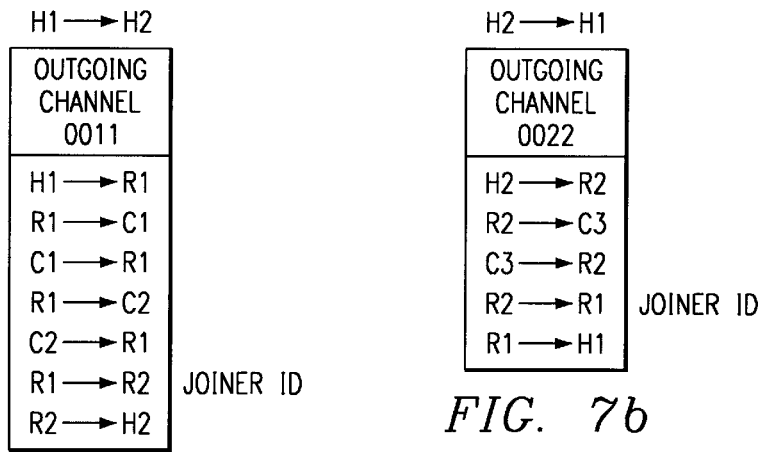
FIG. 7a
FIG. 7b
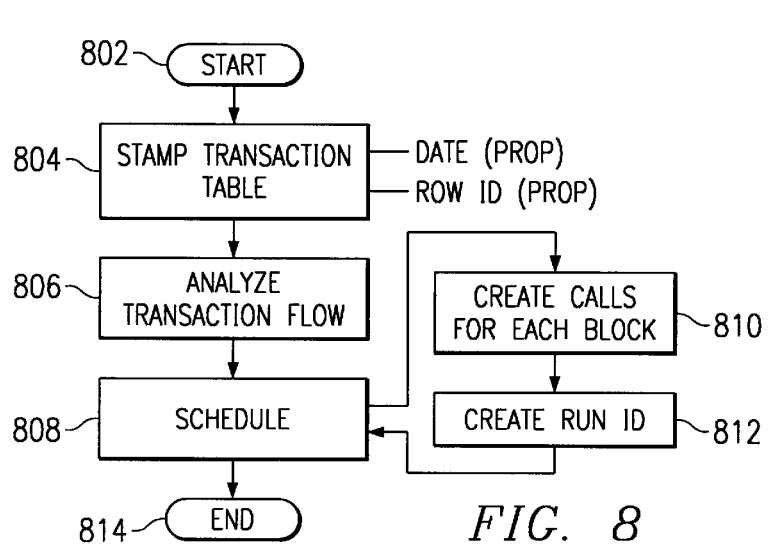
FIG. 8

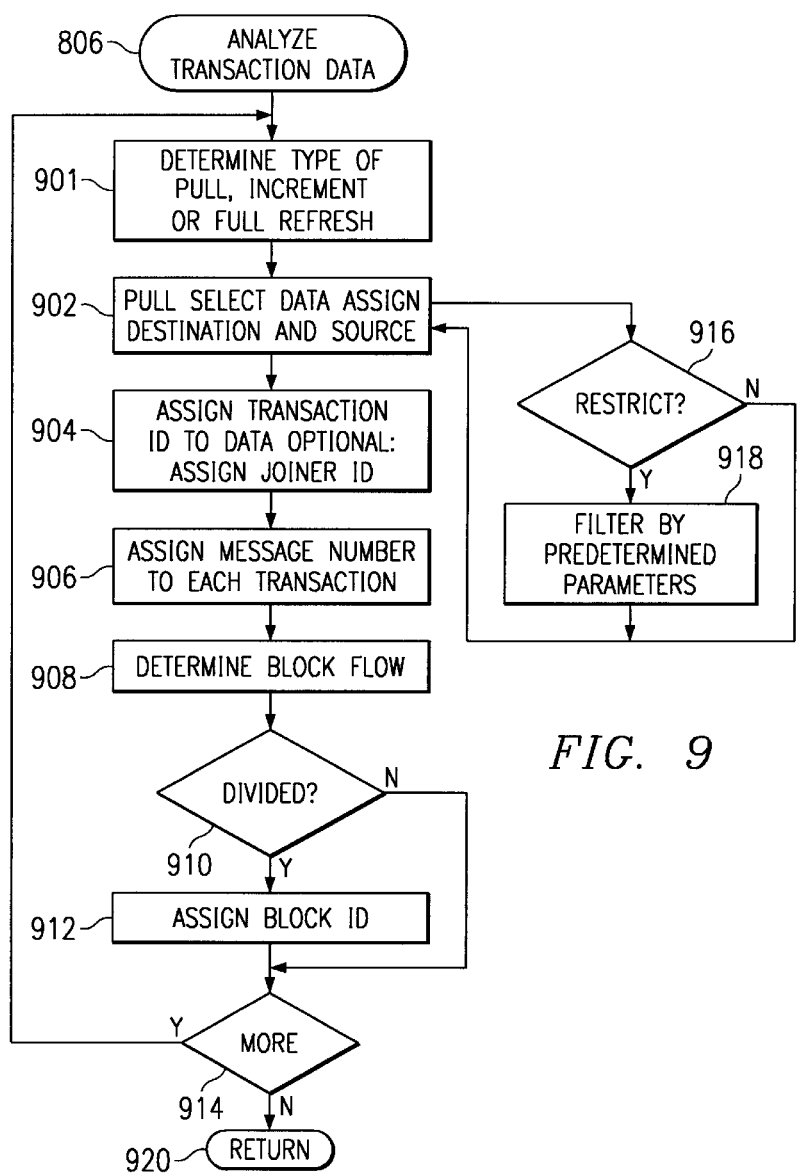

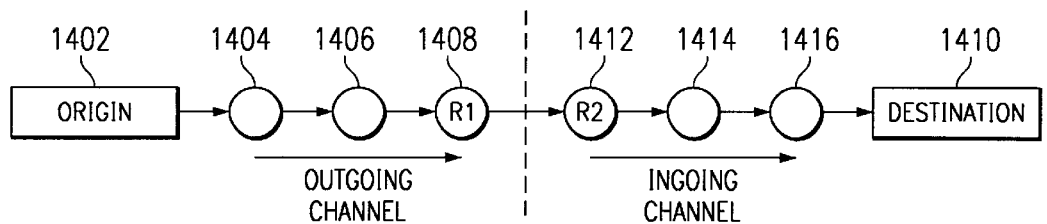
FIG. 14
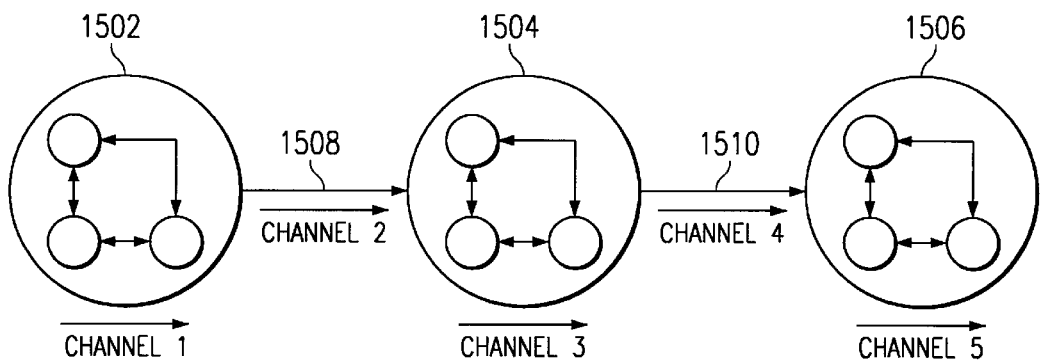
FIG. 14a
FIG. 15
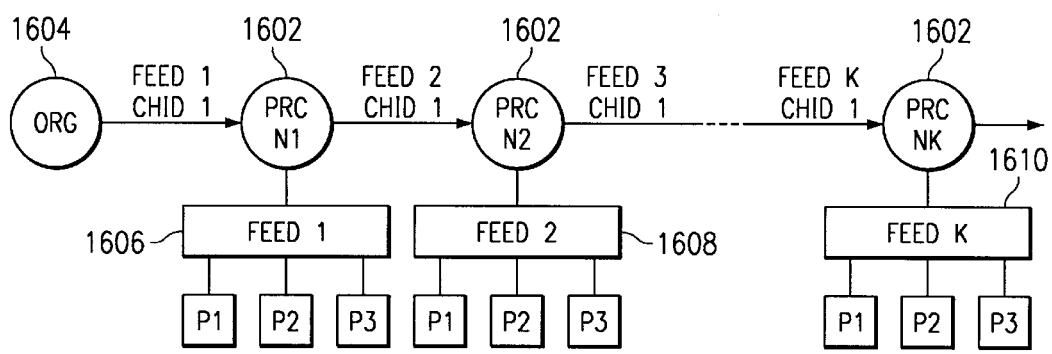
FIG. 16

TABLE 1

| CORE (WHO) | DEVICE (WHERE) | ITEM (WHAT) |
|---|---|---|
| CORPORATION OR ENTITY | ASSIGNEE OF THE PACKET, e.g., COMPUTER, PHONE, ETC | OBJECT, e.g., ARTICLE, NET ADDRESS, REAL ESTATE PROPERTY, ETC |

2408 — PREAMBLE

| F1 F2 F3 F4 F5 · · · |

TABLE 2

| F1 | F2 | F3 | F4 | F5 | TS/SEQ | CONTENT |
|---|---|---|---|---|---|---|
| A | B | Z | C | W | XXXX | —— |
| C | T | Q | I | C | XXXX | —— |
| F | L | A | K | L | XXXX | —— |
| G | M | B | R | S | XXXX | —— |

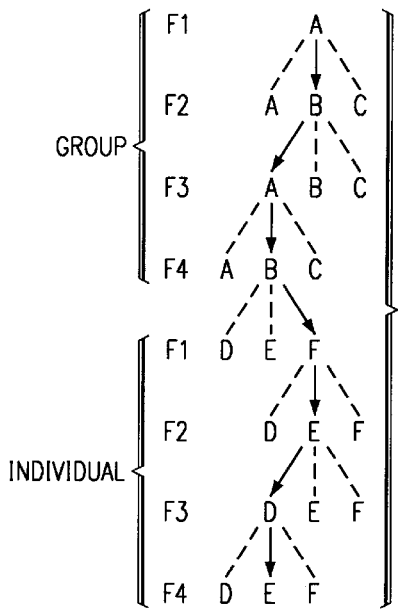
FIG. 27
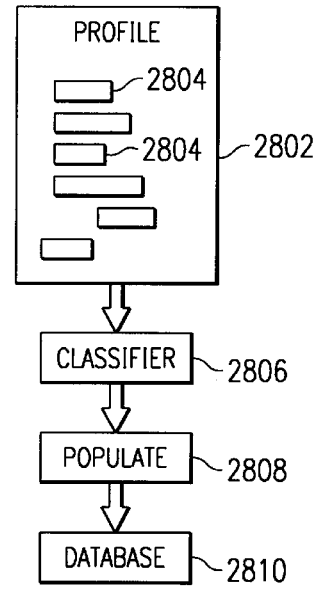
FIG. 28
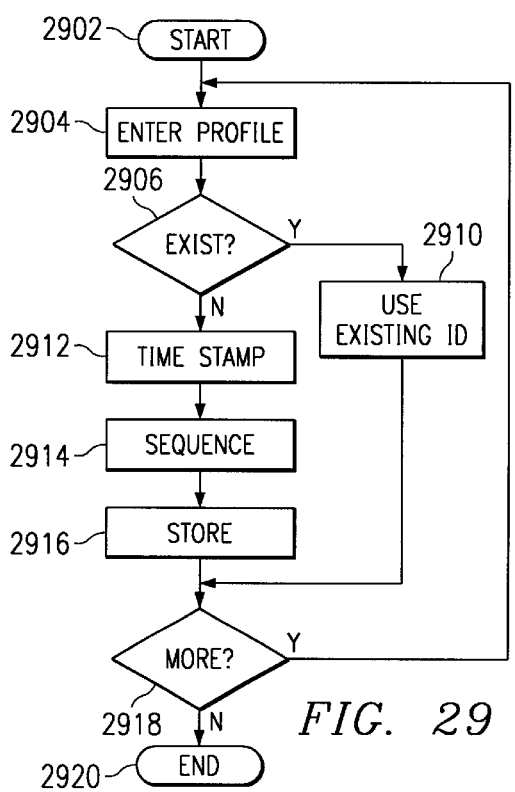
FIG. 29
PP (CATHETER) Cl → PPCBIITS/S
PP (CATHETER) Cl ↗
PP (CATTHETER) Cl → PPCLIITS/S
PP (CALHETER) VI → PPCPIITS/S
FIG. 30

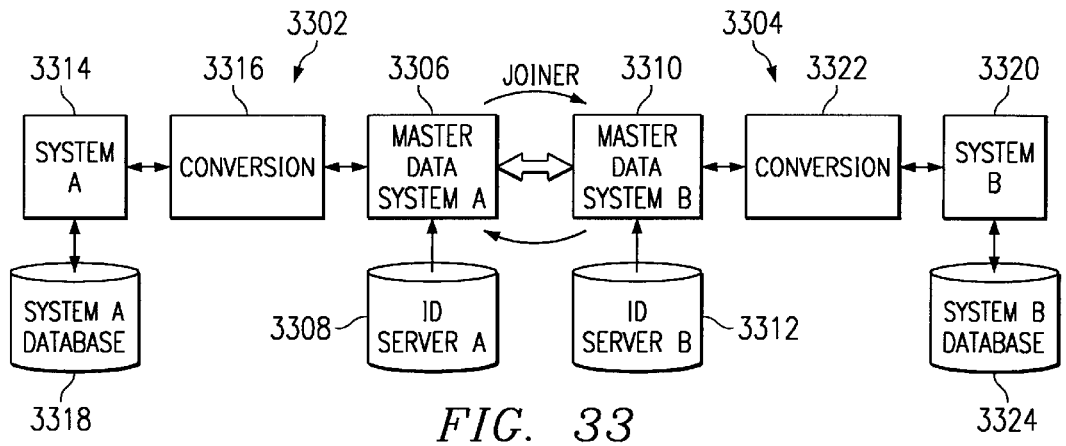
FIG. 33
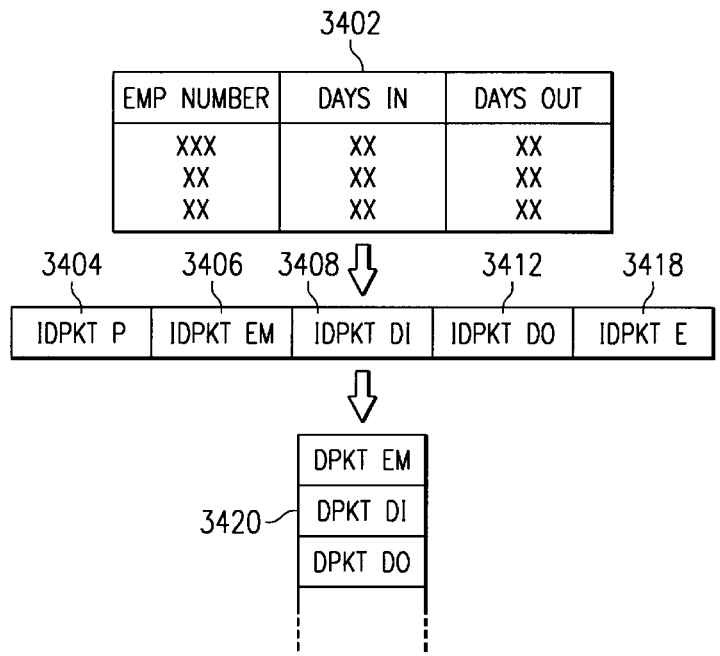
FIG. 34
FIG. 34a

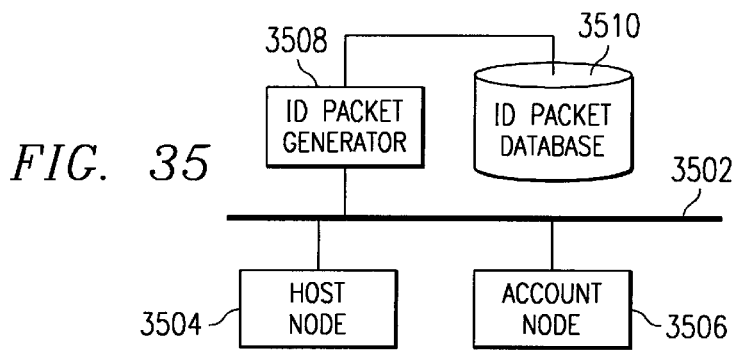
FIG. 35
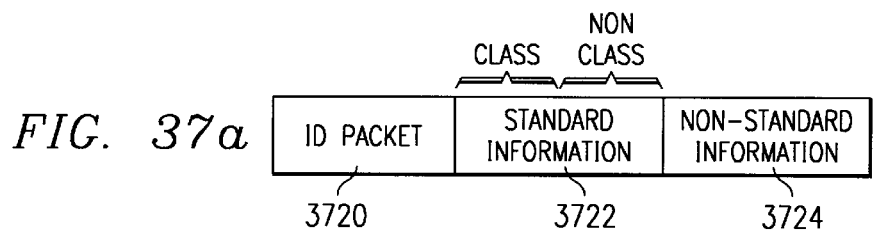
FIG. 37a
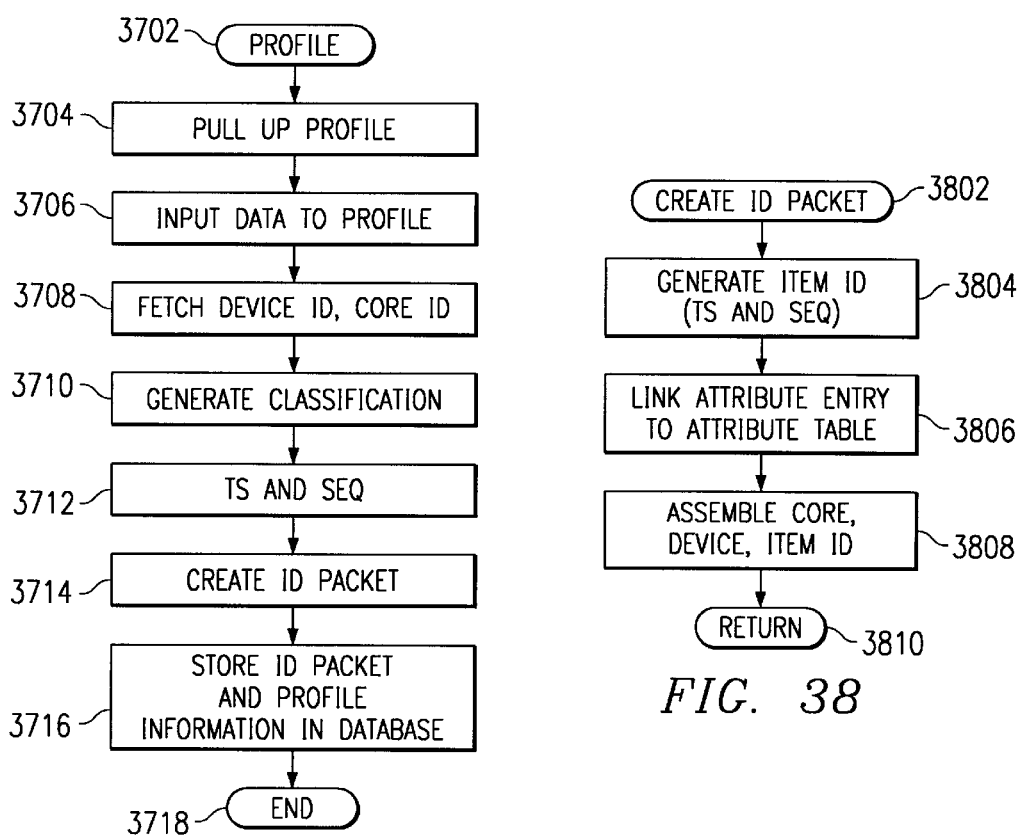
FIG. 37
FIG. 38

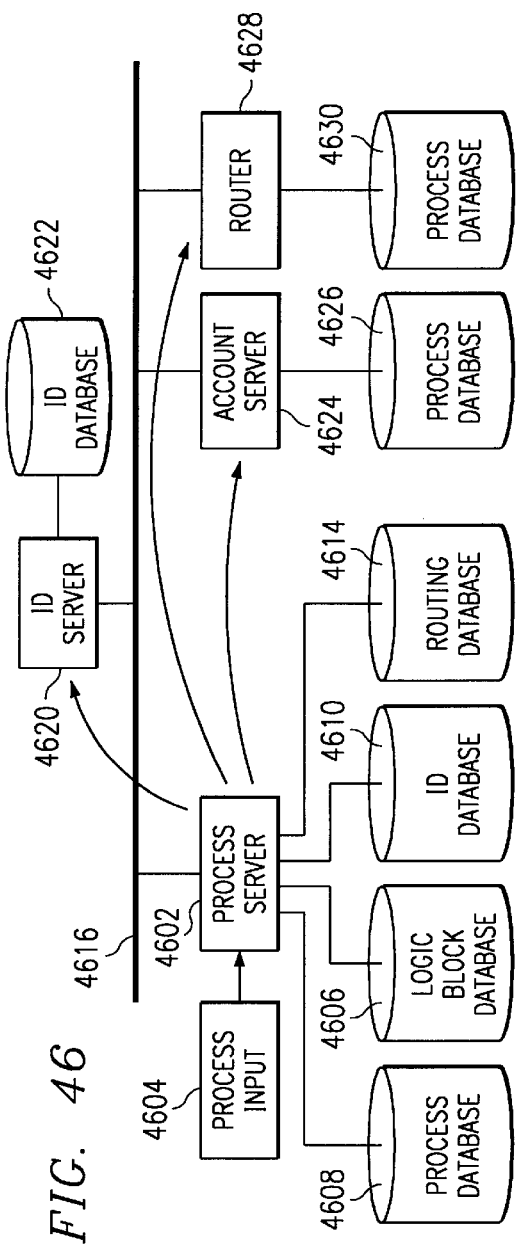
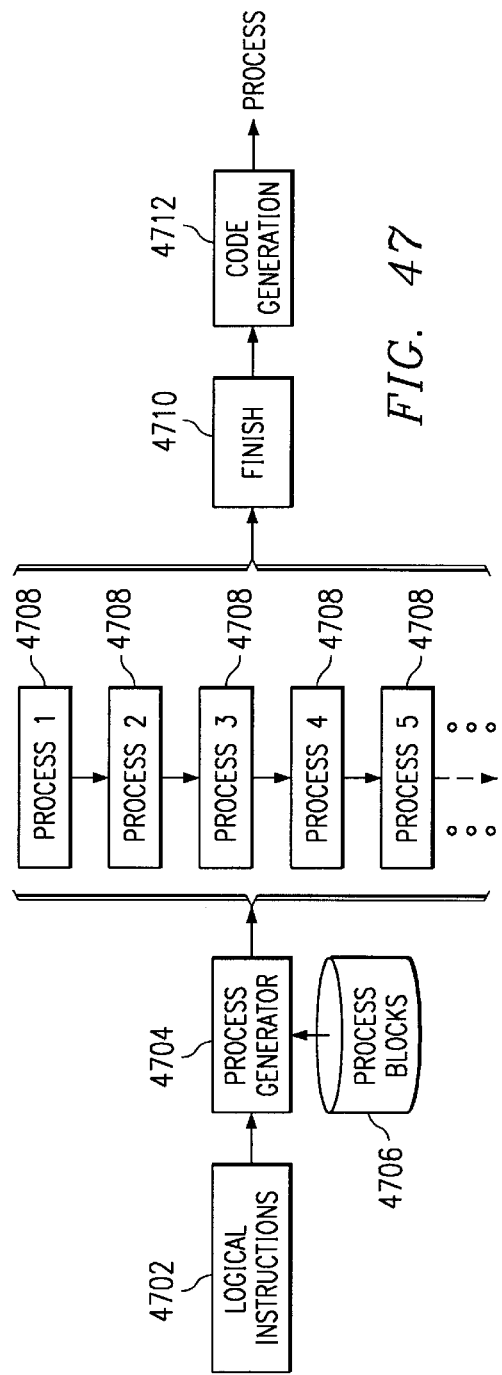
FIG. 46
FIG. 47

| VENDOR | SYSTEM A | | SYSTEM B | |
|---|---|---|---|---|
| | VID | IDPKT | VID | IDPKT |
| ABC | 123 | XXX | 567 | YYY |
| | | | | |

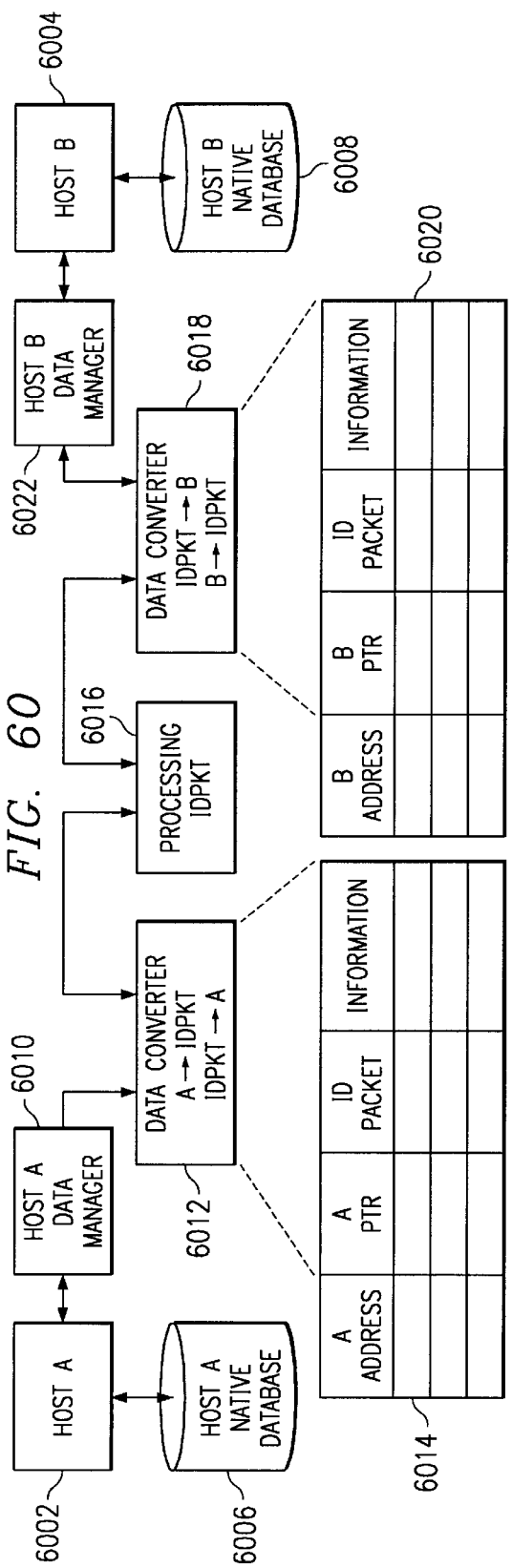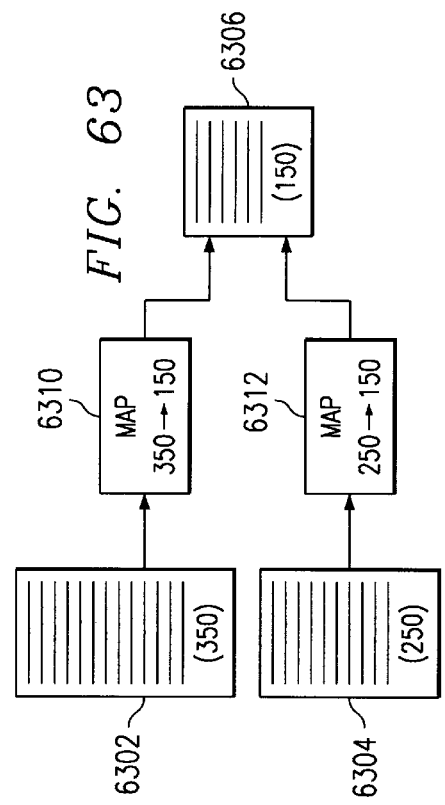

METHOD AND APPARATUS FOR LOAD BALANCING A DISTRIBUTED PROCESSING SYSTEM

CROSS REFERENCE TO RELATED APPLICATIONS

This application is a Continuation-in-Part of U.S. patent application Ser. No. 09/887,494, filed Jun. 22, 2001, entitled "Method And Apparatus For Converting Data Between Two Dissimilar Systems", which is a Continuation-in-Part of U.S. patent application Ser. No. 09/879,571, filed Jun. 12, 2001, entitled "Method and Apparatus for Generating Unique Id Packets in a Distributed Processing System", which is a Continuation-in-Part of U.S. patent application Ser. No. 09/841,135, filed Apr. 24, 2001, entitled "System and Method for Transmission of Information Between Locations on a Computer Network with the Use of Unique Packets,".

TECHNICAL FIELD OF THE INVENTION

This invention is related to data processing Systems and their architecture. In one aspect, it relates to a network component for retransmitting data packets in accordance with ID codes embedded therein in a distributed manner.

BACKGROUND OF THE INVENTION

The classification and management of data is one of the most difficult tasks faced by corporations, government entities, and other large users of information. Companies must classify their data in such a way to make it easy and simple for buyers to find and purchase their products. Data exchanges face a bigger challenge in that they must work with multiple companies and develop a comprehensive classification system for their buyers.

One common way to create a search/classification system for specific products is to access and use government and/or industry specific classification systems (i.e., classification databases). However, no existing classification database is comprehensive enough to address all the issues associated with building a classification system. These issues include: uniform numbers for products that cross multiple industries, restricting products from inclusion in classification, and non-usage of slang or industry standard language to access or classify products. The classification databases frequently do not address all the products, thus resulting in inconsistencies even when companies use the same classification system.

Additionally, many of the various classification systems conflict with each other. For example, a product might have several classification numbers if it crosses multiple industries. Still other companies might use third party classification systems approved by a governmental entity. This program requires companies to pay multiple fees and go through a lengthy administrative process. Even then it may not cover all products in an industry. Companies must make a conscious decision to initiate, implement and maintain these programs. These efforts can be costly, and for this reason, compliance is generally not high.

A need therefore, exists, for a data processing system which automatically generates identification codes for specific products. Preferably, companies could use the automatically-generated identification codes in place of their existing identification codes. More preferably, the use of the automatically-generated identification codes can be phased-in gradually as the of user base expands.

Under current practices, companies create search engines by developing hierarchies and families of products. They may create a thesaurus to encompass slang words. Companies often use drop down menus, key words and product description capabilities to enhance their systems. It is desired to classify the data in such a way as to minimize the responses generated by a search, and therefore more effectively guide the buyer through the system. However, under current practices, most exchanges offer barely adequate search capabilities for their buyers. Buyers must click through numerous drop down menus and then sort through multiple entries to accomplish their objectives. In many instances the buyer will fail to find the product that they seek. These existing processes could therefore be characterized as cumbersome, time consuming, frustrating and ineffective. A need therefore exists, for a product classification system which can facilitate simple, rapid and effective searching by prospective buyers.

Another challenging data management task is the transmission of data between dissimilar systems. Even within the same corporate organization it is very common to find different system types, applications and/or information structures being used. Transmitting data between such systems can be a time-consuming and expensive task. Under current practices, data transfer between dissimilar systems is often facilitated by the use of customized software applications known as "adapters". Some adapters "pull" data, i.e., extract it from the source system in the data format of the host system or host application, convert the data into another data format (e.g., EDI) and then sometimes convert it again into yet another data format (e.g., XML) for transmission to the destination system. Other adapters "push" data, i.e., convert the data from the transmission data format (e.g., XML) to an intermediate data format (e.g., EDI) if necessary, then convert it to the data format of the host system or application at the destination system, and finally loading the data into the destination system. All of these adapter steps are performed on the host systems using the host systems' CPU. Thus, in adapter-based systems, CPU load considerations may affect when and how often data pulls can be scheduled. For example, data pulls may be scheduled for late nights so as slow down the CPU during daytime ONTP (on line transaction processing). A need therefore exists for a system architecture which can allow the transmission of data between dissimilar systems while minimizing the associated load imposed on the host system CPU.

Network routers are known which direct data packages on a network in accordance with ID codes embedded in the data packets. However, these routers typically direct data packets between similar nodes on a single network. It is now becoming increasingly common to transmit data across multiple networks, and even across different types of networks. A need therefore exists for a router which can direct data over networks of different types in accordance with associated ID codes. A need further exists for a router which can automatically transform a data packet having a first data format into a second data format.

It is well known that when large amounts of data are being transmitted between systems, a system error (i.e., stoppage) and/or data loss (i.e., dropout) may occur. With conventional adapter-based system architectures, debugging a system stoppage can be very challenging because of the large number of conversion processes involved, and because most systems do not have an integrated way to indicate the point at which processing stopped, relying instead upon error logs. A need therefore exists for a system architecture in which processing status information is an integral part of the data packets transmitted over the networks.

Further, with adapter-based systems, even after the processes have been debugged, it is often necessary to wait (e.g., until the time of day when host system CPU demand is low) to replace lost data in order to avoid adverse impact on the company's business. For example, if the host system is used for OLTP (on line transaction processing) during the day, pulling bulk data from the host system in order to replace data lost in a previous data transfer may be delayed until the late night hours. Of course, the delay in processing the data can have an adverse impact of its own. A need therefore exists for a system architecture which allows for the replacement of lost data while minimizing the impact on the source host system.

SUMMARY OF THE INVENTION

The present invention disclosed and claimed herein, in one aspect thereof, comprises a method for method for load balancing a distributed processing system having a plurality of processing nodes associated therewith. A portion of a process is first received at one of the processing nodes for processing of that portion thereat. The amount of processing at that node is then determined that will be required to complete the received portion of the process as a processing load on that one processing node. A determination is then made if the amount of processing exceeds a predetermined threshold. If the amount of processing exceeds the predetermined threshold, then information is transferred to other nodes in the network that the one of the processing nodes is unavailable for further processing.

BRIEF DESCRIPTION OF THE DRAWINGS

For a more complete understanding of the present invention and the advantages thereof, reference is now made to the following description taken in conjunction with the accompanying Drawings in which:

FIGS. 4A–4D disclose diagrammatic views of the proprietary portion of a transaction packet;

FIG. 6 illustrates a diagrammatic view of one instantiation of the system of the present disclosure illustrating a transaction from a first host to a second host or client on the system;

FIGS. 7A and 7B illustrate two separate channels on the system;

FIG. 8 illustrates a flow chart depicting the initial operation of generating the blocks of data for a transaction and scheduling those blocks for transmission;

FIG. 9 illustrates a flow chart depicting the data flow analysis operation;

FIG. 10 illustrates a diagrammatic view of a transaction table that is formed during the transaction for analysis process;

FIG. 14 illustrates a diagrammatic view of two adjacent channels that are utilized in completing a transaction or a process between an origin and a destination.

FIG. 14A illustrates the joiner IDs for the two channels;

FIG. 15 illustrates a schematic diagram of three separate process systems joined by separate channels;

FIG. 16 illustrates a diagrammatic view of the manner in which feeds are propagated along a process chain;

FIGS. 26 and 27 illustrate the hierarchal structure of the classification system associated with the data packet;

FIG. 28 illustrates a diagrammatic flow of a classification operation;

FIG. 29 illustrates a flow chart for creating a data packet;

FIG. 30 illustrates a diagrammatic view for associating an input profile with a previous data packet and creating a new data packet;

FIGS. 32 and 33 illustrate block diagrams for two embodiments of a communication system for conversing between two nodes with data packets;

FIGS. 34 and 34a illustrate an example of communication with a data packet;

FIG. 35 illustrates an overall diagrammatic view of the ID packet generator;

FIGS. 37 and 37a illustrate a flow chart and data packet, respectfully, for the profile operation;

FIG. 38 illustrates a flow chart for the ID packet creation;

FIG. 46 illustrates a diagrammatic view of an internal propagation of an Extent;

FIG. 47 illustrates a diagrammatic view of the creation of an Extent;

FIG. 60 illustrates a block diagram of the Conversion Server;

FIG. 63 illustrates a diagrammatic view for a consolidation operation with a Conversion Server;

FIG. 76 illustrates a diagrammatic view of two separate local networks interfaced together;

DETAILED DESCRIPTION OF THE INVENTION

Figure 1:
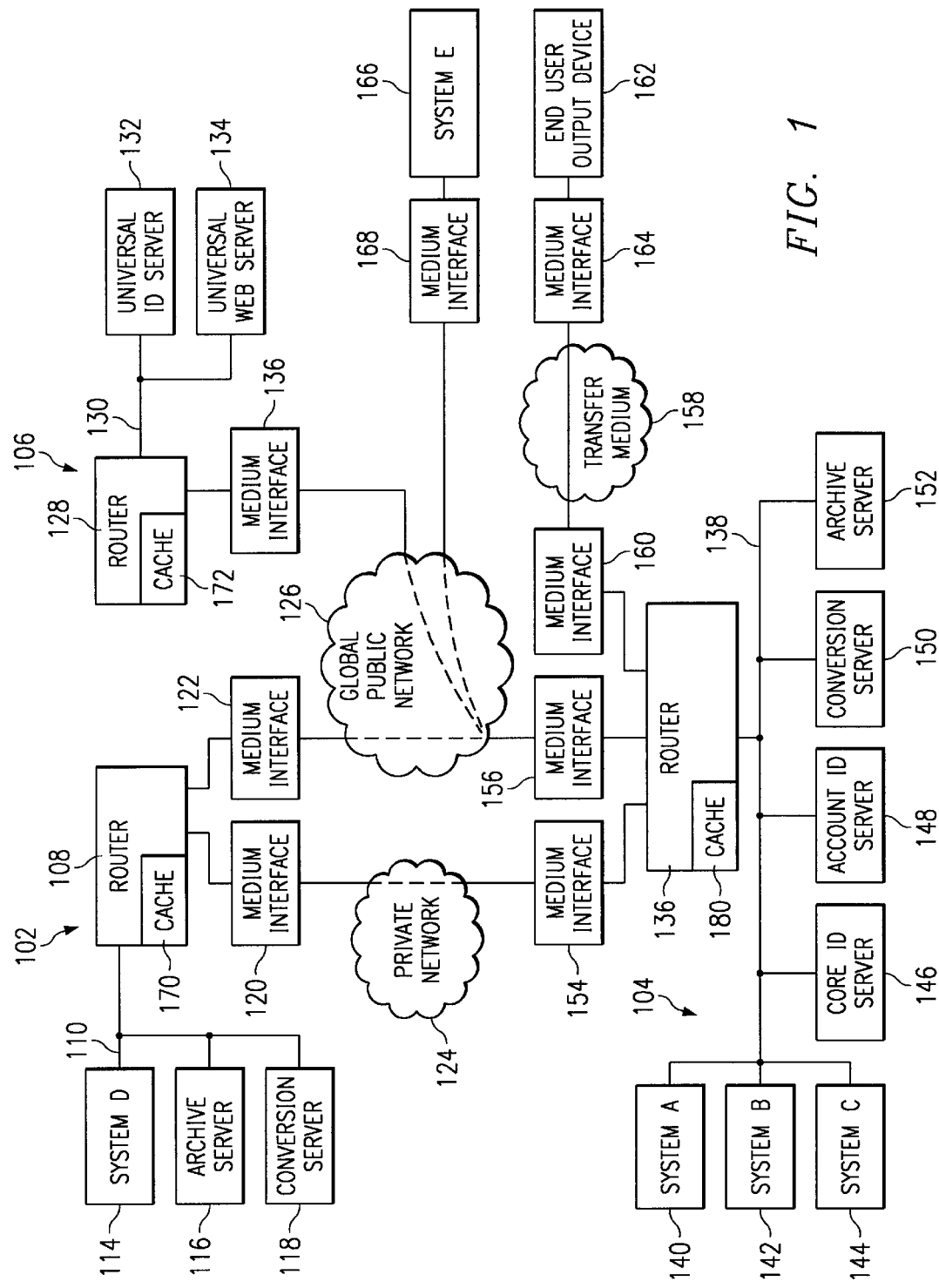
FIG. 1 illustrates an overall diagrammatic view of the system of the present disclosure.

Referring now to FIG. 1, there is illustrated a system diagram for the presently disclosed system. There are illustrated three transactional systems, 102, 104 and 106. Transaction system 102 is comprised of a router 108 that is interfaced with a network mesh 110, which network mesh 110 is local to the system 102. The network mesh 110 allows the router 108 to interface with various system nodes. There is provided a host system node 114 that is the node at which a transaction arises. Also attached to the network mesh 110 is an archival server 116 and a conversion server 118, the function of which will be described hereinbelow. Since the host system 114, the servers 116 and 118, and the router 108 are all in the same network mesh 110, they communicate in a common protocol to that of the network mesh 110, and also may have the ability to communicate over the network mesh 110 with other network protocols that presently exist and any future protocols that would be developed at a later time. This allows data packets to be transferred between the various nodes on the network mesh 110.

The router 108 is also provided with various media interfaces 120 and 122. Media interface 120 allows the router 108 to interface with a private network 124 which could be any type of private network such as a local area network (LAN) or a wide area network (WAN). This private network 124 can have other systems attached thereto such that the router 108 can forward data through this network 124. The media interface 122 is interfaced with a global public network (GPN) 126, which is typically referred to as the "Internet." This allows the router 108 to interface with the GPN 126 and the multitude of resources associated therewith, as are well known in the art.

The system 106 is similar to the system 102 in that it has associated therewith a central router 128. The router 128 is interfaced with a network mesh 130, which network mesh 130 is also interfaced with a universal ID server 132 and a universal web server 134. The router 128 is also interfaced with the GPN 126 with a media interface 136. As such, the router 108 could effectively interface with the router 128 and the network resources in the form of the universal ID server 132 and the universal web server 134, the operation of which will be described hereinbelow.

The third system, the system 104, is comprised also of a central router 136, similar to the routers 108 and 128. The router 136 is interfaced on the local side thereof to a local network mesh 138. Local network mesh 138 has associated therewith three host or transaction nodes, a transaction node 140 associated with a system A, a transaction node 142 associated with a system B and a transaction node 144 associated with a system C, the transaction nodes 140–144 all interfacing with the network mesh 138. In addition, the system 104 has associated with its local network mesh 138 a core ID server 146, an account ID server 148, a conversion server 150 and an archival server 152.

Router 136 is operable to interface with the private network 124 via a media interface 154, interfaced with the GPN 126 via a media interface 156 and also to a transmission medium 158 through a media interface 160. The transmission medium 158 is an application specific medium that allows information to be transmitted to an end user output device 162 through a media interface device 164 or to be received therefrom. As will be described hereinbelow, this end user output device might be a fax machine, and the transmission medium 158 a telephone system or the such that allows data in the form of facsimile information to be transmitted from the router 136 through the transmission medium 158 to the end user output device 162 for handling thereof. The transmission medium 158 may be merely a public telephone network (PTN) that allows the number of the end user output device 162 to be dialed, i.e., addressed, over the network or transmission medium 158, the call answered, a hand shake negotiated, and then the information transferred thereto in accordance with the transaction that originated in the access to the transmission medium 158. The transmission medium could include a satellite transmission system, a paging transmission system, or any type of other medium that interfaces between one of the routers and a destination/source device. This will be described in more detail hereinbelow.

In addition to allowing the router 136 to directly interface with an end user device 162 via the interface 160, there is also provided a fifth transaction node 166 that is disposed on the GPN 126 and has access thereto via a media interface 168. The transaction node 166 is operable to interface with any of the routers 108, 128 or 136.

In operation, as will be described in more detail hereinbelow, each of the transaction nodes 114, 140, 142, 144, is able, through the use of the disclosed system, to complete a transaction on the system and utilize the system to send information to or retrieve information from another transaction node on the system. In the private network 124, there is illustrated a phantom line connection between the router 108 and the router 136. In order to facilitate a connection between, for example, transaction node 140 for system A and, for example, transaction node 114 for system D, it is necessary to create a unique data packet of ID's that can be transmitted via the router 136 through the network 124 and to, transaction node 114 for system D. This unique proprietary transaction packet that is transmitted utilizes various distributed resources in order to allow this transaction packet to be processed within the system and transmitted over a defined route that is defined in an initial transaction profile that is stored in the system at various places in a distributed manner. This will be described in more detail hereinbelow. Additionally, the router 136 could also allow one of the transaction nodes 140–144 to interface with the router 108 through the GPN 126 such that a transaction can be completed with the transaction node 114 for system D. This would also be the case with respect to interfacing with the universal ID server 132 or the universal web server 134, the transaction node 166 for system E or with the end user output device 162.

Each of the routers 108–128 and 136 have associated therewith a data cache 170, 172 and 180, respectively. Whenever a particular router in one of the systems 102–106 has data routed thereto, data may be cached, then processed either outside the system or internal to the system, or the data is maintained in the cache for later transmittal. The general operation of a transaction would require one of the transaction nodes to determine what type of transaction was being made and the destination of that transaction. If it were determined that the transaction would be between transaction node 140 and transaction node 114 on system 102, a unique transaction packet would be generated that would have unique transaction IDs associated therewith that defined the routing path in the system and the transaction associated therewith while processing what needed to be done between the two transaction nodes. As will be described hereinbelow, this transaction is distributed over the entire system, with only a portion thereof disposed at the transaction node itself. It is the unique transaction codes or IDs that are embedded in the information that is sent to the system that allows the transaction to be carried out in a distributed manner at all of the various elements along the path of the transaction.

As a further example, consider that transaction node 114 for system D utilizes a different database than transaction node 140, i.e., the two nodes are in general incompatible and require some type of conversion or calculation to interface data and transactional information. With the transaction determined at the transaction node originating the transaction, and a unique transaction packet created with the unique transaction information contained therein, all the necessary information to complete the transaction and the routing of data follows the transaction packet through the system. This, in association with information disposed in other elements or nodes of the system, allows the transaction to be completed in a distributed manner. In particular, the transaction packet is transmitted to various nodes which perform those discrete functions associated with the transaction packet for the purpose of converting, routing, etc. to ensure that the transaction packet arrives at the correct destination and achieves the correct transaction.

Figure 2:
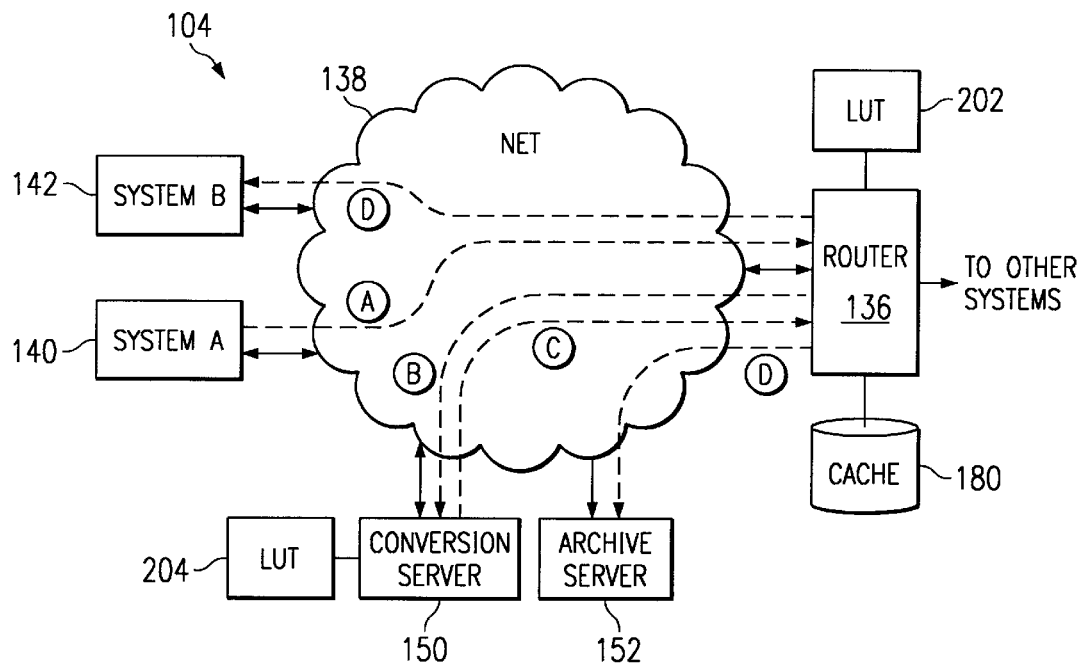
FIG. 2 illustrates the detail of flow between elements of the system of the present disclosure.

Referring now to FIG. 2, there is illustrated a diagrammatic view of the system 104 and a transaction between transaction nodes on the network mesh 138, which network mesh 138 is illustrated as a general network. It is noted that network mesh 138 could be any type of network, such as an Ethernet, a satellite, a Wide Area Network or a Local Area Network. The transaction is illustrated as occurring between transaction node 140 for system A and transaction node 142 for system B. Although the details of a transaction will be described in more detail hereinbelow, this transaction is illustrated in a fairly simple form for exemplary purposes. The transaction is initiated at transaction node 140 to generate information that will be transmitted to transaction node 142 for system B. When the transaction is generated, the type of transaction is determined, the manner in which the information is to be transmitted to transaction node 142 is determined and the route that it will take is determined, and all of the information is embedded in a transaction packet. This is a predetermined transaction that is completed with the use of IDs that are utilized by various systems on the network to appropriately route information and to possibly perform intermediate processes on the packet and the data associated therewith. Further, transaction node 140 has associated therewith information to allow the data that needs to be transferred to be transferred in a predetermined manner in accordance with a known profile of how transaction node 142 wants the transaction to be completed and in what form the data is to be run. For example, it may be that transaction node 140 desires to order a particular product in a particular quantity from transaction node 142. The data associated with the transaction or transactions would be assembled, in accordance with a predetermined transaction profile as determined by the system beforehand and in accordance with a business relationship between the transacting parties, and forwarded to the appropriate location in the appropriate format to be received and processed by transaction node 142. These are transactions that transaction node 140 typically receives and handles in their day-to-day business. As such, all transaction node 142 desires to do is to receive the transaction in a manner that is compatible with its operational environment. By using various conversion algorithms, routing algorithms and the such, the transaction can be effected between the two systems in a distributed manner.

Although not illustrated in FIG. 2, and as will be described hereinbelow, there is an initial setup that defines a profile for a transaction and a profile for a transaction node in the system. Whenever it is desirable for transaction node 140 for system A, for example, to create a business relationship with transaction node 142, this business relationship will be set up on the system as a transaction profile. Once the transaction node is set up, the various information that is necessary for the two transaction nodes to converse will be set up on the system and "propagated" over the system such that the transaction profile is "distributed" about the system. This will be described in more detail hereinbelow.

In the transaction illustrated, the first step is to create the transaction packet and route it to the router 136. This is facilitated over a path "A" through the network 138. The router 136 is then operable to examine the contents of the transaction packet and the IDs associated therewith with a look-up table (LUT) 202. In the LUT 202, the router 136 determines that this transaction packet is associated with a particular transaction and that the transaction requires that any information for this type of transaction being received from transaction node 140 be transferred to the conversion server 150. The router 136 then reassembles the packet and transfers this transaction packet over the network 138 to the conversion server on a path "B" and also stores the information in its associated data cache. Router 136 has, as such, "handed off" the transaction to the conversion server 150 and then created a record in its local cache 180. (This could be stored in non local cache also, such as at the archive server 152.) It is noted that the transaction packet may be converted at each node along the path, depending upon the transaction and the action to be taken at each node.

At the conversion server 150, the received packet from the path "B" is examined to determine information associated therewith. The conversion server 150 also has an LUT associated therewith, an LUT 204. The conversion server 150 recognizes that the information came from the router 136 and has a predetermined transaction associated therewith merely from examining the IDs, processing them through the LUT 204 and then determining what type of process is to be performed on the data packet and the contents thereof and where to forward them to. For example, the operation of the conversion server could be as simple as converting the data from an SML language to an XML language, it could be utilized to translate between languages, or any other type of conversion. Primarily, the contents of the transaction packet and associated data that was retrieved from the database associated with transaction node 140, associated with the transaction therein, may require conversion in order to be compatible with the destination transaction node 142. The conversion server 150 places the data in the appropriate format such that it will be recognized and handled by the transaction node 142. The specific manner by which this conversion is achieved is that setup in the initial setup when the business relationship between the two transaction nodes 140 and 142 was defined. The reason that this particular conversion was performed is that the agreed upon transaction set these parameters in the system for this portion of the transaction which is stored in the LUT 204 at the conversion server 150.

After the conversion server 150 has processed data in accordance with the transaction IDs within the data packet, the transaction data packet is then reassembled with the destination address of the router 136 and transferred back to the router 136 via a path "C," which may also modify the transaction packet to some extent, as will be described in more detail hereinbelow. Router 136 recognizes this data packet as having come from the conversion server 150 and performs a look-up in the LUT 202 to determine that this particular transaction, determined from the transaction IDs associated therewith, requires data received from conversion server 150 to be transferred to the transaction node 142. The data is then assembled in a transaction packet and transmitted to transaction node 142 along the path "D." Additionally, the previous cached data in cache 180 is replaced by the new data that is forwarded to transaction node 142. In some instances, it is desirable to archive the data associated with this transaction. This is facilitated by the archive server 152, wherein the data transmitted to the transaction node 142 along the path "D" is also transferred to the archive server 152 along a path "D'."

As will be described hereinbelow, the entire transaction is determined by a unique transaction packet that has embedded therein routing information in the form of ID packets, data, etc. The ID packets are unique numbers that are recognized by each of the nodes in the network to which it is routed. By recognizing an ID packet, the particular router 136, conversion server 150, etc., has information associated therewith that allows it to perform the portion of the transaction associated with that particular node, i.e., the conversion server 150 performs a conversion and then routes it back to the router 136. In this manner, the originating transaction node need not embed all the transaction information therein and actually effect a direct connection, through a network or otherwise, to the destination transaction node in order to complete the transaction, nor does the originating transaction node require all the transaction information to be associated therewith. As such, the transaction itself is distributed throughout the network in a predetermined manner.

Figure 3:
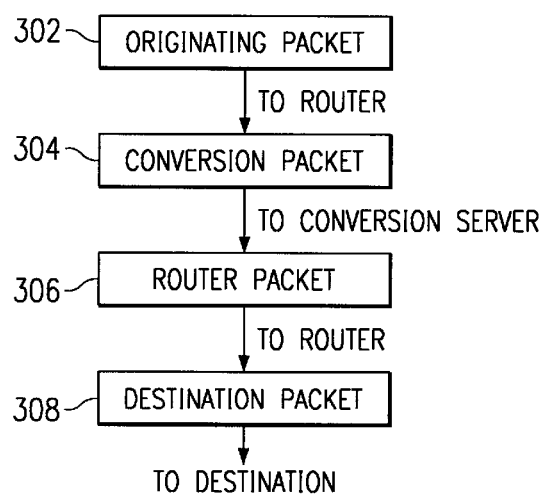
FIG. 3 illustrates the flow of packets between elements in the system and the conversion as the packets flow through the system.

Referring now to FIG. 3, there is illustrated a diagrammatic view of the manner in which the packet is modified through the transaction. An originating transaction packet 302 is generated at the originating transaction node 140. This is then transferred to the router 136, wherein the router 136 evaluates the transaction packet, determines where it is to be sent and then converts the packet to a "conversion transaction packet" 304, which is basically the transaction packet that is designated by the router 136 for transmittal to the conversion server 150 via the path "C" with the necessary information in the form of ID packets, data, etc., that will be required by the conversion server 150 to perform its portion of the transaction, it being noted that the transaction packet may undergo many conversions as it traverses through the system. The conversion server 150 then processes the data contained in the conversion transaction packet and then, after processing, converts it to a router transaction packet 306 for transmission back to the router 136. The router 136 then converts this to a destination transaction packet 308 for transmission to the destination. It is noted that the conversion server 150, after receiving the router transaction packet, has no knowledge of where the destination of the transaction packet will be eventually, as it has only a small portion of the transaction associated therewith. All it is required to know is that the transaction packet requires a certain action to be taken, i.e., the conversion process, and then this transaction packet must be transmitted back to the router 136. Since this transaction packet always has associated therewith the necessary ID information as to the transaction, each node that the transaction packet is transferred to or through will recognize where the transaction packet came from, what to do with the transaction packet and then where to transfer it to. Each node then will transfer the transaction packet to the destination eventually in a "daisy chain" manner.

Referring now to FIGS. 4A–4D, there are illustrated diagrammatic views of the packet transmission which facilitates transmission of a transaction packet between transaction nodes or even nodes in a network. Prior to describing the formation of and transmission of the transaction packet, the distinction must be made between a "data" packet and a "transaction" packet. In general, data is transmitted over a network in a packetized manner; that is, any block of data, be it large or small, is sent out in small "chunks" that define the packet. However, the packet is a sequence of fields that represent such things as headers, footers, error correction codes, routing addresses and the data which is sent as an intact "unit." Sometimes, the data contained in the packet is actually a small portion of the actual overall data that is to be transmitted during a data transfer operation of some predetermined block of data. These packets typically have finite length fields that are associated therewith and some even have longer variable length fields for the data. However, for large blocks of data, the data will be divided up into smaller sub-blocks that can be sent in each packet. Therefore, for example, a large block of data would be sent to the network controller for transmission over a compatible network to a network controller on a receiving device for assembly thereat. The block of data, if it were large enough not to be compatible with a single data packet, would be divided up into sub-blocks. Each of these sub-blocks is disposed within a data packet and transmitted to the receiving device which, once receiving it, will ensure that this data is then sequenced into a combined block of data. If, for example, one of the data packets had an error in it, this would be communicated back to the transmitting device and that particular data packet possibly retransmitted or the entire block of data retransmitted. Since each data packet has a sequence number when sending a group of data packets that represent one block of data, the individual packets that each contain a sub-block of data can be reassembled to provide at the receiving device the entire packet. This packetising of data is conventional.

With specific reference to FIG. 4A, there is illustrated the manner by which the data is actually transmitted. Typically, network controllers are arranged in multiple "layers" that extend from an application layer down to a transport or network layer that inserts the data into a new format that associates a data field 402 with a header 406. The embodiment of FIG. 4A is referred to as an IPX data flow controller. As noted hereinabove, whenever a computer is attached to a network, it becomes a node on a network and is referred to as a workstation. When information is sent between the nodes, it is packaged according to the protocol rules set up in the network and associated with the network controller. The rules are processes that must be complied with to utilize the operating system protocol layers—the application layer, the presentation layer, the session layer, the transport layer, the network layer, the data link and the physical layer—in order to actually output a sequence of logical "1's" and "0's" for transmission on the network mesh.

At the network layer, the data field 402, which was generated at the application layer, is associated with the header 406. This particular configuration is then sent down to the data link which is illustrated as a block 408 which basically associates the data field 402 with a UDP header 410 and then translates this data field 402, UDP header 410 and the IPX header 406 which is then translated into a new data field 412. This new data field 412 at the datalink is then associated with IPX header 414 which is then again converted to a data field 414 associated with a media access controller (MAC) header 416 which is then compatible with the physical layer. The physical layer is the network mesh. This data field 414 and header 416 are what is transferred to the network and what is received by the receiving device. The receiving device, upon receiving the MAC header 416, recognizes an address as being associated with that particular receiving device and then extracts the data field 414 therefrom, which is again utilized to extract the header 414 for examination purposes and, if it is compatible with the device, then the data field 412 is extracted and so on, until the data field 402 is extracted. Of course, data field 402 is only extracted if the data packet comprised of the MAC header 416 and data field 414 is that directed to the particular receiving device. It is noted that all devices on the network mesh will receive the data packet, i.e., they can all "see" the data packet traveling across the network mesh. However, the data will only be extracted by the addressed one of the devices on the system. In this manner, a unique Universal Resource Locator (URL) can be defined for each device on the system. Typically, in an Ethernet environment, each network controller will have a unique serial number associated therewith, there never being two identical serial numbers in any network controller or network card for the Ethernet environment.

In the transaction packet, there are provided a plurality of smaller packets that are referred to as "ID packets" that are generated in the application level. This basically comprises the data field 402. The transaction packet is formulated with a plurality of these ID packets and data that are generated at the transaction node and modified at other nodes. This transaction packet, once formed, is transmitted to the network level in such a manner that the appropriate header will be placed thereon to send it to the appropriate location. Therefore, the software or process running at the particular transmitting node on the network will have some type of overhead associated therewith that defines the address of the source node on the network and also the address of the destination node. Therefore, when data is received by any one of the nodes, it can recognize the defined field for the destination address as being its address. Further, it can utilize the information in the source address field, which is at a particular location in the data packet, to determine where the data came from.

Figure 4B:
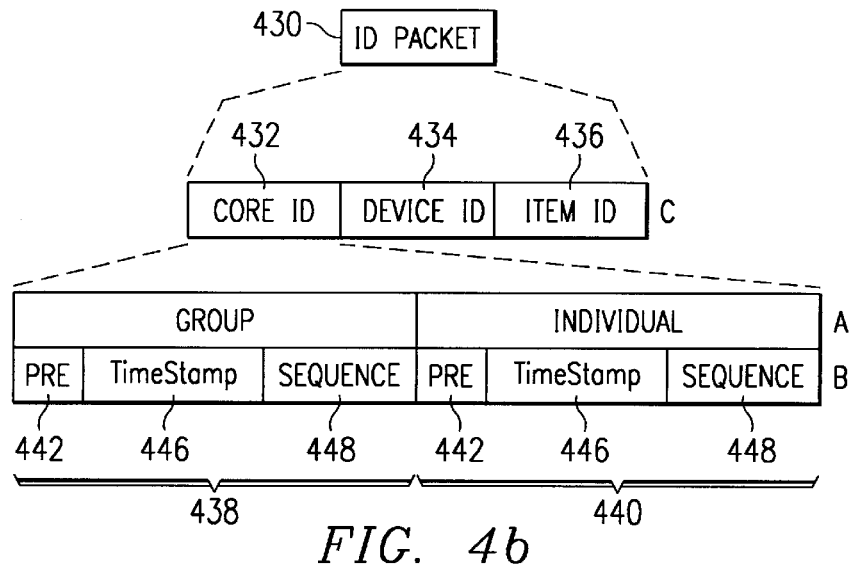

Referring specifically to FIG. 4B, there is illustrated a diagrammatic view of an ID packet 430. The ID packet 430, in the present disclosure, is comprised of a plurality of IDs, a core ID 432, a device ID 434 and an item ID 436. The core ID 432 is that associated with a particular entity on the network such as a corporation. For example, if a corporation had a profile set up, it would be assigned this particular core ID when initiated. The device ID 434 is the unique ID of the device on the network. The core ID could be the corporation, and the device ID could be the computer or program that is assigning item IDs. For example, if company ABC had an assigning device, a computer EFG, the computer EFG would be the creator of the ID packet. If device EFG wanted to assign a vendor ID to a particular vendor—the item, then vendor ID would be set to HIJ. The value for the data packet would then be ABC/EFG/HIJ. Note that the ID is actually not letters, but a combination of codes and time stamps.

Each of the core ID 432, device ID 434 and item ID 436 are comprised of two blocks, a group block 438 and an individual block 440. The group block and the individual block 440 are comprised of a prefix 442, a time stamp 446 and a sequence number 448. The prefix is a sequence of predetermined prefixes that define various items associated with a particular group or individual. For example, it could be that the setup of the profile define this individual as a vendor that had an account which was a core ID and other various prefix values. As such, many different companies or organizations could have the same prefix. However, once the prefix is defined, then the time that it is created is set in the time stamp 446 and then a sequence number is associated therewith in the field 448. Therefore, since only one entity will ever assign the time stamp and sequence values, the entire block, 438 will comprise a unique value or number or ID for that particular group. For example, if company A set up a profile, it would be assigned a unique number that would always identify that particular company and this would never change. As far as the individual block 440, this is a block that further defines the core ID. For example, there may be five or six different divisions within a corporation such that this can be a subclassification. The notable aspect for this particular core ID 432 is that it comprises a unique ID in the system and will define certain aspects of the overall ID packet 430, as well as the device ID 432, 434 and item ID 436. When all three of these core ID 432, device ID 434 and item ID 436 are combined, this defines a unique ID packet 430 that is associated with various information such as transactions, messages, pointers, etc. These are set up originally in the universal ID server 132 in a profile origination step (not described) wherein a particular operation can be associated with the ID packet 430. This would essentially constitute a relational database somewhere in the system. Therefore, as will be described in more detail hereinbelow, when this ID packet 430 is assembled into the transaction packet, it is only necessary for any node to examine each of the ID packets and determine if any of the ID packets define operations to be performed by that particular ID packet. For example, if the ID packet represented a transaction such as a conversion, then the conversion server 150 in, for example, system 104, would recognize the particular ID packet indicating a conversion operation and also it might require information as to the a destination node which is typically information contained in an ID packet, among other information, which defines exactly the process that must be carried out. For example, it may be that information is to be converted from one language to another which is indicated by an ID packet merely by the ID itself With a combination of that ID packet indicating that transaction and the unique ID packet associated with the destination, the conversion server could make a decision that a particular process is to be carried out. This is facilitated since a relational database will be associated with the conversion server 150 that will run a particular process therein. It is not necessary to send any information to the conversion server 150 as to exactly what must be carried out; rather, only the particular ID is necessary which comprises a "pointer" to a process within the conversion server 150. Once the conversion is complete, then the process that is running can utilize another ID packet contained therein for the purpose of determining which device in the node is to receive the results of the process and exactly how those results should be packaged in a new transaction packet, it being noted that the transaction packet can be modified many times along with the transaction as it traverses through the system.

Referring now to FIG. 4C, there is illustrated a diagrammatic view of a transaction packet 460. The transaction packet in FIG. 4C is illustrated as being a plurality of "stacked" packets referred to as IDP1, IDP2, IDP3 and IDP4, followed by a data field 462, followed by additional ID packets, IDP5 and IDP6 and so on. This transaction packet 460 can have any length, it being noted that the length is due to the number of ID packets, those being fixed length, and possibly variable length data field 462. By examining the ID packets as they arrive, which occurs in a sequential manner, then each of the ID packets can determine what follows and what action should be taken. For example, IDP4 may be an ID packet that defines exactly the length of the field 462 and what data is contained therein. Typically, these will be in finite length blocks.

Referring now to FIG. 4D, there is illustrated a more detailed example of a transaction packet 464. In this transaction packet, there are provided a plurality of ID packets, IDP1, IDP2, IDP3–IDP6, and so on. IDP1 is associated with a transaction packet defining a predetermined transaction. As noted hereinabove, this is merely a pointer to a process that is defined in code on the recipient node, if that node is actually going to utilize the transaction. It is noted that this transaction packet IDP1 may be a transaction that is designated for another node. Following the IDP1 data packet is provided the IDP2 data packet which is associated with a message number. A message number comprises the real ID of a line of data in the database of the transmitting transaction node. Followed by this message number would be a block number in the IDP3 data packet followed by a block of data in a data packet 466. The message number and block number define the sequence of the data packet 466 for later assembly. This could then be followed by the data packet IDP4 for another message number and IDP5 for a block number followed by a data packet 468 associated with the message number and block number of IDP4 and IDP5, respectively. This is then followed by the IDP6 data packet for another transaction. Therefore, various message numbers, block numbers, data, transactions, process IDs, etc. can be transmitted in ID packets, it being noted that all that is sent is a unique value that, in and of itself, provides no information. It is only when there is some type of relational database that contains pointers that can be cross-referenced to the unique ID packets that allows the information in the ID packet to be utilized. If it is a transaction, as described hereinabove, then that transaction could be carried out by recognizing the pointer to that process disposed at the node that is processing the data.

Figure 5:
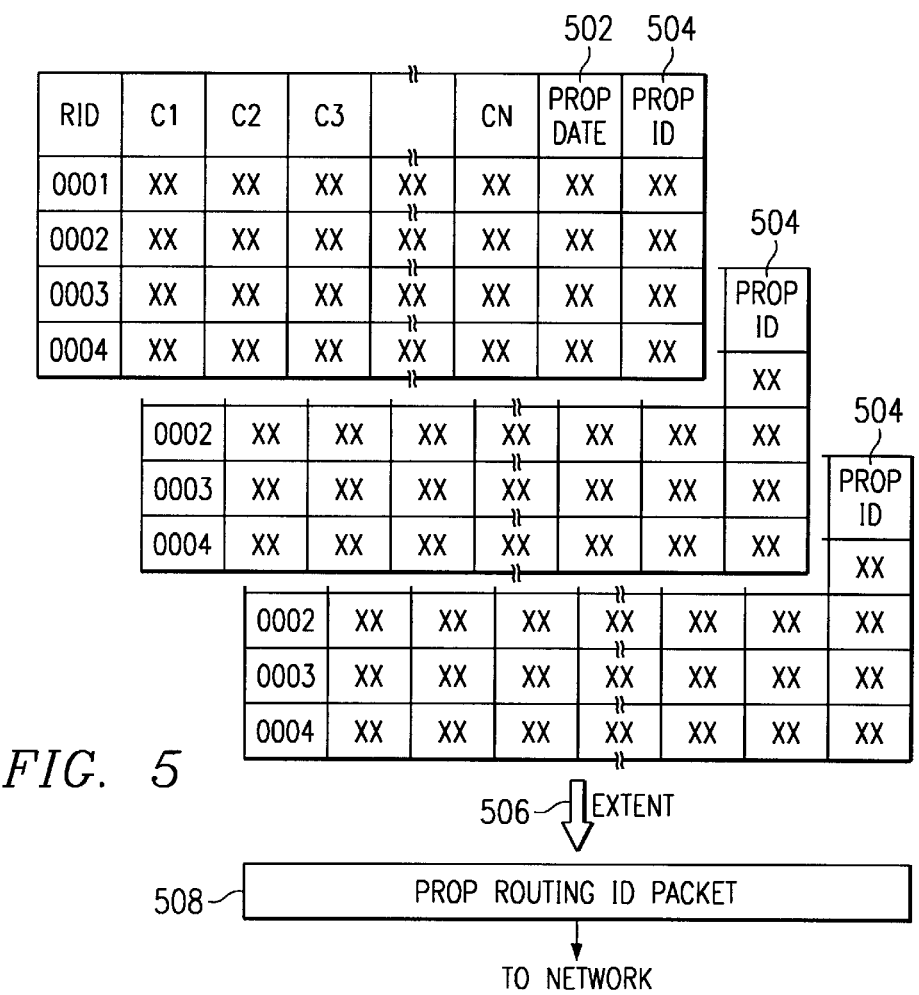
FIG. 5 illustrates a diagrammatic view of databases at the host/client and the conversion thereof to a proprietary routing ID packet.

Referring now to FIG. 5, there is illustrated a detail of a database at the source transaction node H1. This is by way of example only. In this example, there are provided three separate tables that exist in the database. These are tables that can be formed as a result of the transaction or exist as a result of other transactions. It is noted that these particular tables are in the "native" database of the transaction node. Typically, the databases will always be arranged in rows and columns with a row identification address (RID) associated with each row. With the row address, one can identify where the data is for the purpose of extracting the data, updating the data, etc. When data is accessed from the database or is processed by the database with the system of the present disclosure, information is associated with each row of data in two separate proprietary columns, which columns are proprietary to the system of the present disclosure. They are a column 502 and a column 504. The column 502 is a date stamp on a given row, such that the particular row when accessed can be date stamped as to the time of access. A row ID that is proprietary is also associated with the accessed row. Therefore, whenever a row is accessed, it is date stamped and assigned a row ID. In this manner, even if the data is reorganized through a database packing operation or the such, the data can still be found. As such, a unique identification number for a given row can be generated with the proprietary row ID or the proprietary RID and the date stamp, such that a large number of proprietary numbers can be realized.

When the databases are generated and put in the appropriate formats, it is desirable to transfer data that is stored for the purpose of a transaction to actually facilitate or execute the transaction. This utilizes a unique "Extent" for that transaction, which Extent is defined by an arrow 506 that converts the data in the appropriate manner to a proprietary transaction packet 508. The Extent 506, as will be described hereinbelow, is operable to determine how to process data, extract it from the various tables, even creating intermediate tables, and then assemble the correct ID packets with the appropriate data in a transaction packet and transfer this transaction packet to the network. Since the transaction is a profiled transaction for the whole network, the entire decision of how to route the data and ID packets to the destination and the manner in which the data is handled or delivered to the destination is not necessarily determined in the Extent at the H1 transaction node. Rather, only the information necessary to "launch" the transaction from the transaction node H1 is required and which ID packets are to be included. Once it is launched to network, this unique transaction packet travels through the network and is processed in accordance with the unique ID packets embedded in therein.

Referring now to FIG. 6, there is illustrated a diagrammatic view of two transaction nodes 602, labeled H1, and 604, labeled H2, in a system that are both associated with individual routers 606, labeled R1, and router 608, labeled R2. Router 606(R1) is interfaced with the transaction node 602 through a local network 610, which also has associated therewith two conversion servers 612 and 616, labeled C1 and C2, respectively. The router 606(R1) is interfaced with router 608(R2) via a network 618. Router 608(R2) is interfaced with transaction node 604 through a local network 620, network 620 also interfaced with a conversion server 622 labeled C3.

In operation, there will be a channel defined for any given transaction. This channel will define the path that is necessary to traverse an order to "hit" all the necessary processing nodes in order to effect the transaction in the appropriate manner and in an appropriate format that will be compatible with transaction node 604 when it arrives thereat. Similarly, if the transaction node 604 desires to utilize the same transaction back to node H1, it would merely use the same channel but in the reverse direction. Similarly, another transaction could be defined from the transaction node 604 to 604 directed toward transaction node 602, requiring an additional channel. Of course, each of these would also require a unique feed ID packet that would define the various software that generated the various channels, ID packets and the data packets, as described hereinabove.

Referring now to FIGS. 7A and 7B, are illustrated graphical depictions of two channels. In FIG. 7A, there is illustrated a channel from H1 to H2 labeled "0011." This channel requires the data to be generated at H1 and transferred to R1. At R1, a conversion operation is determined to be required and the data is merely sent to converter C1 (after possible caching at the router.) At conversion server C1, the conversion is performed and then it is reassembled and passed back to R1. At R1, it is determined that the data packet has arrived from C1, and the next step is to send it to converter C2. Converter C2 then performs the appropriate conversion operation, based upon the feed ID packet and the other unique ID packets in the transaction packet, and then transfers the transaction packet back to R1. At R1, it is determined that this transaction packet must be sent to another router, which is router R2. When sent to router R2, the routing information could be global or it could be network specific, i.e., the channels might be specific only to the systems associated with the appropriate router. In a situation like this, an intermediate "joiner ID" is generated that defines a particular relationship. This is an intermediate ID that is created for the purpose of this particular transaction. This joiner ID then is generated and the information sent to the router R2 which indicates that router R2 is to transmit the transaction packet to H2. It is known in this particular channel and transaction that the transaction packet is already appropriately conditioned for receipt by H2 and H2 will receive the transaction packet, and know what type of transaction is to be performed at H2, i.e., it is aware of the unique ID packets and their meaning, such as the feed ID, packet how to process information once received, etc. It therefore understands the parameters within which the transaction is to be effected.

In FIG. 7B, there is illustrated another channel, channel "0022" for performing another transaction from H2 over to H1. This channel requires that the transaction packet be sent from H2 over to R2 and then from R2 over to C3 for conversion. After conversion, the transaction packet is sent from C3 over to R2 and then from R2 over to R1 with a joiner ID, similar to that of FIG. 7A. At R1, the data is transferred directly to H1. If the transaction for this particular channel is to be transmitted back to H2 along the same channel, the reverse path would be utilized.

Referring now to FIG. 8, there is illustrated a flow chart for initiating a transaction. When the transaction is initiated, it is initiated at a block 802 and then a transaction table is created. This transaction table will have data associated therewith with rows of data therein in a predetermined format that is associated with the native database of the transaction node. This transaction table will then have each row therein stamped with a proprietary date and a proprietary RID, as indicated by the function block 804. Thereafter, the transaction flow will be analyzed, in a function block 806, to determine how the data is to be arranged and transferred. This transaction is then scheduled for transmission, in a function block 808. This is facilitated with a process wherein various calls are created for each block of data in the database, as indicated by a function block 810 and then a run ID is created in a function block 812. After the schedule has been generated and queued, the program then flows to an End block 814.

Referring now to FIG. 9, there is illustrated a flow chart depicting the operation of analyzing the transaction flow in the block 806. The flow begins at a function block 902 to extract select data from the database and assign destination information and source information thereto, i.e., determine that the transaction comes from H1 and flows to H2. During this extraction operation, the type of extraction is determined, as indicated by block 901. It may be a partial extraction or a full extraction. The partial extraction is one in which less than all of the data for a given transaction is extracted, whereas the full extraction extracts all the desired data in a single continuous operation. The program in function block 902 operates in a filter mode and flows to a decision block 916 to determine if there is a restriction on the data which, if determined to be the case, will result in filtering by predetermined parameters, indicated by function block 918. This restriction operation is a filter operation that sets various parameters as to how the data is "pulled" or extracted. If not restricted, or, after restriction (filtering), the program will flow to a block 920 to a function block 904 to then assign a transaction ID to the data. Optionally, there could be assigned thereto a joiner ID in the event that it was determined the data should go across to systems and the joiner ID were appropriate. This joiner ID will be described hereinbelow. The program then flows to a function block 906 wherein a message number is assigned to each transaction. This message number is associated with a row of data. The program then flows to a function block 908 to determine block flow. Typically, in databases, the data is extracted in one large block of records. For example, a given transaction may require 10,000 records to be transferred over the network. However, it may be that the recipient transaction node desires only 500 records at a time as a function of the manner in which they conduct business. This, as noted hereinabove, is what is originally defined in the profile for the business relationship or the transactional relationship between the two transaction nodes. This, again, is predefined information.

After determining the block flow, the program flows to a decision block 910 to determine if this is to be a divided block flow, i.e., the block is to be split up into sub blocks. If so, the program flows to a function block 912 to assign a block ID to each sub-block, such that the blocks can be assembled at a later time. The program then flows to a decision block 914. If it is not to be divided, the program will flow from the decision block 910 to the input of decision block 914.

Decision block 914 determines if more data is to be extracted from the local database of the transaction node initiating the transaction and, if so, the program flows back to the input of function block 902 to pull more data. Once the data associated with the transaction has been extracted, the program will flow to a block 920 to return the operation.

Referring now to FIG. 10, there is illustrated a diagrammatic view of a sample transaction table. The transaction table is basically comprised of the message number, the transaction ID, the joiner ID (if necessary), the row ID and date with proprietary identification system and the block ID. Also, a RUN ID can be assigned to each block as it is being processed. The row ID in a column 1002 and the date in a column 1004 is different from the database defining row ID in that they are always associated with the row. The row ID in the database is defined as function of the database and can actually change through various rearranging of the database at the transaction node.

Figure 11:
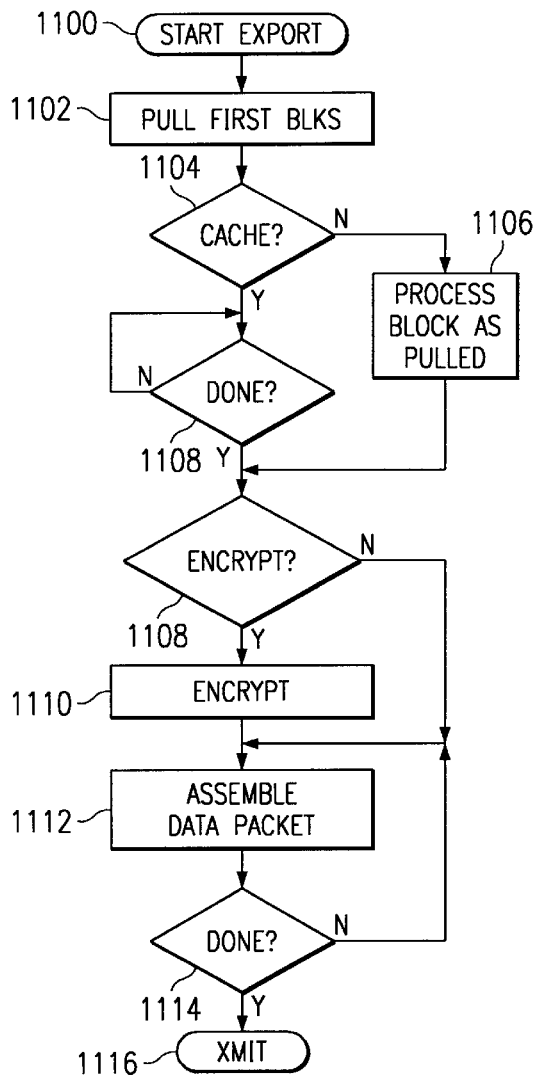
FIG. 11 illustrates a flow chart depicting the export operation wherein the data is polled and transmitted in packets.

Referring now to FIG. 11, there is illustrated a flow chart depicting the operation of actually exporting the data from the transaction table. This is initiated at a block 1100 and then flows to a function block 1102 to pull the first block in accordance with the Extent that is running. It should be understood that all of the flow charts from the start of the transaction to the end of a transaction are associated with a predetermined transaction Extent. This Extent, as will be described hereinbelow, is a sequence of instructions or codes that are downloaded to the particular node to allow the node to conduct its portion of the transaction in the predetermined manner defined by the transaction profile that is distributed throughout the system. Not all of the necessary transaction information is contained here but, rather, only the information or the process steps necessary to create and transmit the transaction packet out of the system in the correct manner.

Once the data is pulled in accordance with the Extent running on the transaction node, the program will flow from the function block 1102 to a decision block 1104 to determine if a caching operation is to be performed. If not, the program will flow to a function block 1106 to process the block as pulled. If caching is required, the program will flow to a decision block 1108 to determine if the caching is done, before transmitting the blocks and, when complete, the program will flow to a decision block 1108, along with the output of the function block 1106. The decision block 1108 determines whether an encryption operation is to be performed. If the data is to be encrypted prior to transmitting over the network, the program will flow to a function block 1110. If not, both function block 1110 and decision block 1108 will flow to the input of a function block 1112 to assemble the data packet. It is noted that the encryption operation is something that is optional and does require the overhead in each recipient node to decrypt the data. This function will not be described with respect to the remainder of the data flow.

Once at the function block 1112, the transaction packet is assembled. The program then flows to function block 1114 to determine if the transaction packet is completely assembled and, once complete, the program will flow to a transmit block 1116.

Figure 12:
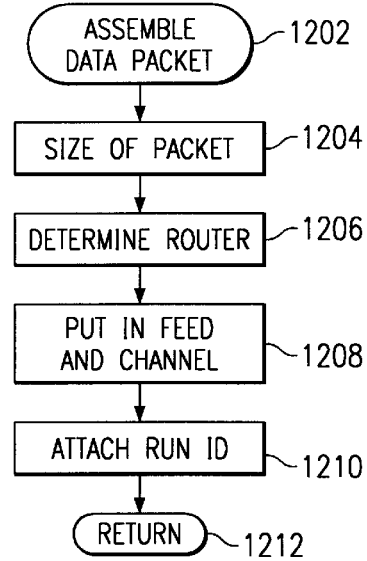
FIG. 12 illustrates the operation of assembling the data packets.

Referring now to FIG. 12, there is illustrated a flow chart for the transaction packet assembly operation, as initiated at a block 1202. The program flows to the function block 1204 to determine the size of the data packet, whether it is a small group of ID packets in the transaction packet or plural ID packets in the transaction packet. Once the size of the transaction packet has been determined, the program flows to a function block 1206 to determine the router to which information is to be transmitted. It is noted that more than one router could be on a network. The router is determined, of course, as a function of the particular Extent that is running, this being the path to which the packet will be routed. Once determined, the program will flow to a function block 1208 to insert the feed ID and the channel ID. It is noted that the feed ID and the channel ID are inherently a part of the Extent, this having been determined at the generation of the feed Extent which was generated during the profiling operation, as will be described hereinbelow. The program then flows to function block 1210 to attach the Run ID thereto and then to a Return Block 1212.

Figure 13:
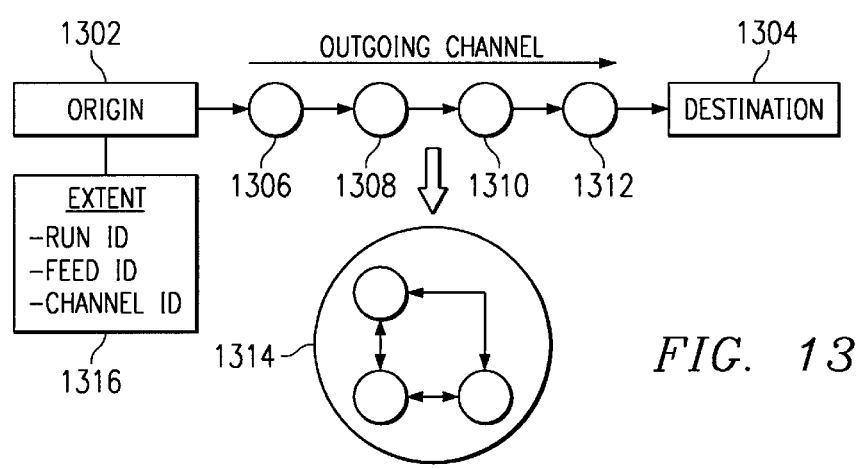
FIG. 13 illustrates a diagrammatic view of a single channel and the processes performed in that channel.

Referring now to FIG. 13, there is illustrated a diagrammatic view of a transaction or process that is originated at an origin node 1302 for transmission to the destination node 1304 on a single outgoing channel. As noted hereinabove, the outgoing channel defines the route and the transaction. The origin node at 1302 utilizes a local Extent, indicated by box 1306, to generate the transaction. In this transaction, there are a number of IDs that are generated. One is a "RUN ID," one is a "FEED ID," and the third is a "CHAN ID." Although there may also be other ID packets that are generated, these three packets can basically define an entire transaction or process.

The origin node 1302, which can comprise the host node or the such, generates the transaction packet comprised of at least the RUN ID, the FEED ID and a CHANNEL ID and forwards it to a first process node 1306 which processes the received transaction packet in accordance with the above noted processes which then requires the transaction packet to be modified and transferred to a second process node 1308 for further processing, which then forwards this to a third processing node 1310 and then to a fourth processing node 1312 before final routing to the destination node 1304. The destination node 1304, as described hereinabove, can be the system router. Additionally, the router could be one of the processing nodes 1306–1312. This process will use a single outgoing channel for transferring a transaction packet from the origin node 1302 over to the destination node 1304. At the destination node 1304, the information could be transferred out of the channel to another channel, as will be described hereinbelow. Overall, this processing channel is defined graphically as a block 1314. This graphical representation indicates that a transaction packet is generated and the process through various nodes in accordance with distributed processing described hereinabove to route the transaction packet along various processing nodes to the destination node 1304 for handling thereat.

Referring now to FIG. 14, there is illustrated a diagrammatic view of two channels adjacent to each other. In this embodiment, there is illustrated an origin node 1402 which is operable to generate a transaction packet, as described hereinabove, through two processing nodes 1404 and 1406 to a router 1408, labeled R1. This router R1 is substantially the same as the destination node 1304 in the single outgoing channel noted with respect to FIG. 13. This combination of the origin node 1402, the two processing nodes 1404 and 1406 and the router 1408 comprise an outgoing channel. A second channel is associated with a destination node 1410. The overall transaction or process is operable to generate the transaction at the origin node 1404 and route it finally to the destination node 1410 for completion of the transaction. However, once the router 1408 has received the transaction packet, it then passes it over to a router 1412 labeled R2, which constitutes an incoming channel for the destination node 1410. The router 1412 receives the packet from router 1408 and passes it through two processing nodes 1414 and 1416 to the destination node 1410. As noted hereinabove, the two systems, the one associated with router 1408 and the one associated with router 1412 could handle the transaction packet and the ID packets associated therewith in a similar manner, i.e., that is, they could utilize the same packet IDs. However, for security purposes, the origin node 1402 and the destination node 1410 utilize a different set of ID packets referred to as joiner ID packets to transfer information therebetween. As such, within the outgoing channel associated with router 1408 and origin node 1402, there would be a defined set of system assign IDs that would be proprietary to the origin node 1402. It may be that the actual identification of these IDs is something that the origin node 1402 would not want to share with the destination node 1410. Therefore, the origin node 1402 and the destination node 1410 negotiate a relational database that associates an arbitrary joiner ID with various IDs at the origin node 1402 such that the IDs have no meaning in any system other than for the business relationship between the outgoing channel and the incoming channel for the origin node 1402 and destination node 1410, respectively. These joiner IDs are illustrated in tables of FIG. 14A. You can see that router R1 has a table associated therewith wherein the joiner ID "0128" is associated with an ID packet "XXXX." Whenever this joiner ID is received by router R2, a table for router R2 is examined to determine that this joiner ID "0128" is associated with an ID packet "ZZZZ" therein. For example, it may be that there is a unique ID associated with origin node 1402 that defines it in an overall system. However, it may be that destination node 1410 defines the origin node 1402 in a different manner, i.e., as "ZZZZ." Rather than redefine the joiner ID as "XXXX" in its system, it merely needs to have a joiner ID that defines the relationship between the two systems. Therefore, whenever the joiner ID "0128" is received as an ID packet, the router R2 will convert this joiner ID to the ID packet "ZZZZ" such that it now recognizes that ID packet as the vendor number of the origin node 1402 within its system. Other than within the system associated with destination node 1410, this has no meaning.

With respect to the joiner IDs, the joiner ID can be associated with the transaction packet in any position along the processing path. Typically, the joiner ID is assigned at the origin node 1404 when running the Extent associated therewith, i.e., it is initially defined when the feed and the channel are assigned. However, it could actually be assigned at the router 1408.

Referring now to FIG. 15 there are illustrated three separate processing blocks 1502, 1504 and 1506, similar to the processing block 1314. Each of these processing blocks 1502, 1504 and 1506 represent a single channel and a processing system. For example, processing node 1502 could represent a single company and its associated router, conversion server, ID server, archival server and host node. When performing a transaction to transfer to another system, the transaction packet is generated within the processing node 1502, processed therethrough in accordance with the distributed processing system as described hereinabove and then output from the processing block 1502 over to a second channel 1508 for routing to the processing block 1504. The processing block 1504 represents a third channel and an independent and self-contained processing block. For example, the processing node 1504 may be an intermediate processing node that allows independent processing of a transaction or processing event for transfer to the processing block 1506. This could be, for example, a satellite system that constitutes an intermediate processing step. Once the transaction has been processed through the third channel, this is then transferred to a fourth channel 1510 for transfer to the block 1506, which comprises a fifth channel. Each of these channels and each of these processing blocks comprise separate distinct processing operations which all operate on the same transaction packet (although the transaction packet may be modified somewhat). Initially, the processing block 1502 originates at an originating node therein the transaction. This transaction has a channel and feed associated therewith, which channel comprised all of the channels from the origin to the destination at processing block 1506.

Referring now to FIG. 16, there is illustrated a diagrammatic view of how the channel IDs and the feed IDs change as the transaction packet is processed through various processing nodes. As described hereinabove, a channel is defined as the route that a transaction path is to take through the various processing nodes. Since the processing is distributed, the transaction packet must be routed to each node in order that the appropriate processing be carried out on that transaction packet. Since the processing is predefined with respect to the channel ID, very little information needs to be disposed within the transaction packet in order to effect the processing. This transaction packet and the packet IDs associated therewith in the form of the feed ID, the channel ID, etc., define the portion of the processing that is to be carried out at each processing node, i.e., these constituting process pointers at each processing node. With respect to the channel ID, this basically remains the same in the transaction packet as the transaction packet traverses a group of processing nodes. However, the feed ID will change. The feed ID basically constitutes an instruction that is generated at one processing node for transfer to the second processing node that defines the processes that are to be carried out. In general, this feed ID is a "tracer" that follows the process to flow from node to node. As such, when one node receives a transaction ID from another processing node, it recognizes that the process is that associated with the channel ID, but it also recognizes where in the process the transaction packet is. For example, a router may handle a transaction packet a number of times in order to effect transfer to one or more conversion servers, effect transfer to an ID server, etc. With the use of the feed ID, the router now has knowledge of what process is to be carried out in the overall transaction process when it receives the transaction packet from a given processing node. Additionally, another aspect that the feed ID provides is the tracing function wherein a failure at any point along the process path can now be tracked to the previous process that was carried out.

With specific respect to FIG. 16, there are provided a plurality of processing nodes 1602 labeled N1, N2, . . . , NK. Each of the processing nodes 1602, as described hereinabove, carry out a portion of the overall transaction process which was predistributed to the processing node. Each of the processing nodes 1602 carries out a plurality of processes, labeled P1, P2 and P3 for exemplary purposes. It should be understood that any number of processes could exist at a particular processing node 1602 that could be associated with a given channel ID or multiple channel IDs for many other transactions apart from the current transaction. It is noted that each processing node can handle many different processes and transactions. Once a transaction ID packet is configured, each processing node will receive that transaction packet, examine the transaction packet and determine exactly which process must be performed on that transaction packet, all of the effected with only a few ID packets of a fixed length.

When the transaction is initiated, it is initiated at the origin node, illustrated as a node 1604 for generation of a feed ID and a channel ID, labeled FEED1 and CHID1. This indicates at the origin node 1604 that this transaction packet is to be transferred to processing node N1. When processing node N1 receives the transaction packet, it recognizes that the process to be carried out is defined by the feed ID and it has associated therewith a FEED1 block 1606 that defines the process that is to be carried out. This block 1606 then can select between the available processes P1–P3 for application to the transaction packet. Once a transaction packet has been processed in accordance with the selected one of the processes (it may possibly require more than one process for the processing), then the feed number is changed to the next feed ID, FEED2, and then the transaction packet is transferred with the same channel ID, CHID1, to the next processing node, node N2. At this node, the processing node recognizes that this is the FEED2 feed ID and processes the data in accordance with a block 1608 for this particular feed ID. Again, this selects between a plurality of processes for operation on the transaction packet. Once processed, then the feed ID is incremented and the transaction packet transferred until it reaches the last processing node in the processing chain, the processing node NK. At this node, this processing node will receive the feed ID, FEEDK, and the same channel ID, CHID1. This will be processed with processing block 1610 in accordance with the feed ID to select the process that is to be applied to the transaction packet and then this is transferred out to the destination.

It can be seen that this "hopping" operation allows the transaction packet to be passed from one processing node to another. By incrementing the feed ID along the processing chain, each processing node can determine uniquely what process is to be carried out in the overall processing chain. However, it should also be understood that the feed ID provides this tracer operation, but could be eliminated. It could be that all that is required is the channel ID. Each processing node would receive the channel ID and the processing associated therewith could be indicative of the process to be carried out by recognizing where the channel ID came from. Therefore, an entire transaction could be carried out with a single ID packet. For example, suppose that a transaction involved a conventional normal transaction between two business entities that involve the transfer of 100 widgets to a particular warehouse. Once the business relationship is defined between two companies, then a single channel ID could be transferred to the destination company which, upon receipt, would recognize that a particular transaction was to be carried out in a particular way for this particular vendor. It may be that there are some conversions that are required during the process, which will require the ID packet to be transferred to a conversion server to possibly assign a joiner ID to the channel Id in order to provide some security to the system to prevent actual information at the origin in the form of its unique vendor ID, etc., to be transferred to the destination node. As such, it may be that some type of conversion operation would be required to assign a joiner ID during the process in the first company's system for transfer to the second company's system. It is noted that a company system is that defined by a router, a network mesh, an ID server and a host node. Typically, the ID server, the host node, the conversion server, and the network mesh are all typically associated and "owned" by a particular company.

Figure 17:
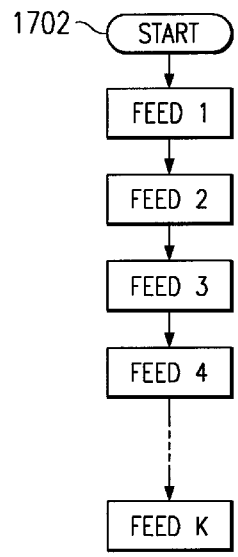
FIG. 17 illustrates the process flow for the feeds in a given process or transaction.

Referring now to FIG. 17, there is illustrated a diagrammatic view of how the feed is incremented. This is initiated at a start block 1702 and then proceeds to various feed blocks for the feeds FEED 1, FEED2, . . . , FEEDK. The process must go through each of the feed blocks and, at each of the feed blocks, carry out the associated process. Therefore, the transaction packet in effect not only carries a channel ID that can be utilized at a particular processing node to determine what transaction is being processed but also receive intermediate instructions to indicate what processes in the transaction are to be carried out. As noted hereinabove, it may be that the router is involved in the actual transaction a number of times. Although a plurality of processes are predetermined as being associated with the given transaction, the processes that are applied to the transaction packet are determined as a function of where in the process the transaction is. The feed IDs indicate the position in the transaction for the purposes of determining which predetermined transaction processes are to be applied to the transaction packet when received at a particular processing node. Additionally, the feed IDs also provide for some failure analysis in the event that a failure occurs. For example, in FIG. 15, one could examine any transaction or process from the origin to the final destination at any place in the process and determine where in the process it was.

Figure 18:
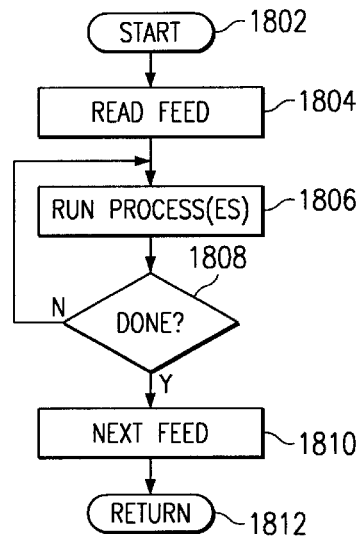
FIG. 18 illustrates a flow chart for the operation at each process node for determining from the feed the process to run and then selecting the next feed.

Referring now to FIG. 18, there is illustrated a flow chart depicting the operation of running the process at a given process node. The program is initiated at a block 1802 and then proceeds to a function block 1804 to read the feed ID received in the transaction packet. The program then flows to a function block at 1806 to run the process or processes associated with that feed ID and then to a decision block 1808 to determine if all the processes have been run. If not, the program continues running processes in the block 1806 and, when complete, the program flows to a function block 1810 to increment to the next feed number and then transmit the transaction packet to the next processing node, as indicated by a return block 1812.

Figure 19:
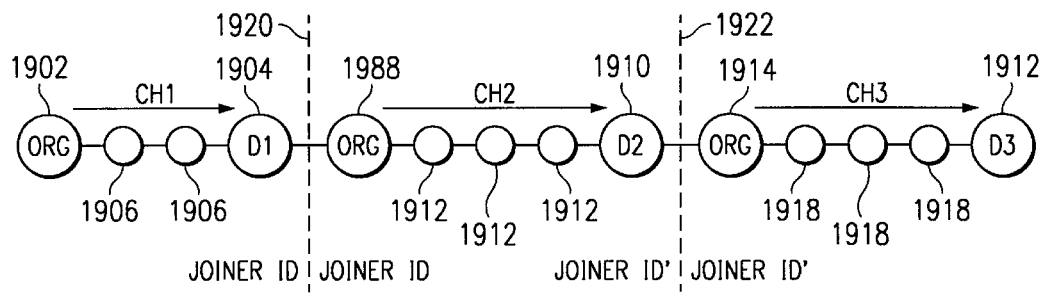
FIG. 19 illustrates a diagrammatic view of three adjacent channels in a single process flow.

Referring now to FIG. 19, there is illustrated a diagrammatic view of a plurality of channels which indicate processing from an origin to a destination in each channel and then handing off to a second channel or second system. These are defined as channels CH1, CH2 and CH3. In channel CH1, there is provided an origin node 1902 and a destination node 1904 with two processing nodes 1906 associated therewith. In the second channel, CH2, there is provided an origin node 1908 and a destination node 1910 with three intermediate processing nodes 1912. In the third channel, CH3, there is provided an origin node 1914 and a destination node 1916 and three processing nodes 1918. The transaction is initiated at the origin node 1902 for final transmission to the destination node 1916. However, between the destination nodes 1904 and 1908, there is provided a line of demarcation 1920, with a similar line of demarcation 1922 disposed between destination node D2 and origin node 1914. The destination node 1904 could be a router and the origin node 1908 could be a router in channel CH2. The line of demarcation 1920 indicates that the first channel, CH1, basically "hands off" the transaction to the second channel CH2 which processes the transaction in accordance with a predetermined process set forth therein in a distributed manner across the various processing nodes for handing it off to the third channel, CH3. Each of the line of demarcations 1920 and 1922 define distinct boundaries such that the transaction packet can be considered independently handled for each of the channels. For example, it may be that in order to transfer from CH1 to CH2, a joiner ID is provided. When handing off from destination 1910 to origin 1914 across line of demarcation 1922, a second joiner ID' may be required.

Figure 20:
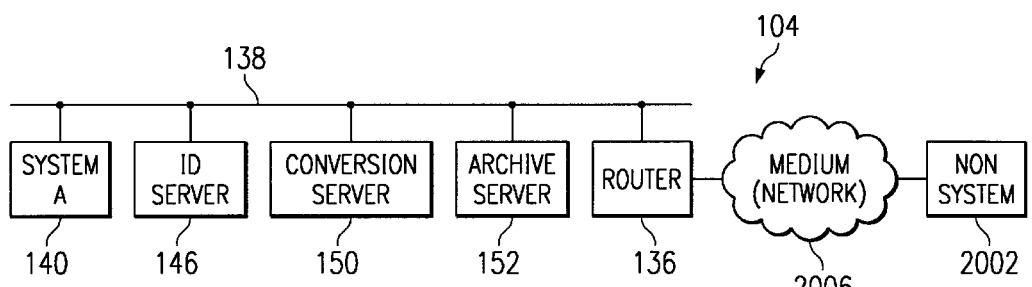
FIG. 20 illustrates a diagrammatic view for a non-system host or origin process node accessing a system process node.

Referring now to FIG. 20, there is illustrated a diagrammatic view of one of the systems of 102–108 wherein a non-system node 2002 is interfaced with the system 104 through a network 2006, which interfaces with the router 136. The non-system node 2002, since it is not part of the overall system 104, is not identified in the system per se without some processing in the system 104. In general, the non-system node 2002 first must be identified and the transaction associated with its access to the router 136 identified. Once this identification is made, then the necessary transaction packet is assembled and the transaction conducted in accordance with the process described hereinabove. For example, the non-system node 2002 will initiate a transaction merely by contacting the router 136. This could merely be the transmission of a request to a specified URL of the router 136 on the network 2006. The router 136, upon recognizing the URL of the non-system node 2002, i.e., the source URL, would recognize that a transaction is being initiated. The router would then create a transaction packet and route it to the conversion server 150. The conversion server 150 would then convert information received from the non-system node 2002 over to a format compatible with a transaction to be conducted with, for example, transaction node 140 on the network mesh 138 in the system 104.

As an example of a transaction, consider that the non-system node 2002 wanted to send an order via e-mail to transaction node 140. To facilitate this, non-system node 2002 would fill out a form in a predetermined order with information disposed in predetermined fields. This e-mail would then be routed to the router 136. The router 136 would recognize the source of the e-mail and the fact that it was an e-mail. By recognizing both the source of the e-mail and the fact that it is e-mail, the router 136 would now recognize a transaction. It would create a form ID for the non-system node 2002, which would define the type of form that is to be routed to the conversion server 150, and various other IDs that are associated with the transaction. This form and the form ID, in addition to other identification information in the form of ID packets, would be sent to the conversion server 150. The conversion server 150 would then extract the information from the form in accordance with the form ID pointer, and convert this to information associated with the transaction. This would then be transferred to transaction node 140.

Figure 21:
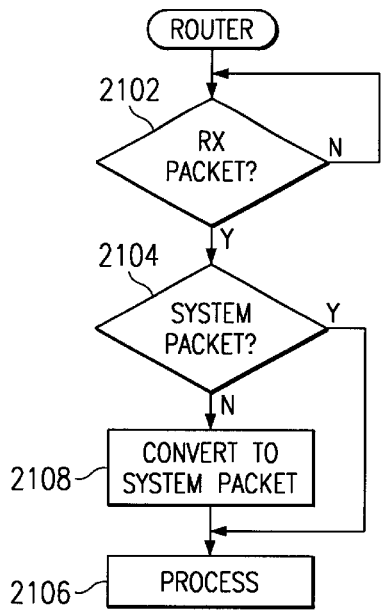
FIG. 21 illustrates the process at the router for handling an out of system process node that originates a transaction.

Referring now to FIG. 21, there is illustrated a flow chart depicting the operation of the router 136 when receiving information from within the system and from outside of the system. The operation of the router 136 is operable to receive data in the form of packetized data from the non-system node 2002. This is indicated at decision block 2102. The program then proceeds to decision block 2104 to determine whether this is a system packet. If so, then this indicates that this is a system node and the program will proceed to a function block 2106 to process the received transaction packet in a normal mode. If it is not a system packet or transaction packet, the program would flow to a function block 2108 to convert the packet to a system packet and then to the function block 2106.

Figure 22:
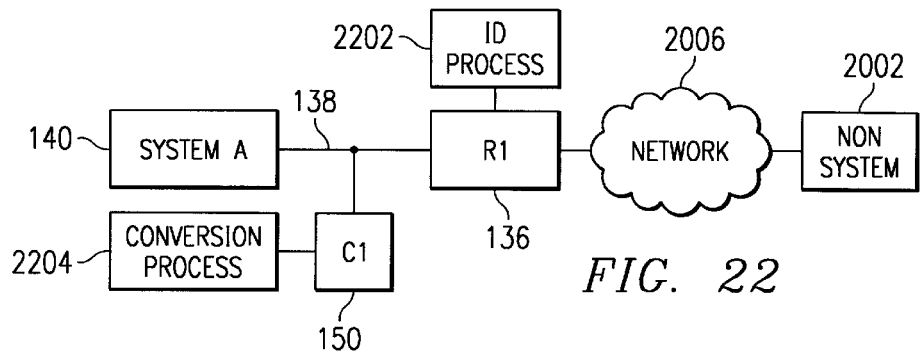
FIG. 22 illustrates a diagrammatic view of a simplified network for servicing a non-system node with the processes illustrated.

Referring now to FIG. 22, there is illustrated a block diagram of a simplified embodiment of FIG. 20. In this embodiment, there is illustrated a situation wherein the non-system transaction node 2002 can do nothing more than access the router 136 and transfer information thereto. As such, the router 136 must have some type of ID process, indicated by block 2202, by which to recognize the non-system node 2002 and associate the transaction packet therewith, which involves the use of a form ID, as described hereinabove. Once the transaction packet is created by the router 136, then the transaction packet is routed to the conversion server 150 and a conversion process, as indicated by block 2204, is run and the information received from the non-system node 2002 converted to the appropriate format to complete the transaction.

Figure 23:
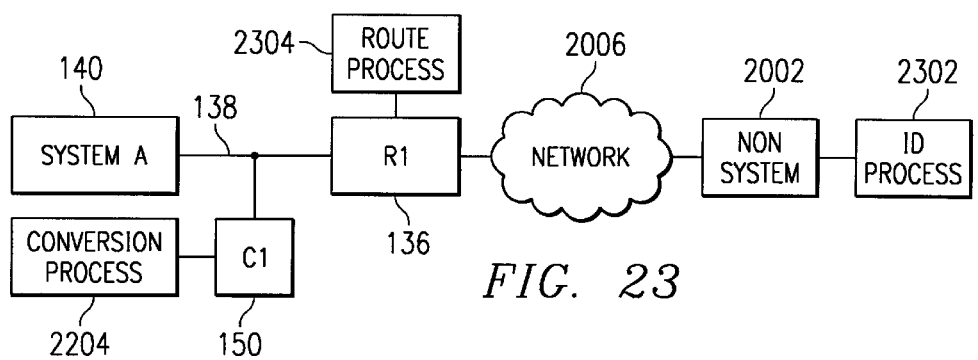
FIG. 23 illustrates an alternative embodiment of the embodiment of FIG. 22.

Referring now to FIG. 23, there is illustrated an alternate embodiment of the embodiment of FIG. 22, wherein the non-system transaction node 2002 has software associated therewith that allows it to form the transaction packet. The non-system node 2002 has an ID process block 2302 associated therewith that allows the non-system node 2002 to create a transaction packet. The non-system node 2002 has a definite ID on the system which has been defined in the original setup wherein the ID process in block 2302 was created and "pushed" out to the non-system node 2002. Whenever a transaction is to be implemented, the ID process is run and a transaction packet assembled. This transaction packet is then forwarded to the router 136, in accordance with information in the transaction packet. This is due to the fact that the transaction packet created by the ID process 2302 has a channel ID and the such contained therein.

Once the router 136 receives the transaction packet, it recognizes this transaction packet as one that exists on the system and routes it in accordance with a routing process in a process block 2304. Thereafter, this transaction packet is modified, if necessary, and routed to the conversion server 150 for processing thereby. The routing to the conversion server 150 is in accordance with the channel definition set forth in the ID process 2302. Thereafter, the information is processed as described hereinabove with respect to FIG. 22.

ID Packet

Figure 24:
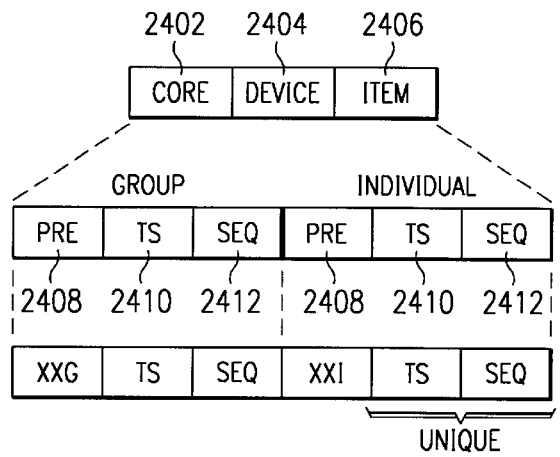
FIG. 24 illustrates a more detailed diagram of the data packet.

Referring now to FIG. 24, there is illustrated a more detailed diagrammatic view of the ID packet that constitutes the proprietary portion of a transaction packet that is transferred over the network, it being noted that this ID packet is typically embedded within a data transmission between the network with all of the commensurate overhead associated with such a transfer. As was described hereinabove, this ID packet represents the smallest fixed length portion of a transaction packet.

The ID packet is divided into three sections, a core ID section 2402, a device ID section 2404 and an item ID section 2406. Each of the sections 2402–2406 are divided into two sections, a "Group" ID and a "Individual" ID section. A detail is illustrated of the core section 2402. Each of the Group and Individual sections are comprised of three sections, a preamble section 2408, a time stamp section 2410 and a sequence section 2412. As described hereinabove, the preamble section 2408 comprises a classification section that is comprised of a plurality of "classifiers." The time stamp section 2410 and the sequence section 2412 provide a unique value that, when associated with a classifier section 2408, provides a unique group value for the core section 2402. The Individual section is also organized as such. In the preamble section 2408 of the Group section, it can be seen that there are a number of classifiers associated therewith. Of these, one classifier will always be the classifier "G." There can be multiple other classifiers, it being understood that the number of classifiers is finite. As will be described hereinbelow, each of these classifiers is comprised of a single alpha character, there being twenty-six alpha characters, each of which can be represented by an ASCII value which is a finite length value. Of course, this limits the number of values to twenty-six for each classifier field. There could be any type of value system utilized, it only being necessary that the field be a fixed length. For example, if the field were defined as a digital word having a four bit length, this would provide $2^4$ values. With respect to the preamble 2408 on the Individual section, this also has a finite number of classifier fields, one of which will be the classifier "I" designating this as an Individual ID.

The core ID 2402, device ID 2404 and item ID 2406 are illustrated in Table 1 as follows:

TABLE I

| CORE (WHO) | DEVICE (WHERE) | ITEM (WHAT) |
| --- | --- | --- |
| Corporation or Entity | Assignee of the Packet, e.g., computer, phone, etc. | Object, e.g., article, net address, real estate property, etc. |

The core ID 2402 is directed toward the basic owner of the ID packet. This, for example, could be a corporation, such as Corporation ABC. The device ID is associated with the device that assigned the values in the packet. For example, this could actually be the ID of the computer, the phone, etc. that actually was responsible for assigning the packet. The item ID is the subject of the data packet or the object, i.e., an article of commerce, a network address, a real estate property or the such. This is referred to as the "Who, Where, What" aspect of the ID packet. For example, Corporation ABC is originally defined as the owner of the ID packet. A unique core ID is initially associated with the ABC corporation wherein a defined classification preamble 2408 is associated therewith and then a unique time stamp and sequence number. This classifying preamble 2408 may actually be identical to the classification associated with other corporations in the system. However, once the time stamp and sequence number are associated with the preamble 2408, this core ID becomes unique as to that corporation or entity against others. When an object or item is being incorporated into an ID packet, i.e., an ID packet is being created to uniquely define that item in the system, there is some device on the system that actually creates this ID packet. For example, it might be that a catheter is being uniquely defined in a company. There will be possibly a computer terminal on which the information is entered. This computer terminal has an ID in the system and it is this ID that comprises the device ID. Therefore, once the ID packet is created, the entity (corporation) then owns the ID packet. The object, i.e., the catheter, is classified and is also known which device assigned the ID packet or created the ID packet.

Figure 25:
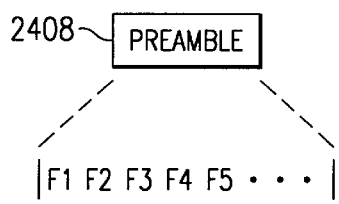
FIG. 25 illustrates a detail of the preamble of the data packet.

Referring now to FIG. 25, there is illustrated a more detailed diagram of the preamble 2408. The preamble 2408, as described hereinabove, is comprised of a plurality of fields. These are referred to in FIG. 25 as "F1, F2, F3, F4, F5, . . . " There are a fixed number of fields for the preamble 2408 which, in the present disclosure, are fixed for each Group ID and Individual ID for each of the core, device and item IDs. However, it could be that the fields differ between preambles, the only requirement being that they do not differ between ID packets. A typical five field preamble section of an ID is illustrated in Table 2 as it exists in the database, understanding that more fields may be incorporated.

TABLE 2

| F1 | F2 | F3 | F4 | F5 | TS/SEQ | CONTENT |
| --- | --- | --- | --- | --- | --- | --- |
| A | B | Z | C | W | XXXX | — |
| C | T | Q | I | C | XXXX | — |
| F | L | A | K | L | XXXX | — |
| G | M | B | R | S | XXXX | — |

With reference to Table 2, it is described hereinabove that each field has an alpha character associated therewith. This alpha character has a predefined relationship for the classifier. For example, if a field were associated with the type of ID, there could be two values, one associated with a permanent ID and one associated with a joiner ID. This would therefore be a field having only two values. It could be that this utilized the alpha characters "P" and "J." However, it could use any alpha character (number, character, symbol, etc.), it being recognized that the value or relationship (meaning) of the characters is unimportant; rather, it is the relationship of that packet disposed in other locations in the system that is important. In TABLE 2, it can be seen that the database associated with a particular ID has associated therewith the fields in the preamble, the time stamp/sequence field (TS/SEQ) section in addition to a content column. The content column defines what this preamble is associated with. For example, if this were the Group ID in the core ID 2402, then this could refer to, for example, a content of "chemical corporations." If this were Corporation ABC, then the Individual ID would have a preamble field that might be common with other individual corporations but the TS/SEQ section would be unique only to that corporation and the content associated with that particular corporation would have the term "Corporation ABC" in the content column. It may be that there are ten corporations that have identical preambles but different TS/SEQ values and, therefore, the core ID 2402 would be unique to that corporation. Each of the Group ID and Individual IDs for the core, device and item IDs in the ID packet would be configured similarly.

As will be described hereinbelow, although each of the fields in the preamble 2408 is defined as having only 26 values due to the choice of an alpha character as the classifier, one of the fields can be combined with the TS/SEQ value to provide a larger value associated therewith. Since the TS/SEQ value can comprise a unique and very large number, it does not constitute a classifier as such. By combining the twenty-six alpha numeric values each with the TS/SEQ value, the number of classifiers for that particular field becomes very large. For example, if one wanted to define a field in the preamble for the item ID 2406 as the field that defines the item, more than twenty-six item classifiers can now be provided. As a simple example, it could be that there are a plurality of catheter types in a company such as a pulmonary catheter, a cardiac catheter, etc. If there are more than twenty-six of these types of catheters, there would be required more than twenty-six classifier values. By combining an alpha character with the time stamp, the number of available classifiers can be increased in value.

Figure 26:
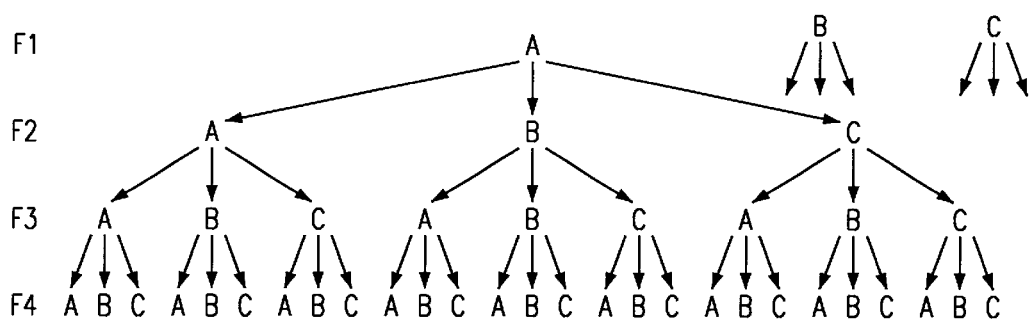

Referring now to FIG. 26, there is illustrated a diagrammatic view of the classification scheme. There are illustrated four fields that are being classified in a preamble, it being understood that more or less fields could be defined for the preamble structure, with only three values illustrated for each field. However, each of these values can be conditional upon the previous path, as will be described hereinbelow. In the field F1, there are illustrated three classifier values, A, B, C. The classifier of interest in field F1 is "A." There are illustrated three paths from this classifier, since field F2 is only associated with three classifiers, these being again, A, B, and C. It should be understood that the classifications being associated with the classifier A is not necessarily the same classifier associated with the classifier A in field F1. Also, the classifier B in field 1 may also point to three separate classifiers A, B and C in field F2. However, it should be understood that the classifier A in field F2 that the classifier B in field F1 could point to may not be the same as classifier A in field F2 pointed to by the classifier A in field F1. The classifier in any one of the fields below field F1 has a value that may be conditioned upon the classifier in the previous field from which it derives. It can be seen that each of the classifiers in field F2 will point to one or more classifiers in the next field F3, there being illustrated three, A, B and C. Further, field F4 further expands this will three classifiers, A, B and C for each of the classifiers in field F3. Again, although there are illustrated as multiple classifiers A in field F3, they are not identical in value or classification function but, rather, they are unique to the associated path.

With reference to FIG. 27, there is illustrated a single path through a given preamble of a field width of four. In the Group ID, for example, the preamble may be classified as "A" in field F1 and it may point to classifier "B" in field F2. Although the path could go to classifiers "A" or "C" only one path is selected. At field F2, classifier B points to classifier "A" in field F3 and classifier "A" in field F3 points to classifier "B" in field F4. Therefore, once it has been determined that field F1 has classifier A, then the next determination must be which of the classifiers in field F2 associated with classifier A in field F1 will be selected. It is this association of classifiers in a lower field with those in an upper field that defines the classification scheme. Again, it could be that classifier "B" in field F1 could point to a classifier "B" in field F2 that is different than that associated with classifier "A" in field F1. However, it could be that some fields have identical classifiers for each of the above fields. For example, in the Group ID, the last field will always be "G" defining the Group ID as such (not a conditional classifier.) The individual ID will always have a "I" in the last field thereof defining it as such. Therefore, there need not be any association between fields though there can be an association. With respect to the Individual ID, this follows the same path as the Group ID with the exception that it is defined as having values of "D," "E," and "F."

The ID that is generated will be stored in a table in the database of the ID server with alpha titles that can be searched, in association with the code associated therewith. A typical table in the database is illustrated in Table 3. In Table 3, the field F1 is associated with an ID that is either a permanent ID or joiner ID. This is referred to as P/J in one column, this is defined as a permanent or joiner field with the code associated with the permanent field being a "P" and the code associated with the joiner field with the joiner value being a "J." The second field F2 is associated with different types of devices are Individual IDs or Group IDs, defined, in this embodiment as a profile type, a network type or a system type. Therefore, the one column will define the type as being profile, network or system and the code associated with the profile type will be "F," the code associated with a profile type would be "P," with a network type would be "N" and with a system type would be "S." Field F3 is associated with an item which could be a type of computer such as an Apple computer, an item such as a catheter, a URL for a network address or the name of a system such as AVC or with a system referred to as a PPLL, this basically being an acronym for some type of system in the industry, as an arbitrary example. In this example, the code is the combination of an alpha character plus the time stamp for that row, to provide a large number of values therefor. In field F4, this is the category of the ID which, in this example can either be a core ID or a vendor ID. If it is a core ID, it will have a code of "C" and if it is a vendor ID, it will have a code of "V." There will also be a time stamp associated with each row. It can be seen that there are two IDs having identical values in all of these fields with the exception that field F3 is associated with different catheters. As such, the code value would be distinguishable between the two because the code P+TS is associated with a different time stamp. This is what makes these two IDs distinct, even though they are associated with the same item, they are both vendor IDs, they are both permanent IDs and they are both profile IDs. By utilizing the time stamp in association with a alpha character, a much larger number of items can be defined for this particular field.

Referring now to FIG. 28, there is illustrated a diagrammatic view of the method in which the data packet is created and the database populated with the data packet. Initially, a profile screen 2802 is provided which provides a plurality of user modifiable fields 2804 that allow the user to insert information. Each of these fields is utilized for the classification operation. Sometimes, this is an interactive system wherein inserting information into one field will result in another type of field being made available. For example, if somebody were classifying a data packet as being associated with a network, it might be that the URL of the network were provided as a possible input for another classifier, whereas that particular classifier, the URL, might not be appropriate for a previous classifier.

Once the user has inserted all of the necessary information, then the flow would move to a block 2806 wherein the information that is input by the user would be classified into the preamble of the appropriate ID in the data packet. This, as described hereinabove, would be required in order to classify all of the IDs in the ID packet. For example, when filling the profile, a corporate name would be specified which automatically would pull up the core ID for that corporation. Of course, the device that is being utilized to fill in the profile would already be known and would constitute the device ID. The remaining portion of the profile 2802 would be utilized for the purpose of providing the item profile. The classifier would assemble all of this information and then flow to a block 2808 wherein the data packet is populated and the database is populated, as indicated by block 2810. This population of the database would provide information associated with the ID packet, as set forth in Table 3, such that all of the information necessary to identify a ID packet is contained therein. Table 3 is as follows:

TABLE 3

| F1 | | F2 | | F3 | | F4 | | |
|---|---|---|---|---|---|---|---|---|
| P/J | Code | TYPE | Code | ITEM | Code | CATEG | Code | F5 |
| Perm | P | Profile | P | Apple | D + TS | CORE | C | — |
| Perm | P | Profile | P | Cath | P + TS | VN | V | — |
| Perm | P | Profile | P | Cath | P + TS | VN | V | — |
| Perm | P | Network | N | URL | P + TS | VN | V | — |
| Perm | P | System | S | AVC | A + TS | VN | V | — |
| Join | J | Profile | P | Cath | Z + TS | CORE | C | — |
| Join | J | Profile | P | Cath | F + TS | CORE | C | — |
| Join | J | Network | N | URL | L + TS | VN | V | — |
| Join | J | System | S | PPLL | N + TS | VN | V | — |

As such, the ID packet now provides a method to "point" to a specific row in the database, due to the fact that all of the preambles and the time stamps exist. Although Table 3 illustrated only a single ID in the ID packet, it should be understood that each ID packet is represented by all of the IDs, which comprise a single row in the database. This database is typically populated at the ID server and then the ID server, as described hereinabove, "pushes" all of the ID packets in the database to the respective account servers such as the conversion server, the router, etc. Also as noted hereinabove, some of these ID packets could identify processes. In this situation, it might be that all of the information in the database and an ID server need not be transferred to each and every one of the accounts such as the conversion server and the router. Only the information associated with data packets that would be processed or handled by that particular server would be required at the conversion server, router, for example.

Referring now to FIG. 29 there is illustrated a flow chart depicting the operation of entering a profile. The program is initiated at a block 2902 and then proceeds to a block 2904 to enter the profile, this typically performed by a user. It could be that, additionally, a profile that is received in the form of a filled out "form" that is provided by some input device from a non-system user. That is, for example, ordering a product from a system node in a transaction. If the profile already exists, as determined by a decision block 2906, then the program will flow to a function block 2910 to use an existing ID. However, if the ID does not presently exist, the program will flow along a "N" path to a function block 2912 wherein a time stamp will be applied and then to function block 2914 where a sequence number will be assigned. Typically, if this particular device is creating new packets, a different sequence number will be attached to the various time stamp in a predetermined sequence. However, this could be a random sequence. The program then flows to a function block 2916 to store the ID and then to a decision block 2918 to determine if more profiles are to be entered. This is also the destination of the function block 2910. If more are required, the decision block 2918 will flow back to the input of function block 2904 and, if not, the program will flow to an End Block 2920.

Referring now to FIG. 30, there is illustrated a diagrammatic view for defining a single ID in an ID packet. This ID is associated with the profile for a butterfly catheter. This typically will be the item ID. There are provided, for example, six fields, the first associated with whether it is a permanent or a joiner ID, defined by a "P" or a "J," a second field associated with whether it is a profile, which is indicated by "P," an item type defining what type the item is, indicated by a word as a user would input it, a fourth field associated with the actual item, i.e., that it is a butterfly catheter (the lowest classification), a fifth field for the overall type of ID packet, this being an "ID" packet, indicated by an "I," indicated by "C" or a "V," respectively, and a sixth field associated with the type of ID it is, an Individual ID, "I" or a Group ID "G."

In the first profile input, the user indicates it as being a permanent ID, a profile and types out the word "catheter" for the item type, and types and the word "butterfly" of the item that it is associated with an ID, "J," and that it is an item ID indicated by an "I." The term "catheter" is associated with an alpha letter "C" and the word butterfly is associated with the letter "B." When this is first created, the ID that is generated is "PPCBITS/S." The second item that is entered is identical to the first one in that the user indicated this as being a butterfly catheter. The system will recognize all of the first three and last two classifiers as being identical to others in the system and it will also recognize that the term "butterfly" as identical to a previous one that was entered. This type of search during the classification operation is performed by actually looking at the database in the non-coded column for the particular word in the field. This essentially looks at the spelling of the word. Since the spelling is the same as a previous one and the first three and last two fields are the same, then this will be identical to an ID packet that exists and a new ID packet need not be created. However, suppose a situation occurred where the user misspelled the term "butterfly" as "butterfly." In this situation, the database search would not turn up this misspelling (this is assumed that the system does not have some type of spell check to allow adaptability to this type of situation) which basically determines this as a new item in the database. As such, a new alpha character will be associated with the item field, i.e., the fourth field, which is the alpha character "L" associated with the time stamp and this will comprise a new row in the database. For the last example, suppose that the item that is to be classified as a butterfly catheter with the correct spelling, but that the fifth field is a pulmonary description. In this event, this will be a different ID and may actually result in a different alpha character for the fourth field associated with the item. As illustrated, this can be assigned as an alpha character "P," which may be different, but it uniquely identifies this as a different item associated with a pulmonary catheter. However, it is the time stamp that makes it unique even if the same character is used.

Figure 31:
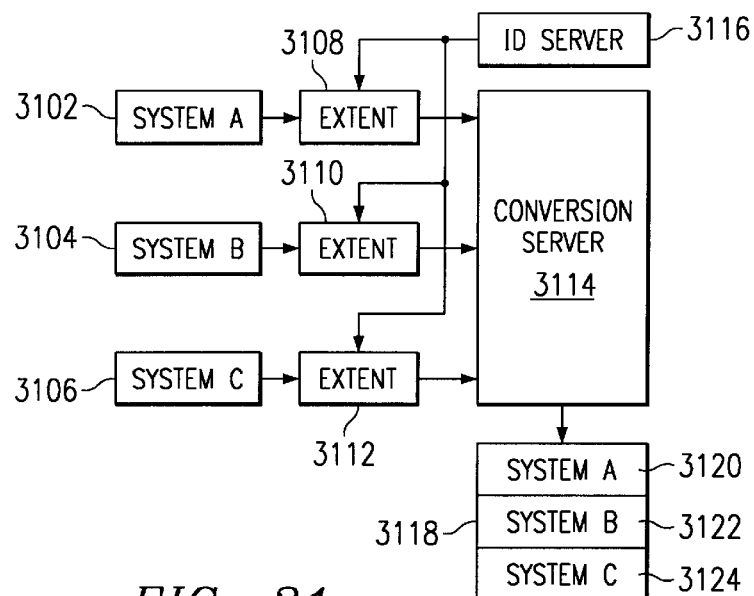
FIG. 31 illustrates a block diagram for layering of data packets.

Referring now to FIG. 31, there is illustrated a diagram of a system for layering data packets received from different systems that are potentially "non-like" systems. There are illustrated three systems, a system 3102, a system 3104 and a system 3106, labeled system "A," "B" and "C," respectively. Each of these systems operates in a different environment and may actually have a different database structure. For example, one might utilize an Oracle database with a specific and clearly defined database structure and another system might utilize a different database structure. Each of these database structures is an independent structure with possibly separate methods for identifying vendors and the such, i.e., there can actually be a different vendor number in each system for the same vendor or a different product number for a common product. However, in the overall system utilizing the ID packets, there can only be one common ID for a packet associated with any vendor or item. For example, if a field were present for an employee number associated with an employee, a field present for the days worked and a field present for the days out of the office, each of these particular types of data would be reflected in a different format in each database. Therefore, a specific employee number from one database would have to be converted into an ID packet format for the master system such that both systems employee number could be recognized, categorized and analyzed, or transferred from one system to the other.

The manner for converting data and information in one database to the master system is provided by the extensions referred to hereinabove as "Extents," that provide a software program for retrieving information from the non-master database and converting it to ID packets from the master system. System 3102 has associated therewith an Extent 3108, system 3104 has an Extent 3110 associated therewith and system 3106 has an Extent 3112 associated therewith. Each of the Extents 3108 is operable to retrieve the data and forward it to a conversion server 3114 as ID packets. The interface connection between the Extents 3108–3112 and the conversion server 3114 are illustrated as separate connections, but they are actually transferred through the network. Additionally, there could be multiple inputs to the conversion server from different networks.

Each of the Extents is interfaced to an ID server 3116, which ID server 3116, which ID server 3116 is operable to "push" IDs for various items and the such to each of the associated Extents. For example, if system 3102 had associated therewith database information that was to be converted over to an ID packet out of the ID packets associated therewith would be stored in the Extent 3108. When initially set up, system 3102 would recognize for example, that each employee in its database required a separate ID packet to uniquely identify that employee. These would be set up by the ID server 3116 and pushed to the appropriate Extent 3108. Therefore, whenever system 3102 transferred an employee number as part of a data transfer to the conversion server 3114 or any other account server on the system, it would be processed through the Extent 3108 and the appropriate ID packet generated, i.e., extracted from the associated ID packet table of the Extent 3108, and then forwarded to the conversion server 3114. In the example of FIG. 31, the conversion server 3114 is illustrated as the destination of the information for the purpose of layering, as will be described hereinbelow. However, it should be understood that all of the data will first go to a router and then to the appropriate account server, if necessary. The illustration of FIG. 31 is simplified for this example.

When data from system A is received for a particular conversion operation, it is stored in a database 3118 in a first location 3120. All the data from system 3104 is associated with a location 3122 and all the information from system 3106 is associated with a location 3124 in database 3118. This information is layered, such that common ID packet types, such as employee numbers, are arranged in a predetermined format. This is illustrated in a Table 3126, which is organized to illustrate four ID packets, IDP1, IDP2, IDP3 and IDP4. IDP1 may be employee numbers which are arranged in three locations, such that they all are in a common column. It should be understood that each of the IDPs can be different for employee numbers, i.e., each employee has a separate distinct ID packet. As such, if system 3102 and system 3106 both had the same employee in their database, they would have a common ID packet associated with the ID server 3116, this being set up initially. It can be seen, therefore, that the layering system allows a transaction or an analysis to pull data from non-like systems, convert it to like data in an organized structure and dispose it in a common table that will allow analysis thereof. An example of this will be described hereinbelow.

Figure 32:
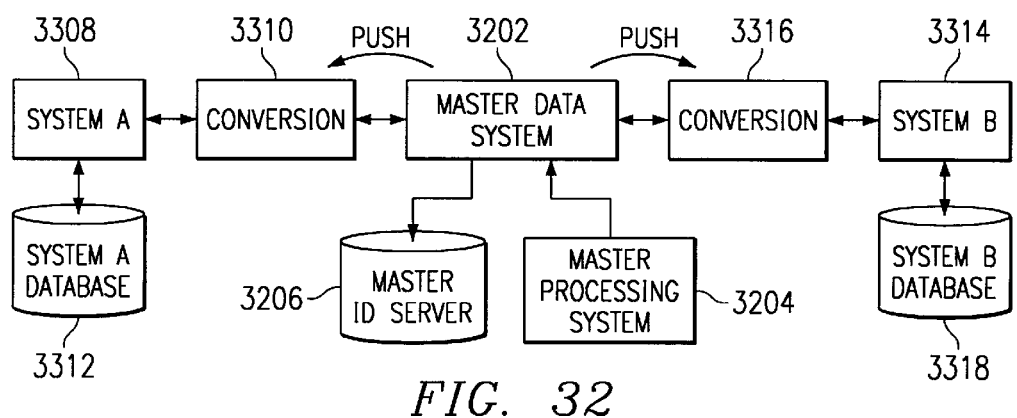

Referring now to FIG. 32, there is illustrated a diagrammatic view of the transaction system for utilizing ID packets to converse between two systems through a master space. As described hereinabove, this master space includes the router, the network mesh, the core servers, the ID server, etc. that are required to process data packets. In FIG. 32, this system is illustrated with a block 3202 that defines the master data system. The master data system is essentially a system that receives, routes and operates on data packets to perform processes, etc. As described hereinabove, each of these ID packets constitutes a pointer to some process associated with traversal of information through the master data system 3202 from an origination point outside the system to a destination point outside the system through the master data system 3202 or to a point within the master data system for processing thereof. This processing system is referred to with a block 3204 which is operable that is also provided a master ID server 3206 that contains the ID packets that are operable with the system, these referred to as internal ID packets. These are differentiated from external ID packets for an external system, which is not disclosed herein.

There is provided an external system 3208 that interfaces with the master data system 3202 via a conversion block 3310, system 3308 having a local database 3312 that is associated with its native database language or structure. Similarly, there is provided a second system 3314 that is interfaced with the master data system through a conversion block 3316 and has associated therewith a native database 3318. In order for system 3308 to interface with system 3314, it is necessary to extract data, convert it to an ID packet that is compatible with a master data system 3202, process it therein and then route it to system 3314 through the conversion block 3316, at which time it arrives at system 3314 in a structure similar to the native database 3318. This allows non-like systems to communicate with each other as long as they have a common space to go through.

In order to operate in this manner, there must be some type of conversion to the master data space. This is not necessarily defined by the system itself, but, rather, the master data system 3202 through its ID server 3206 defines the manner by which each system will communicate therethrough. As such, this is a push operation with the in definition. Not only are the parameters of the definition assigned, but the actual ID packet that is communicating therebetween. For example, there may actually be a common item, such as a catheter, that exists in both databases. By having this information determined by the master ID server 3206, an ID packet can be generated in the master ID server 3206 and associated with the same items in the two different databases 3312 and 3218. As such, it is important that the master ID server be able to identify the ID packet and associate it with the same item in two different databases such that, when pushing the ID packet to one of the systems, it also pushes the associated relationship to information in the database 3312 or 3318. For example, an employee number in database 3312 has a certain format and value that is set up in the master ID server 3206 as being related to a specific ID packet. When the ID packet is transferred to the conversion block 3310, it is associated with its value in the database 3312. Therefore, whenever the value in database 3312 is sent to the conversion block 3310, this value acts as a pointer and the appropriate ID packet can then be forwarded to the master data system 3202.

Referring now to FIG. 33, there is illustrated an alternate embodiment of the embodiment of FIG. 32. In this system, there are provided two systems, a system 3302 and a system 3304. System 3302 has associated therewith a master data system 3306 and a master ID server 3308. System 3304 has associated therewith a master data system 3310 and a master ID server 3312. There is provided one external system, system 3314 associated with system 3302 in a conversion block 3316 disposed between system 3314 and master data system 3306. There is associated in a local database 3318 with system 3314. ID server 3308 is internal to the master data system 3306. Therefore, whenever system 3314, which is part of system 3302, communicates with master data system 3306, it will use internal ID packets associated with the ID server 3308, as described hereinabove. However, when conversing with master data system 3310, the ID packets are different, they are those associated with ID server 3312, these being external to system 3302. Therefore, master data system 3306 has stored in ID server 3308 external ID packets associated with the external side of the system, i.e., all other systems that are external thereto.

System 3304 has associated therewith an external system node 3320, which communicates with master data system 3310 through a conversion block 3322 and also has associated therewith a local database 3324.

When a transaction occurs which requires information to be transmitted from system 3314 over to system 3320, a data packet will be generated for information in the local database 3318. For example, if a simple transaction such as an employee number was required to be transferred to system 3320 for operations thereon as a portion of a process, the employee number would be extracted from D database 3318 with the conversion block 3316, as part of the overall transaction. This employee number would be converted to an internal ID packet associated with system 3302. At the master data system 3306, information in the ID server 3308 would be utilized to determine the external data packet to be transferred to master data system 3310. As described hereinabove, it could actually be the ID packet associated with the employee number that resides in ID server 3312. Alternatively, it could be a joiner ID packet which is a negotiated ID packet between the two systems, such that the actual ID packet associated with the employee number in either of the systems 3302 or 3304 is not known to the other.

Once the ID packet, with a joiner ID packet, are transferred from master data system 3306 to master data system 3310, it is the processed in accordance with the transaction and transferred to the conversion block 3322 as the appropriate ID packet for that employee number. This is then converted to the format of database 3324 and processed by system 3320.

Referring now to FIG. 34, there is illustrated a diagrammatic view of an example of a transaction. In this transaction, it is desirable to have information about employees as to the number of days they worked and the number of days they did not work. This information is analyzed in the master data system 3202. Therefore, the first thing that must be performed is a conversion from the employee number to a data packet, the days in information to a data packet and the days out information to a data packet. The employee number has previously been determined through a profiling operation to be defined as a unique ID packet. Therefore, a relational database can be utilized to pull the employee number from a database that is associated with the conversion block. The days in information can also be a unique data packet. For example, there could be a unique data packet for the days in information for values from 1–364, each different. Alternatively, there can be a single ID packet associated with the days in field and then a collateral or ancillary value data field that could be transmitted after the ID packet, as described hereinabove with respect to variable length data. This is the same situation with the days out field.

The information is illustrated in a table 3402 in the native database. This is converted to a packetized value for a given row in a transaction packet. The first ID packet, IDPKT P, 3404 is generated to indicate the process that is being carried out, i.e., employee information regarding the days in and days out as being transferred to the master data system 3202 for the purpose of evaluating information in a particular process. This is followed by an ID packet 3406 labeled "IDPKT EM" for the employee number. Followed by that would be an ID packet 3408 for the days in. This is followed by an ID packet 3412 for the days out information. At the End of the information is provided a termination data packet 3418. This represents a single row of information being transferred, although it should be understood that the initiation of the process could constitute multiple rows and information in the form of an ID packet could be forwarded as a part of the transaction packet indicating the block size of the data that would be sent. This is then "stacked" in a stack 3420 such that it is stacked in a processing string as opposed to an organized data structure of columns and rows. Since the data is comprised of data packets, it is possible to place the data in such an organization.

Referring now to FIG. 34A, there is illustrated a diagrammatic view of how the database is populated with ID packets. It can be seen that there are two columns, one for employee and one for an ID packet that represents data in and data out. It can be seen that unlike data is stored in the second column, i.e., that the information regarding days in is different than that regarding days out in that it would normally be contained within different columns of a database. This facilitates the processing operation. Therefore, by utilizing ID packets, the ID packets can be assembled in single columns representing different data. Further, they can be assembled in the column in the sequence in which information is to be processed in the later analysis routine.

Core ID Generator

Referring now to FIG. 35, there is illustrated a diagrammatic view of the operation of generating ID packets in the system. There is illustrated a network 3502 which has associated therewith a generic host node 3504 and a generic account 3506. These two nodes are merely nodes that are disposed on the systems that require knowledge of various ID packets in the system in order to process various portions of a transaction. The ID packets are created in an ID packet generator block 3508, this interfaced to the network 3502. The ID packet generator block 3508 is actually a program that can be implemented at any node on the system. It is, as such, a functional element. It interfaces with an ID packet database 3510, which can also be disposed locally with the ID packet generator 3508 or at another location on the network. It is only noted that the ID packet database 3510 is associated with the functionality in the ID packet generator 3508, regardless of where the system that it resides.

Figure 36:
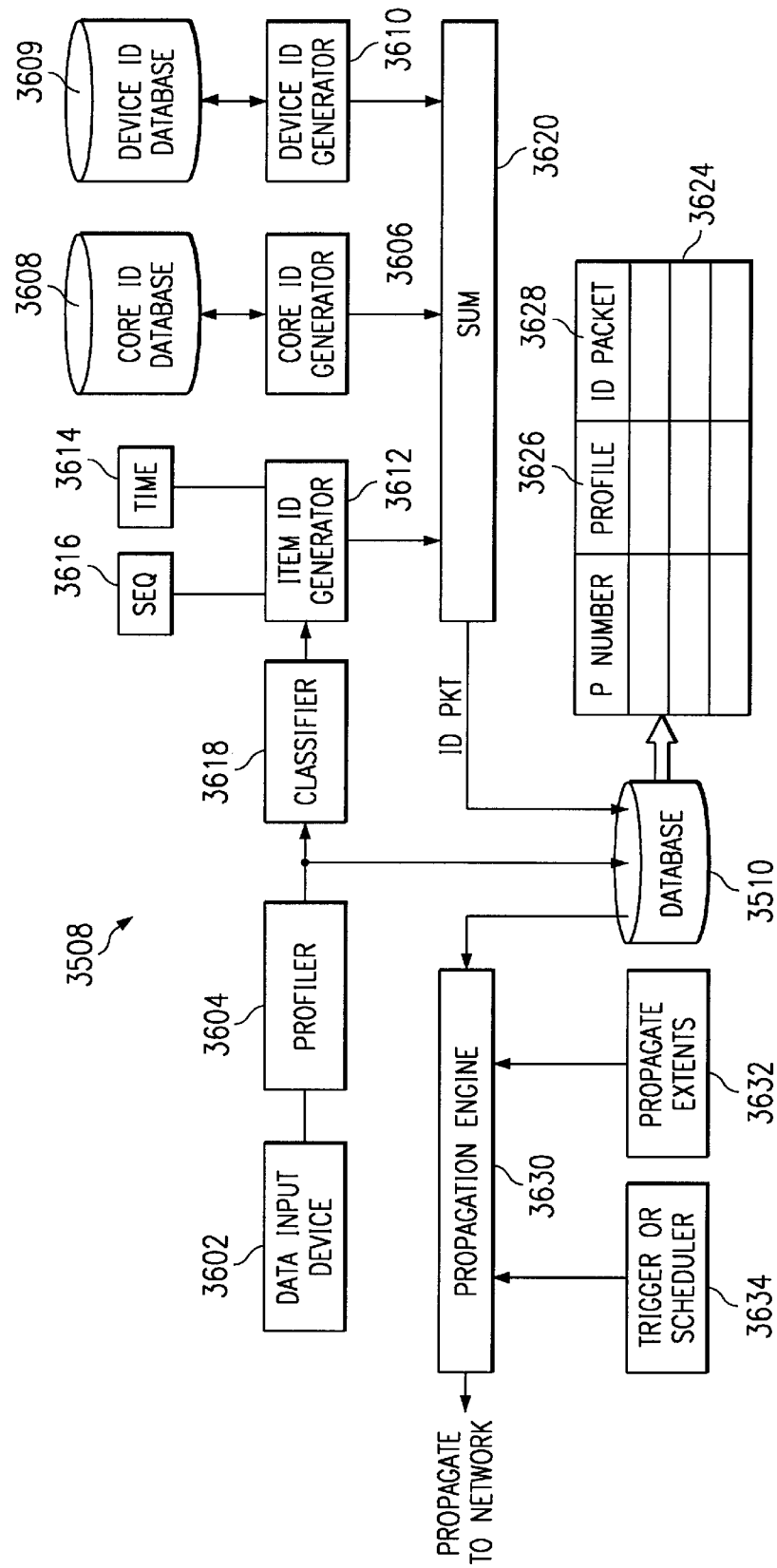
FIG. 36 illustrates a detailed diagram of the data profiling operation.

Referring now to FIG. 36, there is illustrated a more detailed diagram of the operation of the ID packet generator.

The ID packet generator 3508 is generally initiated with the input of a data input device 3602, this allowing an individual or corporation to input information to the system in the form of a profile in a predetermined format. As will be described hereinbelow, this profile is predetermined and sets various fields that are to be filled in by the individual inputting the data. This information is input to a profiler block 3604 which takes the information received from the data input device 3602 in the particular fields and associates it with a given profile format. There is typically a profile number associated with the profile, such that the fields can be input in a finite way.

The profiler 3604, as will be described hereinbelow, performs the classification associated with the creation of an ID packet. At each node in the ID packet generator 3508, there is provided predetermined information about the ID packet. This typically is information about the corporation that owns the node associated with the ID packet generator 3508 and the actual identification of the node at which the ID packet generator 3508 resides. Therefore, there will be provided a core ID generator 3606 that has the owner of the system, i.e., the corporation that is doing the ID packet generation operation, selected from a core ID database 3608. This will provide the first portion of the ID packet, this being the core ID. There will also be a predetermined device ID generated by device ID generator 3610, selected from a device ID database 3609. Although not illustrated, this would actually be generated in another classification operation, which is not described herein, but which is similar to that associated to the item ID that will be described herein.

In order to determine the item ID, this being the purpose for creating an ID packet and filling in the profile, an item ID generator 3612 is provided. As described hereinabove, the item ID generator 3612 is operable to generate the item ID, which is associated with a group ID and an individual ID. The group ID will typically be predetermined although it does not have to be, and then the individual ID must be determined as to its classification and as to its uniqueness. The uniqueness, as set forth hereinabove, is that associated with the time stamp, provided by block 3614 and a sequence, provided by sequence generator 3616. A classifier 3618 is provided that operates in conjunction with the profiler block 3604 to determine the classification of the item. This classification, in conjunction with the sequence and the time stamp, are combined together to provide an individual ID. The resulting item ID, as also described hereinabove, comprises a group ID and an individual ID.

Once the item ID has been generated, then the ID packet is generated by combining the item ID, core ID and device ID together with a summing block 3620. This is then stored in the database 3510 in conjunction with the profile information. Although the classifier 3618 can utilize the information in the input information provided to the profile block 3604, all this information may not be part of the classification scheme. As such, all of the information utilized to classify the item ID and the additional information not necessarily utilized therefor will be stored in a database in association with the created ID packet. This is illustrated by a table 3624 which is comprised of a profile number, associated with the profile that created the overall profile, profile information in a column 3626 and the associated ID packet in a column 3628. This is the information that typically will be transferred with the ID packet, i.e., when another node receives an ID packet and associated information, it could actually utilize the profile information associated therewith in the column 3626 to create a new ID packet, since this constitutes the bulk of the information.

Additionally, as will be described hereinbelow, information that was not classified would actually have links to other ID packets. For example, if the ID packet were utilized to classify a butterfly catheter, it may be that the classification system, at its lowest level, will only classify butterfly catheters. Additional information could be provided as to the color of the catheter. For example, if the butterfly catheter were red, thin, or the such, there would be provided a link to all ID packets having the word "red" disposed therein as any portion of the profile. All information in the profile is linked and not just the non-classified portion. In order to search the ID packet database, it would only be necessary to utilize the classification system to "drill down" to all ID packets associated with butterfly catheters to the classification preamble in the item ID (typically the individual ID in the item ID), and then filter this search with the links to the word "red." This will be described in more detail hereinbelow.

Once the ID packets have been generated, the second portion of the operation of the ID packet generator 3508 is the propagation operation. In this operation, various programs, referred to as "Extents," are initiated by a propagation engine 3630 to extract the appropriate Extent propagation algorithm from a storage area 3632 which will define how information is propagated from the database 3510 to various nodes in the network, it being understood that the node on which the ID packet generator resides could actually be a node to which ID packets are transferred. This propagation operation is performed via a scheduling operation or a triggering operation, as noted by block 3634. Therefore, there could be some external trigger or internal trigger that results in the propagation of information or could just be a scheduling operation. Once the trigger/scheduler has indicated that a particular Extent should be performed, i.e., there is a predetermined process initiated or launched, then select ID packets are propagated to the appropriate node. For example, it may be that a particular transaction requires certain portions of the ID packet database to reside at a conversion server and at the host node. When these ID packets are created, a propagation Extent will indicate that all data associated with a particular profile, for example, to be transferred to select ones of the nodes. Further, as will be described hereinbelow, there are process ID packets that can be generated and propagated in a similar manner. It is noted that not all ID packets are required at each node nor are all Extents (noting that the Extents are actually ID packet or groups of ID packets) required at each node. Therefore, this propagating Extent at block 3632 will define where the ID packets are transferred, this being for the purpose of carrying out the transaction at each respective node in the process/transaction path.

Referring now to FIG. 37, there is illustrated a flow chart for creating a profile. The program is initiated at a function block 3702 and then proceeds to a function block 3704 to pull up the select profile for interface with a user. Once the user has interfaced the profile, data is input to the profile, as indicated by a function block 3706, this information being input to select fields. Once the select fields have been filled in and the profile has been accepted, the program will flow to a function block 3708 wherein the device ID and the core ID will be fetched to provide the first two portions of the ID packet. The program will then flow to a function block 3710 to generate the classification portion of the ID packet. This may involve generating the classification portion for both the group ID and the individual ID. However, if only the item ID is to be classified, then only the classification portion of the individual ID of the item ID will be generated in the block 3710. The program then flows to a function block 3712 wherein the time stamp and sequence number are applied, rendering this ID packet as to the individual ID or the group ID or both. The program then flows to a function block 3714 to create the ID packet by assembling the device ID, core ID and item ID together. The program then flows to a function block 3716 to store the ID packet and the associated profile information in the database and initial copy in the block 3718.

The resulting data packet is illustrated in FIG. 37a in that the generated ID packet in the first field 3720 is associated with two types of information—standard information in a field 3722 and nonstandard information in a field 3724. Standard information is information that is generated for all items of the type profile being created. Of the standard information in field 3722, there are provided two regions, classification information which is required to form the preamble in the individual ID or group ID and nonclassification information which is information such as the color "red" associated with a butterfly catheter in the example described hereinabove that is not subject to classification, i.e., that is not required for the generation of the classification in the block 3710. There is also provided nonstandard information which can be stored in association with the ID packet in field 3720. This information constitutes items that only exist with respect to a creator system and may not be information that is defined or desired on a global basis. Effectively, this is similar to allowing a creator to add notes to a profile.

Referring now to FIG. 38, there is illustrated a flow chart for the operation of creating the ID packet, which is initiated at a block 3802 and then proceeds to a block 3804 to generate the item ID. It combines the classification generated in the block 3710 with the time stamp and sequence number generated in the block 3712. Once the item ID is generated, then the program proceeds to a function block 3806 to link attributes of the item, these creating an input in the profiling operation in block 3706. These attributes are linked to an entry in an attribute table. This attribute table links such things as "red" to all ID packets in the system with that attribute. Even though an attribute is utilized in the classification operation, this attribute is still linked to an attribute table. For example, there might be an attribute that is entered into the profile that is associated with classification and some that are not associated with classification. For example, a butterfly catheter may have a color associated therewith, such as red, yellow or green. This is not considered important enough to constitute a classifier. Paint, on the other hand may utilize this term "red" as a classifier. Therefore, the term "red" for both the butterfly catheter and the paint would be linked to the same attribute table. One could then search all item IDs that have associated therewith the color red, regardless of what they were. Once the attribute has been linked, the program then flows to a function block 3808 to assemble the core, device and item ID in the block 3714. The program then flows to a Return block 3810.

Figure 39:
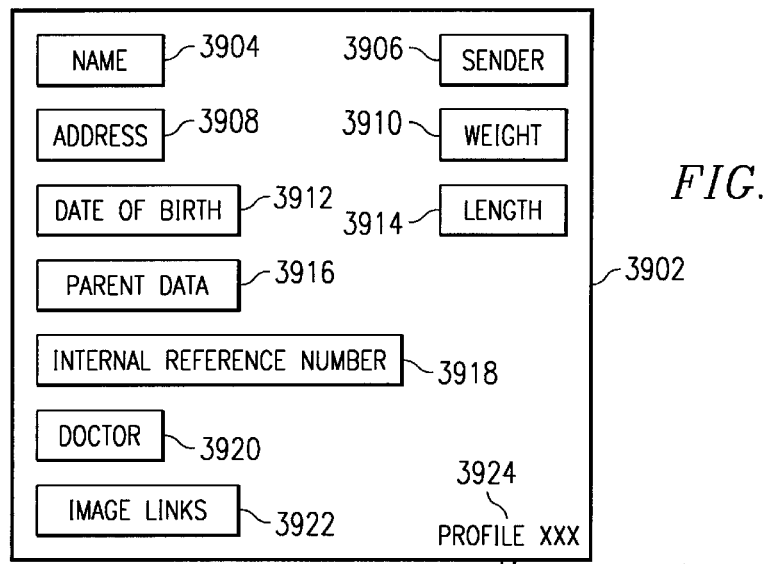
FIG. 39 illustrates a screen for the profile.

Referring now to FIG. 39, there illustrated a diagrammatic view of the screen that is presented to the user. There is provided a primary screen 3902 which has a plurality of fields associated therewith. The example in FIG. 39 is associated with inputting information regarding a new birth in a hospital. Each child is considered to be an item that has associated therewith a unique ID packet. Of course, the core ID would be that of the hospital, the device ID would be that of the actual device generated behind the packet, i.e., the unique device ID of the node generating the profile, and the item ID that is unique to the child. It should be understood that the group ID in the item ID would probably be the same for all children. The individual ID, on the other hand, would be unique to that particular child. Interestingly enough, there may be two children that have the same exact classifier, but that have a different time stamp and sequence number, i.e., they would therefore be unique. The difference is in the profile information that is associated with that particular individual. For example, there are provided a plurality of fields, one field 3904 for the name, a field 3906 for the gender, a field 3908 for the address, a field 3910 for the weight, a field 3912 for the date of birth, a field 3914 for the length, a field 3916 for parental data, a field 3918 for an internal reference number, this being an example of the nonstandard information that will be associated with a profile, a field 3920 for the doctor and a field 3922 for image links. Note that these image links would be non-standard information that would be links to images in a system and these links would not necessarily be desired by other systems. The primary profile 3902 has associated therewith a profile number 3924 that is associated with this profile in the system.

When this profile is initially created, there is provided a very long standard information profile 3926 that defines the standard information that must be associated with the child. For example, there is provided a device ID field 3928, a core ID field 3930 and a classification field 3932. This predetermines what the device ID and the core ID will be and also predetermines all or a portion of the classifiers associated with the item ID and/or the group ID. There may also be a title field 3934 for the title of the profile. Therefore, this standard profile template 3926 is utilized to create substantially all of the information needed to create the ID packet. In fact, if the classification is the same for all children, then the information in the profile screen 3902 would be non-classification information that would be considered standard information to retrieve (although some of this may be nonstandard information such as the internal reference number in the field 3918.) However, typically, there will be one or two classifiers that will not be standard for every child associated with the individual ID portion of the item ID. For example, it may be that there is a classifier for the ethnicity of the child or eye color.

It can be seen that all of the fields in the profile 3902 are defined fields and the information therein will be linked to the attribute table. For example, although gender in field 3906 may not be a classifier, it will be linked to the attribute table. Therefore, all ID packets having a profile with the term "female" associated therewith can be searched through the attribute table.

Figure 40:
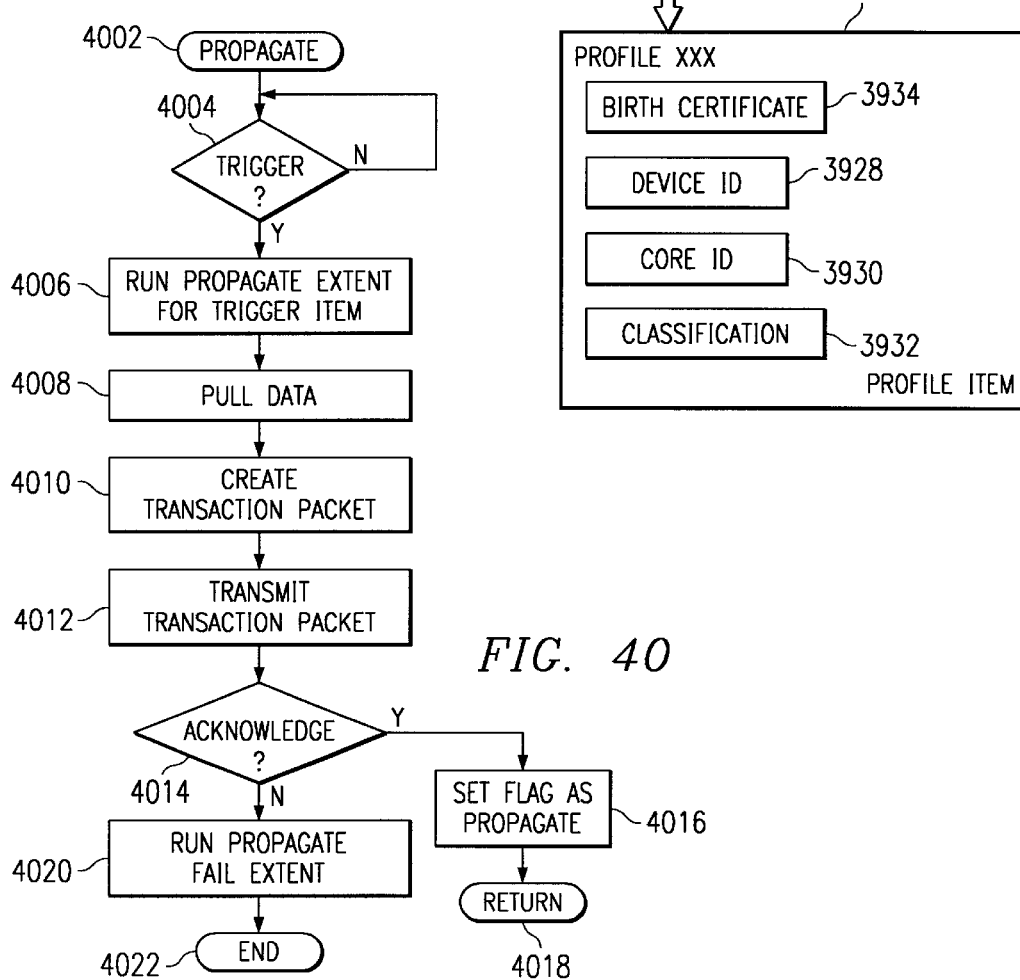
FIG. 40 illustrates a flow chart for the propagation operation.

Referring now to FIG. 40, there is illustrated a flow chart depicting the operation of propagating the ID packets, once created, to select ones of the network nodes or other locations in the system. The program is initiated at a block 4002 and then proceeds to a decision block 4004 to determine if a trigger operation has been received. This trigger operation can be an external trigger or it could be a scheduling operation determined by the scheduler. The program, once determining a trigger is present, proceeds to a function block 4006 to run the propagate Extent for the triggered item. As noted hereinabove, each processor transaction on the system may require a certain group or groups of ID packets to be associated with that transaction. These ID packets must reside on the appropriate node in the system to which the transaction will be relayed during the process. It is therefore important that the appropriate ID packets associated with either item IDs or process IDs or even network address IDs to be resident at the node once the transaction packet, in its original form or modified form, is transferred thereto. As such, this propagation Extent will be run for particular processes or groups of processes or various transactions.

Once the propagation Extent has been run, this propagation Extent will pull data from the database 3510, as indicated by a function block 4008. The program will then flow to a function block 4010 to create a transaction packet, which transaction packet is operable, in accordance with the operation of the Extent, to transfer ID packets to another location on the network. It is very similar to the situation described hereinabove wherein data is transmitted to a destination node. In this situation, the destination node is the node to which ID packets are to be transferred, this being data. It should be understood that, not only are ID packets transmitted, but the profile information associated with an ID packet is transmitted. As such, an entire row of the database 3510 will be transferred. And, therefore, it should be considered to be data. Once the transaction packet has been created, it is transmitted to the destination node, as indicated by function block 4012 and then the program proceeds to a function block 4014 to perform an acknowledgment operation and determine if the transaction packet has been received. This will be described hereinbelow. If so, the program will flow on the "Y" path to a function block 4016 to set a flag indicating that the data in the database, i.e., the updated ID packets or newly created ID packets, have been appropriately transmitted to the destination one of the nodes at which the ID packets must be stored. Once the flag is set, the program will flow to a Return block 4018. If acknowledgment has not been received, then the program will flow along the "N" path from decision block 4014 to a function block 4020 to run a propagate Extent indicating that there has been a failure of the propagation algorithm. This may result in a page or E-mail being sent to a technician or generation of a failure log or report. This will then be handed off to either an individual or another process to service. The program will then flow from function block 4020 to an End block 4022.

Figure 41:
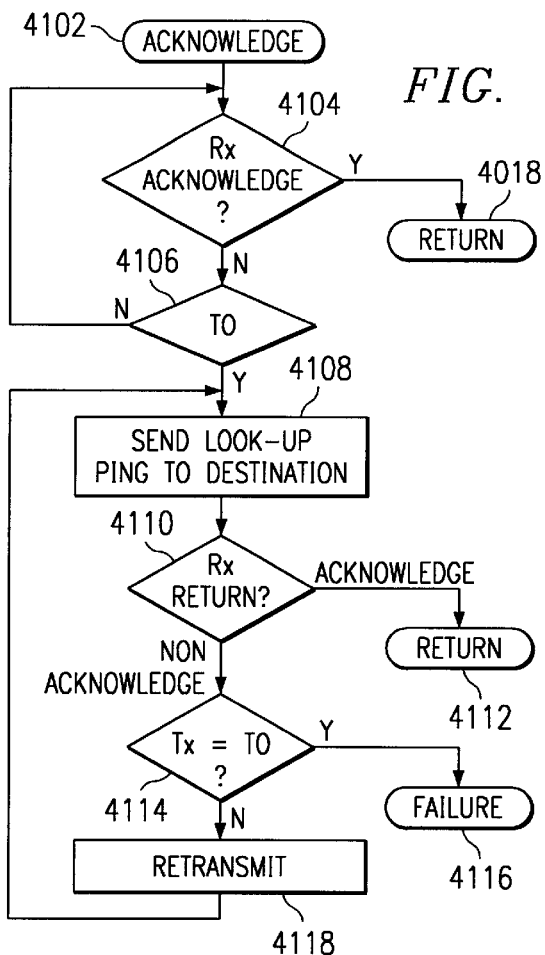
FIG. 41 illustrates a flow chart for the acknowledgment operation.

Referring now to FIG. 41, there is illustrated a flow chart depicting the operation of the acknowledgment operation in decision block 4014. This is initiated at a block 4102 and then proceeds to a decision block 4104 to determine if an acknowledgment has been received. If so, the program will flow along the "y" path to the Return block 4018 through the function block 4016 to set the flag (not shown). If, however, the acknowledgment has not been received the program will flow to a decision block 4106 to determine if a time out operation has occurred. The program will loop back around to the input of decision block 4104 until the time out has occurred, at which time the program will flow to a function block 4108 to transmit a look-up ping to each of the destination nodes, i.e., this being a "push" operation wherein the ID server that generated the ID packets and propagated the ID packets will determine whether they have been received by the destination node. Each destination node has a table that is created at the ID server that represents the ID packets that are disposed therein and the associated profile information. There is also provided a column indicating a flag representing the successful transfer or lack thereof. Therefore, each entry must have a "ping" sent to the destination node. This ping basically defines the address at the destination location, this being known at the ID server, which will determine if information has been received thereat. The program will flow to a decision block 4110 to determine if a return acknowledgment has been received indicating that the ID packet in fact resides at the ping address which is achieved by sending the principal address back to the ID server. If an acknowledgment is received, the program flows to a Return block 4112, substantially that equal to Return block 4018 indicating that the flag is set in the table and, if not acknowledged, the program will flow to a decision block 4112 to 4114 to determine if there is a transmission time out. If so, the program will flow along a "Y" path to a failure block 4116 and, if not timed out, the program will flow along an "N" path to a retransmit 4118 to retransmit the ping. Once retransmitted, the program will flow back to the end of the function block 4108.

When the ID packet is propagated, it is facilitated in two ways. First, the ID packet with profile information is sent. This would result in the ID packet constituting the primary "ping key." All that is necessary to send is the ID packet in order to determine the address at the destination. This destination address is then returned with the ID packet and stored at the ID server. In the second case, only the profile information is propagated. This requires a field in the profile to be defined as the ping key. For example, when sending information to a host system, it may not be desirable for the ID packets to be disseminated. In this situation only profile information is sent. For a vendor profile, the vendor name (or number) is the ping key, as defined when the profile is set up. The ID server transmits the profile information to the extent running on the host, which then has knowledge of which native tables in the host the information must be routed/linked to. Once transferred, then the destination address of the ping key (vendor name in this example) is returned for storage at the ID server. Since the ID server has knowledge of all the destination addresses (there could be more than one for each ID Packet), this facilitates system clean up. For example, if a vendor needed to be changed ro deleted, then the ID server as a central repository could repropagate the changes to all of the linked to destination addresses.

Figure 42:
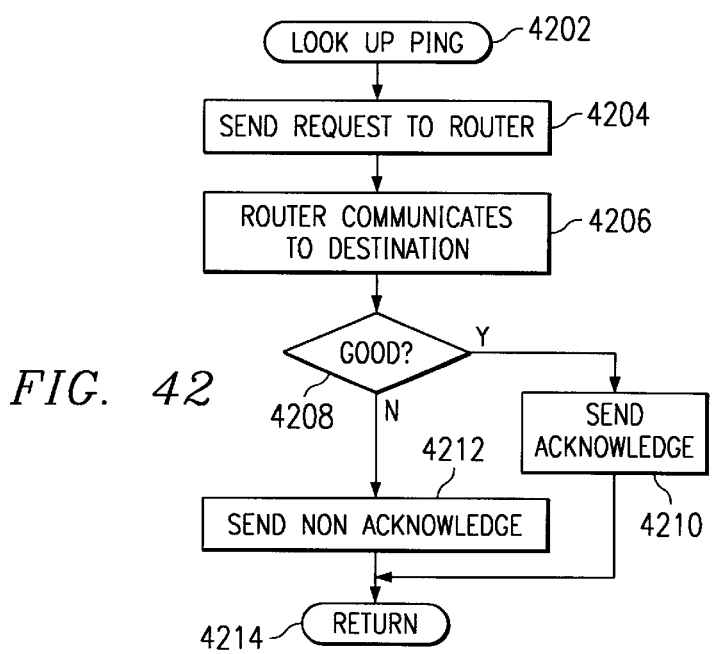
FIG. 42 illustrates a flow chart for the look-up ping operation.

Referring now to FIG. 42, there is illustrated a flow chart for the look-up ping operation, initiated at a block 4202. The program will then flow to a function block 4204 to send a request to the router, it being noted that the router is the first place that the ping will be sent. In the preferred embodiment, the request to determine if an address has been sent is handled by the router. The request is sent to the router and then the router communicates to the destination node, as indicated by a function block 4206. The function block makes a determination as to whether the transmitted ID packet and its profile information resides at the destination node. This is indicated by a decision block 4208. If it has been sent there, the program will flow along a "Y" path to a block 4210 to send an acknowledgment signal back to the ID server and, if not, a nonacknowledgment signal will be sent back, as indicated by a function block 4212. The program will then return, as indicated by a block 4214.

Figure 43:
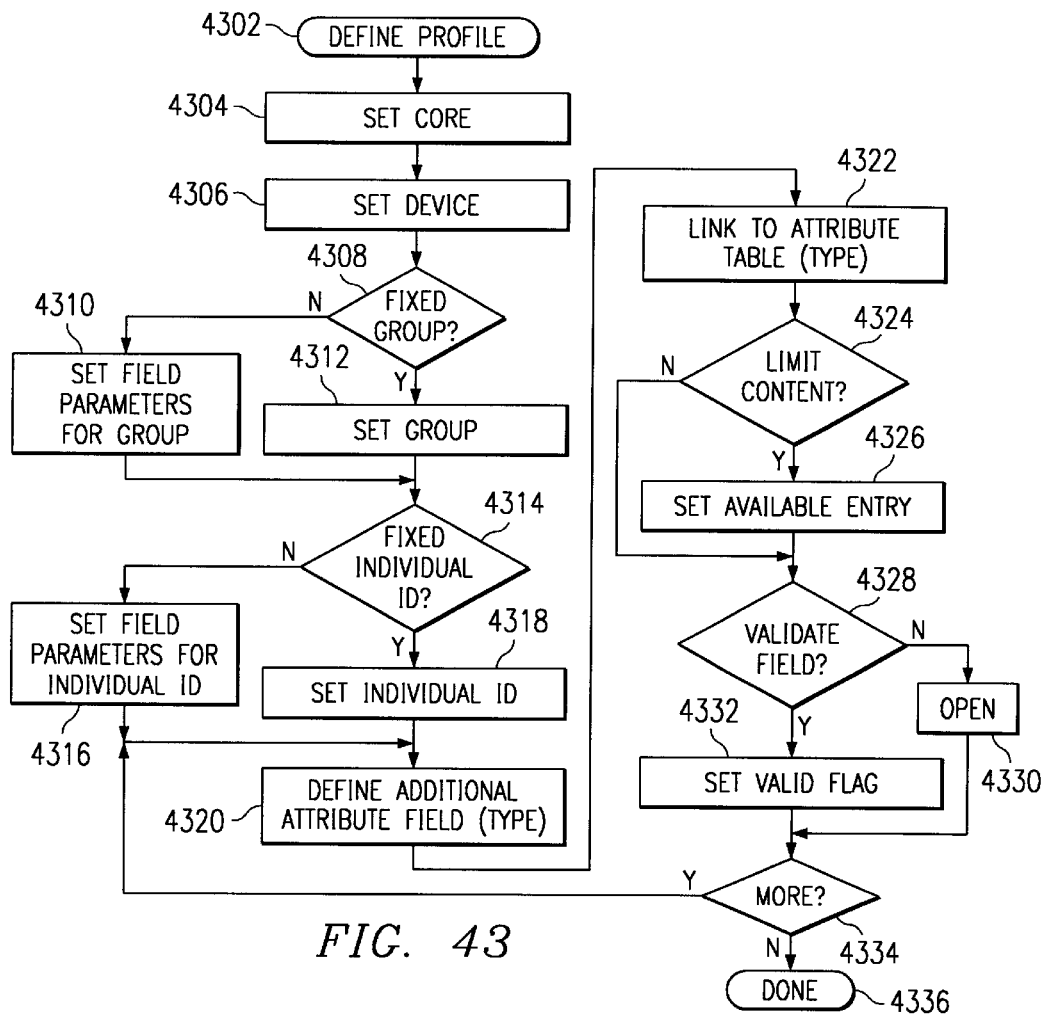
FIG. 43 illustrates a flow chart for the profile definition.

Referring now to FIG. 43, there is illustrated a flow chart depicting the operation of defining the profile. This is an operation wherein the overall templates for the profile are defined. This program is initiated at a block 4302 and then proceeds to a function block 4304 to set the core ID and then to a function block 4306 to set the device ID. The program then flows to a decision block 4308 to determine if the group ID and the item ID is fixed. If not, the program will flow to a function block 4310 to set the field parameters for the group. This is an operation wherein certain field parameters will be defined for the groups and, once filled in, they will set the classifiers for the group ID. If the group is fixed, the program will flow along a "Y" path to a function block 4312 wherein the group ID is set as a fixed item.

Once the group has been set, either as a fixed group ID or as a substantially fixed group ID (the group can either be a set item as to both the time stamp and the sequence or, if a parameter is to be set, then a time stamp and sequence would be added after the group ID classifier has been defined), the program will flow to a decision block 4314 to determine if the individual ID is fixed. As noted hereinabove, there may be situations wherein the item ID is always a set ID in terms of the classifiers. If the individual ID is fixed, the program will flow along an "N" path to a function block 4316 where the field parameters for the individual ID are set. These, as described hereinabove, describe the classifiers for the individual ID. If the classifiers for the field are set, the program will flow along the "y" path to a function block 4318 to set the fields for the individual ID in the classifiers. The program will then flow to a function block 4320, it being noted that, during the set up of the profile, the time stamp and sequence will typically be added for at least the individual ID portion of item ID.

At the function block 4320, additional attribute fields will be defined which are not a portion of the classification operation. These attributes will then be linked to the attribute table, as indicated by a function block 4322, the attributes linked being both the ones associated with the classification and the ones associated with the nonclassification operation. The program will then flow to a decision block 4324 wherein a decision will be made as to whether the content is limited, i.e., if a color were the type of field indicated by function blocks 4320 and 4322, i.e., the title of the field, then the content may be limited to a pull down menu of the multiple colors. If so, the program will flow to a function block 4326 wherein the available entry for that particular field will be noted. If not, the program will flow along an "N" path to a decision block 4328 to determine if the field has been validated. Decision block 4328 indicates the field as being an "open" field, wherein the program will flow along the "N" path to a function block 4330 or whether the field is required to be validated, as indicated by the flow along a "Y" path to a function block 4332 wherein a "valid" flag will be set. The validation operation is one that links the field to the attribute table, and will define the contents thereof as linkable when populated. This facilitates searching of the field, when the ID packet is created. For example, if an address field such as "Street" is defined, this would be linked to the street attribute in the attribute table. When this is filled in upon creating the ID Packet, then the actual street name will be linked to the dictionary. If it is open, then this field is not linked to the attribute table or the contents linked to the dictionary. Once the field is defined as an open field or a field that must be validated, the program will flow to a decision block 4334 to determine if additional fields are to be added. Once all fields have been added, the program will flow to a "Done" block 4336.

In the operation of defining the attribute field type, i.e., the title of the field, this will link the field to the attribute table. This will be done before information is added thereto. As such, when information is added in a profile and the profile is accepted and the ID packets generated, the information defined in the profile that is associated with the ID packet will contain all the field names and the content of those fields. The links to the profile number are already preset, such that a new link need not be made. Therefore, when a new profile is generated, the unique address of that profile is the ID packet, since the ID packet is a unique value in and of itself. As soon as this ID packet is generated, it will immediately link to each of the field types in the attribute table. When content is added, a procedure must be followed wherein a dictionary is accessed to determine if the word is a correct spelling and then a decision made as to what the word is associated with. For example, it might be that a word is entered into a field having multiple meanings. This would be presented to the user once the content was entered such that the user could select the meaning of the term such that it will point to the correct meaning in the attribute table. This dictionary can also check for spelling mistakes, language translations, etc.

Figure 44:
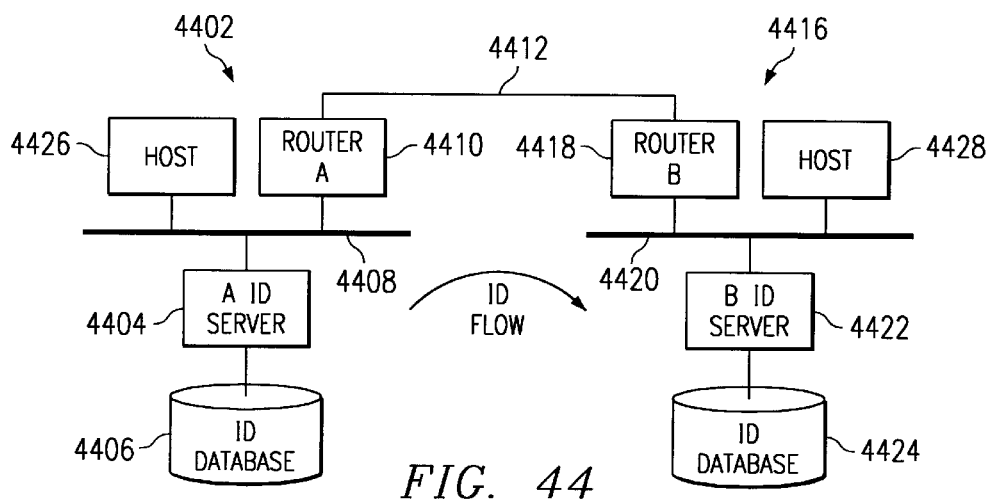
FIG. 44 illustrates a diagrammatic view of the ID packet flow during a propagation operation.

Referring now to FIG. 44, there is illustrated a diagrammatic view of a system for propagating the ID packets from one ID server to a second system having an associated ID server. There is illustrated a first system 4402 having an ID server 4404 associated therewith, the ID server 4404 having an associated ID packet database 4406. The ID server 4404 interfaces with a local network 4408 having a router 4410 associated therewith. The system 4402 utilizes the router 4410 to interface with a gateway 4412. The gateway 4412 interfaces with a second system 4416 via an associated router 4418. The router 4418 interfaces with a local network 4420 for the system 4416. The system 4416 also has associated therewith its individual ID server 4422 interfaced with the local network 4420, the ID server 4422 having associated therewith its own ID packet database 4424. In operation, each of the ID servers 4404 can service their own systems to generate ID packets therefor. Each of the systems also has associated therewith other nodes, such as a host node 4426 for system 4402 and a host node 4428 for the system 4416. When each of the respective ID servers generates ID packets locally, they can each download them to their respective hosts 4426 or 4428 or even the associated routers 4410 and 4418. However, in some situations involved with transactions between two systems, it is necessary to provide ID packets from one system to the other. This will result in, for example, the flow of ID packets from server 4404 to system 4416 for storage in the various nodes associated therewith. Typically, the ID server 4422 will receive the ID packets and then propagate these ID packets to the various nodes associated therewith.

Figure 45:
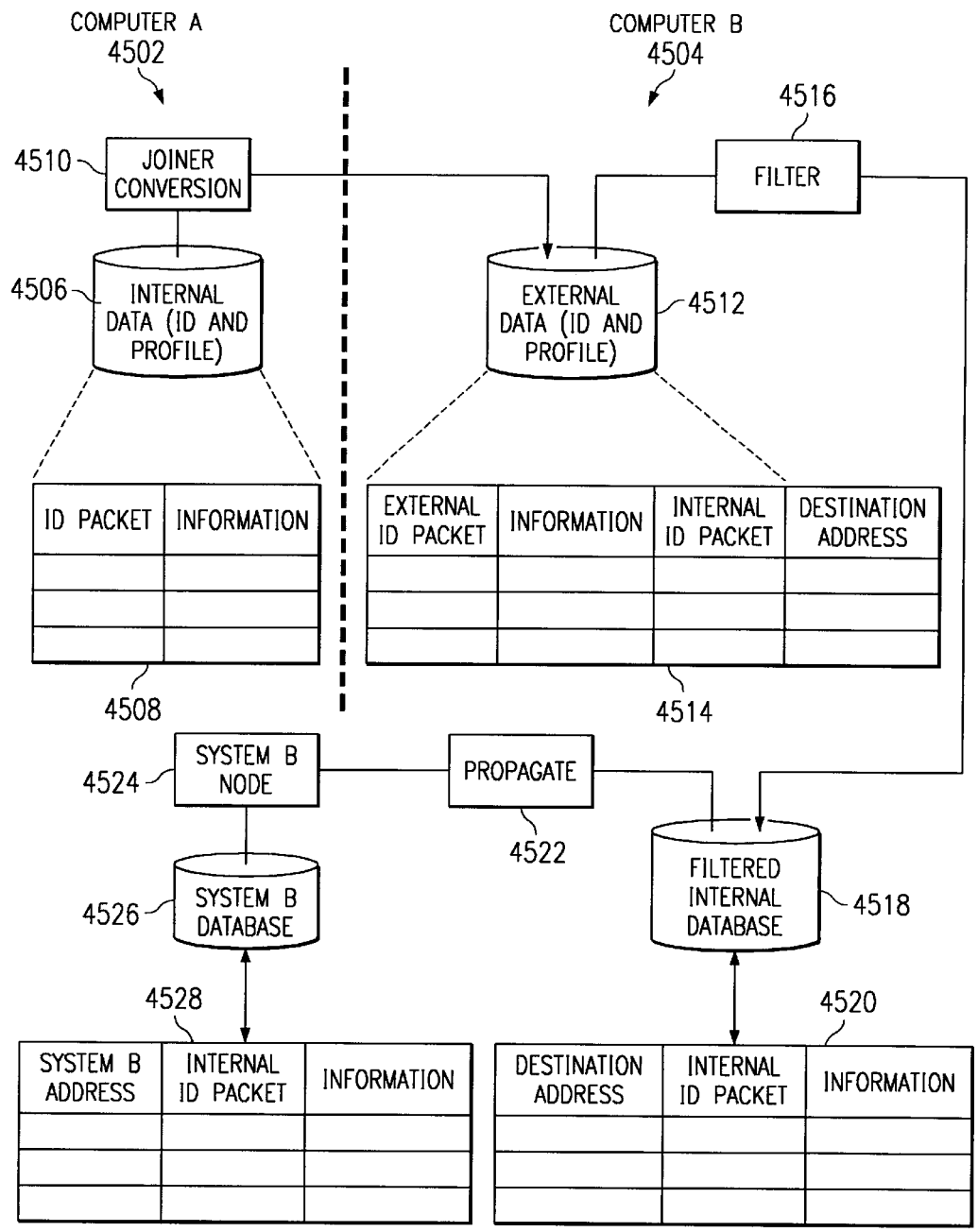
FIG. 45 illustrates the operation of propagating from one system to a second system.

Referring now to FIG. 45, there is illustrated a diagrammatic view of transfer of an ID packet and information from one system to another. There is illustrated a first system associated with a company "A" 4502, a second company, company "B" 4504. Company A desires to send data packets to company B. These ID packets and the associated information such as the profile, the profile numbers, etc. are stored in an internal database 4506 at Company A. The data is stored in a table format, as illustrated in table 4508. This table will be organized in rows and columns, each row comprising all the information necessary for transfer, this being an ID packet, and all of the profile information associated therewith.

When information is transmitted from one company to another, it can be transmitted as the unique ID packet wherein the ID packet provides a "pointer" or address for the information. However, in certain situations, the particular ID packet associated with the company and for use internal to the company may not be of such a nature that the company would desire to transmit the information. For example, the core ID portion of the ID packet is unique to that company and this information may not be something that the company would want to be broadcast. Therefore, they create a new ID packet value as a joiner ID packet that is transmitted to the other company. Typically, this joiner ID packet will have a different value. It may in fact have the same preamble in the group ID and individual ID for any of the core ID, device ID or item IDs. However, the time stamp could be different. As such, this would be a different value. The reason for maintaining the preamble portion of the group ID and/or the individual ID for any of the three parts of the ID packet would be to maintain the classification system associated with all of the information in the ID packet. Although the classification information is identical or substantially identical, the time stamp and sequence number would be different, thus rendering the ID packet a different value. This function is facilitated by joiner conversion block 4510. When the joiner table has been created with the joiner conversion block 4510, this will provide a second cross-reference table which will be basically a "pointer" to the ID packet and the table 4508. The internal database 4506 will maintain this joiner ID. Basically, it is a cross-reference table such that information can be transmitted back and forth with different unique ID codes that will only be recognizable by the internal database 4506. One use of the joiner ID packet is to terminate the connection by merely erasing the joiner ID packet such that it will not be recognized, this termination not affecting the database 4508.

When the information has been appropriately converted or not converted, it is transmitted to the system 4504 and input to an external database 4512 at the system 4504. This external database stores the external data received from external systems, this being one or more systems, in a table 4514, which table organizes the information in the form of the ID packet originally generated from the transmitting system (the External ID Packet) and the associated profile information, it being remembered that this External ID packet may be a joiner ID packet. Additionally, the system 4516 then interacts with the data to create an internal ID packet. This internal ID packet is associated with the profile information for the originally received ID packet, but actually constitutes a separate value. Since it has all of the information necessary to "classify" the data, it can go through the classification operation, as described hereinabove, to generate a new ID packet. This internal ID packet is then associated with the originally received ID packet and also the profile information. When it is necessary to utilize the information in the table 4514 for internal operations at the system 4504, only the internal ID packet and the associated profile information will be transmitted or propagated to various other systems.

When the external data is utilized, it typically can be filtered with a filter 4516, which filter 4516 will only fetch a certain amount of the data for a particular system. This filter will filter off the ID packets originally received and then transmit it to a filtered internal database 4518. With the use of the filtered internal database, significantly less information is downloaded. For example, when an internal database in another system, the system 4502, transmits data, it may transmit all of a portion of its database, i.e., such as its entire data catalogue. However, the internal side of system 4504 may not desire to have all of the catalogue transferred down to the various nodes. Therefore, a particular Extent will run on the internal side of system 4504 to determine what data in the catalogue is selected for propagation to the various nodes. This is the information that is stored in the filtered internal database in the form of basically the internal ID packet and the profile information, as set forth in a table 4520. This filtered internal database information constitutes a database of ID packets which then must be propagated to the various systems through a propagate block 4522, which has been described hereinabove with respect to FIG. 26. This propagate block is operable to then propagate information to any of the nodes in the system 4504, as indicated by a block 4524, which will then associate the propagated ID packets for storage in a system node database 4526 in the form of a table 4528. As noted hereinabove, this will be organized in the form of the internal ID packets and the associated profile information, it being noted that this will probably not be as large as the table 4520 in the filtered internal database 4518.

When the propagate block 4522 propagates, the table 4528 will also contain a link to the internal address of the System B Node 4524 at which the ID packet is stored. This address constitutes a destination address. This destination address is then reflected back to table 4520 as a link and to the database 4512. This is then put in database 4512 to indicate which ID packets have been filtered. This is via the acknowledgment function, which returns both the destination address and the underlying information. An example would be an entry such as a contact name. Note that, if system 4502 deleted an entry, the database 4512 would determine if there is a destination address linked to an External ID packet and, if so, indicate to database 4518 and propagate block 4522 that the item is deleted and then propagate the change. If it had not been linked in the filter operation, then the item would be deleted from the external side fo database 4512 (or disabled).

Referring now to FIG. 46, there is illustrated a diagrammatic view of the operation wherein processes are created and propagated. In this view, there is provided on a system the process server 4602 which is operable to interface with a user interface 4604 to basically provide inputs to the process server, i.e., information necessary to define the process. The process server operates by assembling various logic blocks that are stored in the database 4606 to create Extents or processes or subprocesses which are utilized by the various nodes in the system. These are, after creation thereof, stored in a process database 4608. During generation of the processes, various ID packets are utilized, which are stored in an ID database 4610 and also routing information is stored in a routing database 4614. This routing information is information as to the various network addresses of all of the nodes in the system, such that the process can be effective.

The process server interfaces with the local network 4616 which will basically interface with an ID server 4620 having associated therewith its ID database 4622, possibly an account server 4624 having associated therewith a process database 4626 for its associated portion of the processes distributed thereto and with a router 4628, having associated therewith process database 4630. It should be remembered, as described hereinabove, that all traffic on the system must go to the router first before being routed to the other process nodes. It can be seen that, once the process server has determined the processes and stored them in the process database 4608, it then determines where the processes need to be transmitted. Since the process defines a transaction from beginning to end, i.e., from transmission of certain information from an originating node to a destination node, there will be multiple processes that are carried out at one or more of the various nodes disposed in the transaction path. Each of these processes is created as a group and then distributed outwards.

Referring now to FIG. 47, there is illustrated a diagrammatic view of the logical flow of creating a process. The logical instructions for the process were input at a block 4702, which have been input to a process generator 4704. The process generator requires access to various standard process blocks stored at a database 4706. The process generator will receive the logical instructions and then assemble a process of a transaction that will define a group of processes for each Extent and a group of Extents. This is illustrated as a plurality of sequentially performed processes of 4708. Each of the process blocks has input and output and requires information to be associated therewith. For example, there may be a process block that defines a destination route and requires information as to the originating node and the destination node for that particular process block. This will enable that process block to generate possibly a portion of the transaction packet, extract information from the database or reside on a conversion server for processing the transaction packet at the conversion server. By utilizing process blocks, the assembly of the overall Extent is facilitated in a much more expedient manner. Once all of the process blocks have been assembled, it being remembered that these are a sequence of instructions, the logical flow will be to a finish block 4710 to complete the process assembly and then generate the code with a code generator block 4712. This code generation constitutes the process which is then stored in the process database 4708 with a process number and a sequence number for a particular transaction. It should be remembered that the process server for a given transaction will associate a plurality of Extents together such that, once a channel ID is defined, each process in the channel ID will recognize a previous process and the data will flow through the system in accordance with this process sequence.

Figures 48, 50:
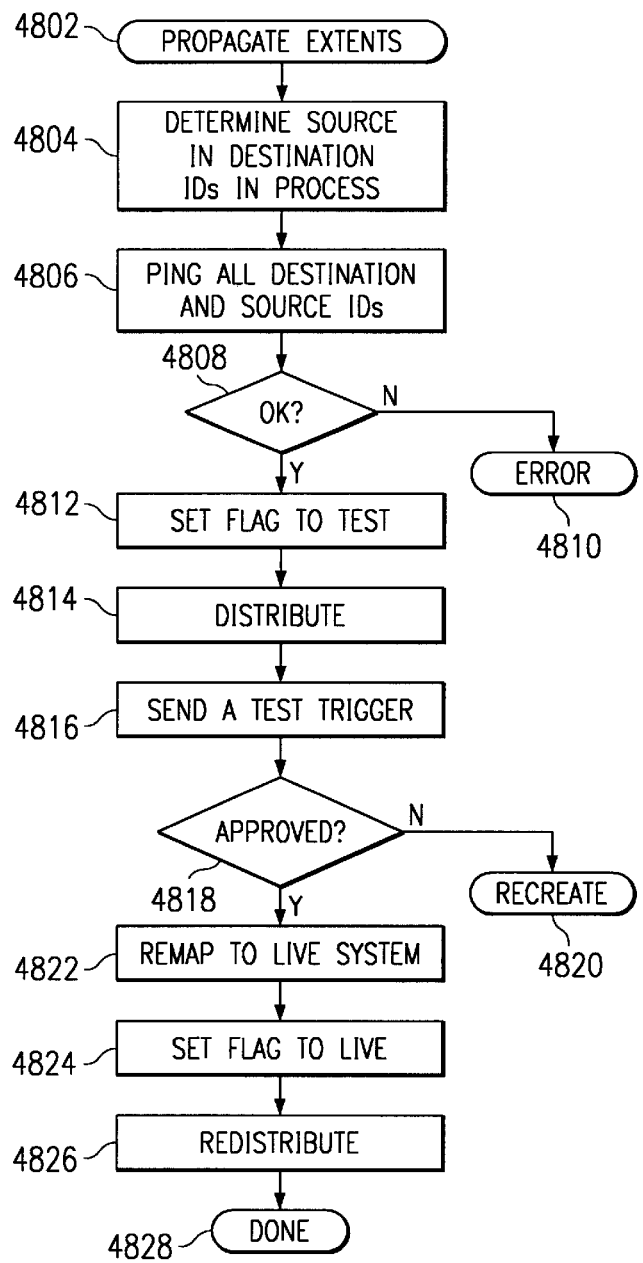
FIG. 48 illustrates a flow chart for the operation of a propagating Extent.
FIG. 50 illustrates a diagrammatic view of a table for two ID packets for an identical item or vendor.

Referring now to FIG. 48, there is illustrated a flow chart depicting the operation of propagating Extents, i.e., predetermined processes that are generated by the process generator 4702, to various nodes in the system. The program is initiated at a block 4802 and then proceeds to a block 4804 to determine the source and destination IDs in the process. The system will then flow to a function block 4806 to then "ping" all of the destination and source IDs required for this process. This is required to ensure that all of the destination and source IDs are actually on-line and working. The program will then flow to a decision block 4808 to determine if the ping operation has been successful. If not, the program will default to an Error block 4810 and, if all the tests came back successful, the program would flow to a function block 4812 to set a flag to that of a test mode. As will be described hereinbelow, each process must go through an evaluation step before it goes "live" in the overall transaction between two systems, nodes or customers. The program will then flow to a function block 4814 to distribute the various Extents that were created in the process to the respective ones of the nodes, it being remembered that the process is comprised of a group of subprocesses, the subprocesses distributed to various nodes. The program then flows to a function block 4816 to send some type of test trigger to test the system. When the system is actually created, it may be that there is a final destination node that is to receive information or an order. The order can be placed with some kind of notation that this is a test transaction, such that, when the trigger signal is received for the test operation, all of the resources in the transaction path are "exercised" to determine if the transaction has been completed in the manner which was contemplated by the original logical instructions that were input to the process generator. It may be that there are many addresses that are "dummy" in nature, such that the final destination of the process will end up at a dummy node with, for example, a dummy facsimile, a dummy order, or the such. The program then flows to a decision block 4818 to determine if the process has been approved. This could be a manual operation which evaluates the transaction flow to determine if it has been executed correctly, i.e., the correct order has been placed in the correct manner at the destination or that a particular process interfaces with another system in the correct manner. If it has not been approved, it may be that the process needs to be recreated, as indicated by block 4820. However, if it is approved, the program will flow to a function block 4822 wherein the process will be remapped to a live system, i.e., the flag may be set to a live mode or, in conjunction therewith, various addresses in the process are remapped to change some parameters thereof. The program then flows to a function block 4824 to set the flag to "live" and then to a function block 4826 to redistribute the subprocesses over to the associated nodes. It should be remembered that a copy of each of the subprocesses and the overall process are maintained in the process database 4608. The program then flows to a Done block 4828.

Figure 49:
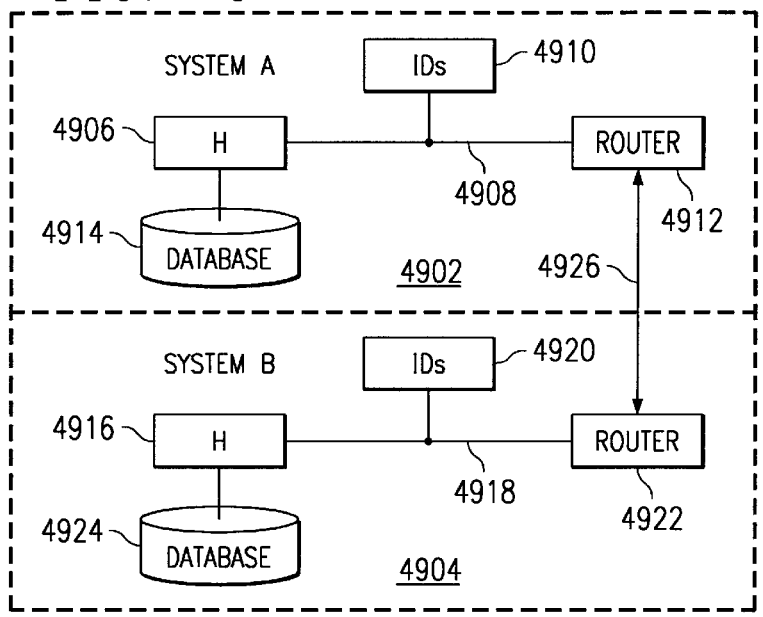
FIG. 49 illustrates a diagrammatic view of the transfer of ID packets between two systems in a merger operation.

Referring now to FIG. 49, there is illustrated a diagrammatic view of two systems that interface internal thereto with ID packets. There is provided a first system 4902 labeled SYS A and a second system 4904 labeled SYS B. The first system 4902 has associated therewith a host 4906, a network structure 4908, an ID server 4910 and a router 4912. The host 4906 has associated therewith a host database 4914. Similarly, the system 4904 has a host 4916, a network structure 4918, an ID server 4920 and a router 4922. The host 4916 has associated therewith a database 4924. The two systems 4902 and 4904 interface with each other through an interconnection 4926 between the routers 4912 and 4922.

In some situations, there can exist two systems that have dissimilar databases, i.e., the software utilizes a significantly different operating system and database generation system resulting in a different database structure. When two distinctly different databases are utilized in two companies, it is difficult for the two companies to converse with each other without some type of adapter therebetween. This situation is exacerbated when the two companies are merged. For example, when two companies become a single entity and desire to have a single common database, it is necessary to convert both databases into a new database or to convert one database into the other database. This is not an uncommon situation. The problem exists when there are common aspects of two databases such as common products, common vendor IDs, etc. For example, there could be a common vendor between the two databases that was utilized for purchasing products from, or for shipping products thereto. Both databases would have information associated with this same vendor entered into their respective database structure in a significantly different manner, due to the dissimilarity of the database structures. However, even if the two database were the same, i.e., both Oracle® databases, they could have a different formats and the such for various fields, i.e., a different organization. The reason for this is that a great deal of latitude is provided to the system administrator when creating the database in defining the format of ID fields. It may be that one administrator for one database structure formats it with numbers and the other system administrator formats it with textual characters. This presents a problem in that comparison of IDs in a common field will not allow merging of records. As such, it is possible when merging into a new database that there could actually be two new vendor IDs generated in the new database structure for a single common vendor. As such, all links to the common vendor with two different vendor IDs would still be separate and distinct, as they were in the two different databases. In order for the two systems 4902 and 4904 to merge together into a single system, they would have to have a common database structure wherein the database 4914 and the database 4924 will merge into either a common separate database or one merged into the other.

Referring now to FIG. 50, there is illustrated a table depicting the difference in the two systems and the way in which they might handle vendor IDs. In the example of FIG. 50, there is listed a vendor "ABC" that exists in both the database of SYS A and the database of SYS B. In SYS A, there is a unique vendor ID associated with vendor ABC, which vendor ID is "123." Also, there is a unique ID packet associated therewith in SYS A identified as "XXX." This ID packet XXX, of course, is representative of a unique number that has associated therewith the constituent parts as described hereinabove in the form of the core ID, the device ID and the item ID. This is for representative purposes only. In SYS B, the vendor ID is denoted as "567" and the ID packet is also provided as being a unique value "YYY." The reason that the vendor IDs in SYS A and SYS B are different is due to the fact that the system administrator formatted them for different values. It could be also that they were assigned vendor IDs in a sequential manner and it was the time they were put in that defined what the vendor IDs would be. With respect to the ID packets, these are generated by each system's ID server and, therefore, would constitute a unique number. However, it could be that the classification portion of the ID packet, that embedded in the ID packet, could be the same. It would be the time stamp and sequence number that would create the unique difference. In any event, it can be seen that the vendor IDs for the two systems are different for the same vendor and, therefore, some conversion must be performed.

Figure 51:
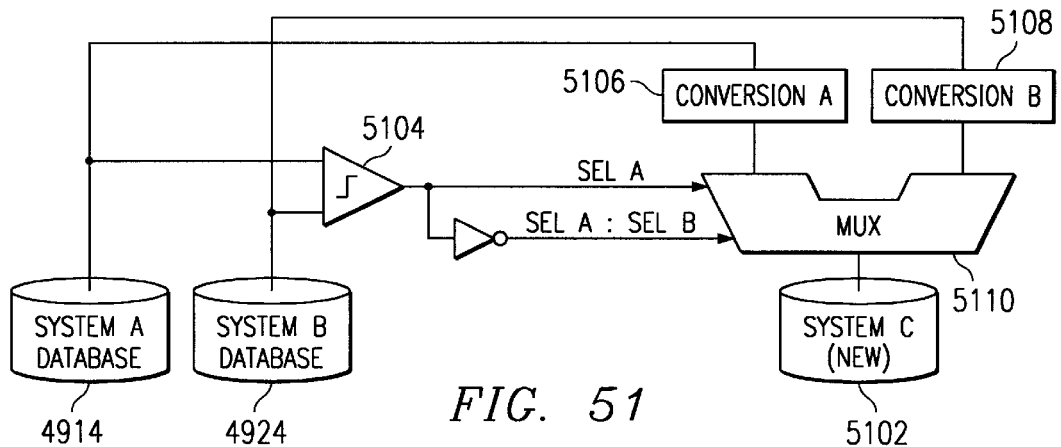
FIG. 51 illustrates a block diagram for the merge operation.

Referring now to FIG. 51, there is illustrated a block diagram view of the merging operation of the two databases 4914 and 4924 into a single database 5102. Each of the records in the databases 4914 and 4924 are compared with a compare operation, illustrated as a block 5104, to determine if they are the same. The vendor IDs may be different, but the underlying information associated with that vendor ID would have similarities, if not being identical. For example, the name of the vendor would be the same, the address of the vendor would be the same, even the zip code of the vendor would be the same. By examining this information that underlies the ID packet and is associated with the vendor IDs in the respective databases, an evaluation can be made as to whether they are the same vendor. If so, then this will provide a TRUE output from the comparison block 5104. Each of the databases is processed through a separate conversion block—5106 for SYS A and 5108 for SYS B. A multiplexing block 5110 is provided for selecting either the output of conversion block 5106 or the output of conversion block 5108. When the comparison is TRUE, this indicates that the data in both systems is identical and, as such, the conversion of that information to a format compatible with the database 5102 will be performed by both conversion blocks 5106 and 5108. For a TRUE operation, only one conversion operation needs to be selected and this, in the present example, would be that associated with block 5106. However, if it is FALSE, then the multiplex block 5110 would first select the output of conversion block 5106 for storage in database 5102 and then the output of conversion block 5108, such that both IDs were converted. As noted hereinabove, when an ID packet is converted, this would result in a new ID packet being generated and given a new vendor number for the converted information. However, each conversion operation during the merge could be different and different parameters and aspects thereof could be added or subtracted. Also, the new ID packet will have the underlying profile information associated therewith.

Figure 52:
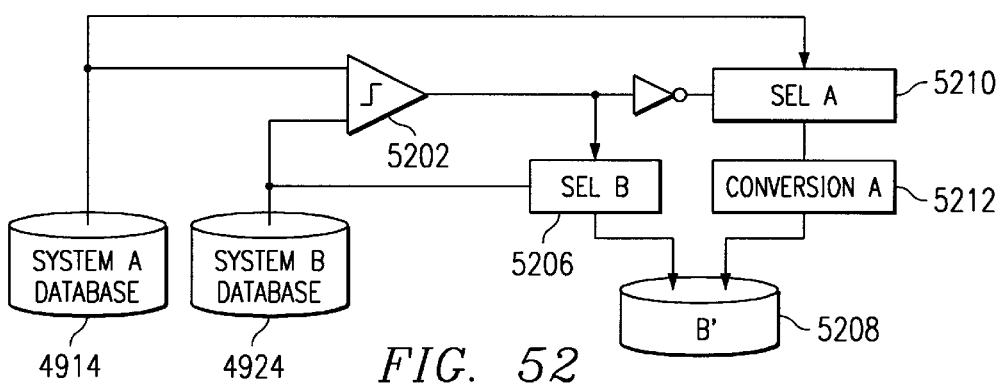
FIG. 52 illustrates an alternate embodiment of the embodiment of FIG. 51.

In an alternate embodiment, illustrated in FIG. 52, information in one database is merged into another database and made compatible therewith. In this operation, the data in databases 4914 and 4924 are compared with a comparison block 5202 to determine if they are substantially identical, as was the case with respect to the comparison block 5104. Whenever a TRUE result occurs, this indicates that they are identical and, as such, there is no need to convert the data from database 4914. There need only be a selection of the data from the database 4924 which is provided by a selection block 5206. This would be stored in a merged database 5208 which is basically identical to the database 4924, albeit larger. Whenever there is a FALSE comparison, i.e., there is no match to a record in the database 4914 and the data in the database 4924, then this data will be converted through a selection block 5210 and a conversion block 5212.

Although illustrated as being individually selected as records, typically all of the data in the database 4914 will be compared in a search operation to the data in database 4924 to determine if there is a match for that data in database 4924. If there is no match with the data in database 4924, then this data from database 4914 is converted and stored in database 5208. Database 5208 will be initialized with all of the data in database 4924 such that there effectively will not be an actual selection operation, although there could be such an operation.

Figure 53:
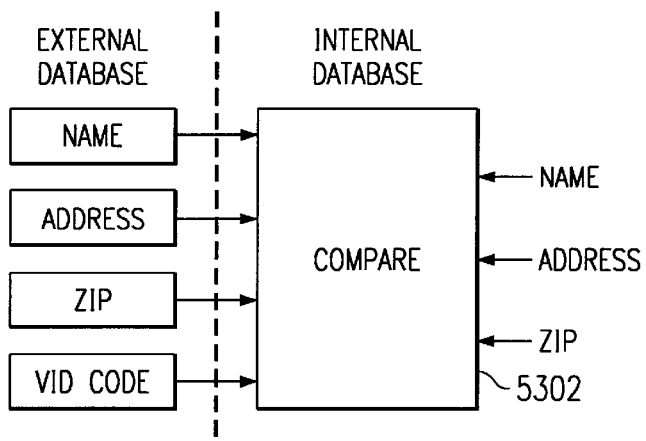
FIG. 53 illustrates a diagrammatic view of the compare operation.

Referring now to FIG. 53, there is illustrated a diagrammatic view of the comparison operation. In this example, the data underlying the ID packet would be that associated with, for example, the name, the address, the zip code and the vendor ID code. This exists on an external database external to the database to which it is being merged, i.e., the internal database. This information is input to a compare block 5302 and this is compared with the name table in the internal database, the address table in the internal database and the zip code in the internal database. Many other parameters could be compared. This is a function of the compare operation wherein a compare operation "pulls" data from the other database for the purpose of evaluating its presence in the internal database. If it is determined that the profile data underlying the ID packet is identical, then a new ID packet need not be generated. However, if it is determined that this information is new, then a new ID packet would be generated with the profile information and possibly a new vendor ID code generated in the database.

Figure 54:
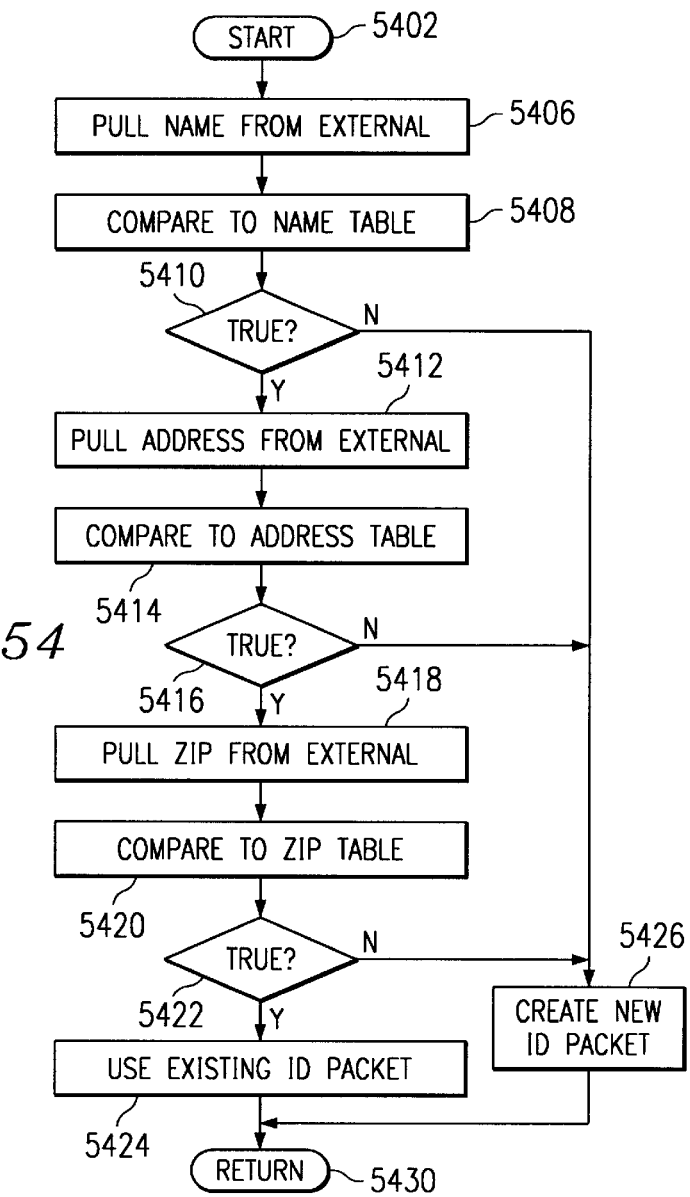
FIG. 54 illustrates a flowchart depicting the compare operation.

Referring now to FIG. 54, there is illustrated a flowchart depicting the comparison operation, which is initiated at a Start block 5402 and then proceeds to a block 5406 to pull the name from the external database and then compare it to the name table in the function block 5408. If a decision block 5410 determines that it is a TRUE comparison, then the address information will be pulled from the external database and compared to an address table, as indicated by function blocks 5412 and 5414. If the comparison is TRUE, as determined by decision block 5416, the flow will then pull the zip code from the external database and compare it to the zip code table, as indicated by function blocks 5418 and 5420. If this results in a TRUE comparison, as determined by a decision block 5422, the program will flow to a function block 5424 to use the existing ID packet. However, if any of the decision blocks 5410, 5416 or 5422 determine that it was not a true comparison, then the program will flow to a function block 5426 to create a new ID packet, as described hereinabove. The program will then return via a return block 5430.

Figure 55:
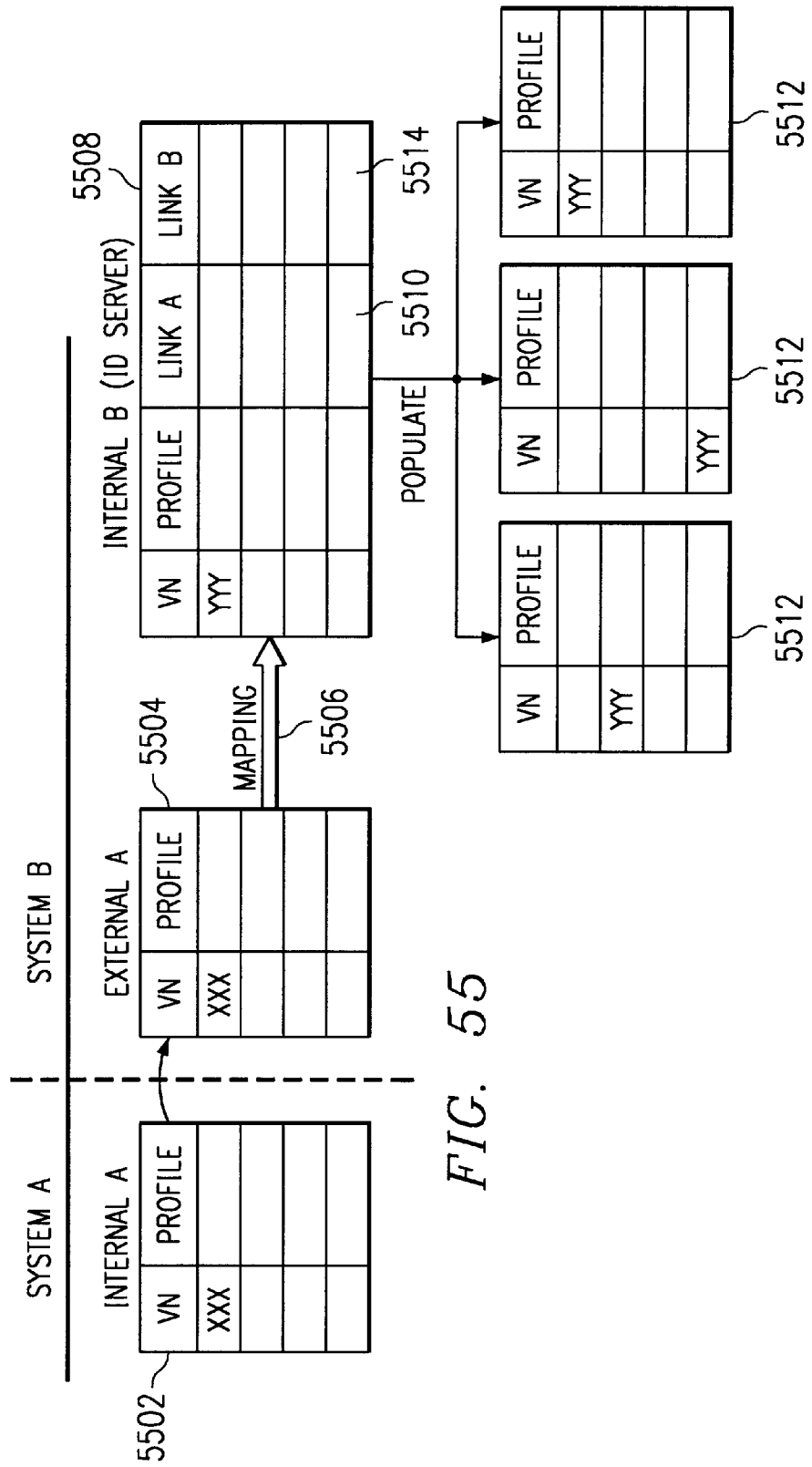
FIG. 55 illustrates a simplified schematic of the internal/external operation.

Referring now to FIG. 55, there is illustrated a diagrammatic view of the operation of transferring information from a system, SYS A, to a system, SYS B. This is a further explanation of the internal/external operation, as described hereinabove with respect to FIG. 45. When data is transferred between two systems, it can be transferred in the native form or it can be transferred in the form of ID packets, noting that the ID packets for two systems may be different, as they were created with two different ID servers. In the example illustrated in FIG. 55, SYS A has provided therein a database represented by Table 5502. This database is divided into, for example, two columns, one associated with a vendor number and one associated with a profile, such that each vendor number has associated therewith a profile. This vendor number could be an ID packet. However, it could merely be the native vendor number of SYS A. When the data or information regarding vendors is transferred to SYS B, it is transferred essentially intact, i.e., with the vendor numbers that exist in SYS A. (Note that the vendor number could be reflected as an ID packet.) This will result in a database or table 5504 being transmitted to SYS B as external data therein, referred to as a table EXT A. This EXT A database or table consists of all of the vendor numbers in the profile, as it existed in SYS A and in a database structure associated with SYS A.

At SYS B, there is a mapping function performed, as indicated by an arrow 5506 that maps all or a portion of the information in the table 5504 to a new table 5508, which provides the vendor number in the database SYS B in compliance with all the rules associated therewith. As described hereinabove with respect to FIG. 45, this may merely require the generation of an ID packet that is generated utilizing the profile information of the table 5504. However, the table 5508 also provides a link back to table 5504 in a column 5510. The profile information in table 5504 contains, in addition to the substantive information relating to the vendor associated with a vendor number, various links and change flags. The operation of these will be discussed hereinbelow.

Once the database has been created at a table 5510, which exists at the ID server for SYS B, this information is then propagated to the various account servers, as represented by tables 5512, there being three such tables. Each of these tables 5512 represent other nodes in SYS B that require information regarding the vendor numbers. These, in practice, could be other account servers that have their own ID servers associated therewith. They could, also, be such things as the conversion server, the router, etc. These are associated with nodes in the system that require information as to vendor numbers without requiring the node to constantly go back through the network to the main database at table 5508 to determine what the underlying information would be.

Once the information in table 5508 at the ID server is propagated down to each of the nodes and the tables 5512, it is important that the ID server be apprised of the address for each location in each of the tables that the particular vendor number is linked to. This is stored in a column 5514. Therefore, the ID server 5508 has a link to both the data in the table 5504 and to all other databases that lie below the table 5514 in the hierarchal structure.

Figure 56:
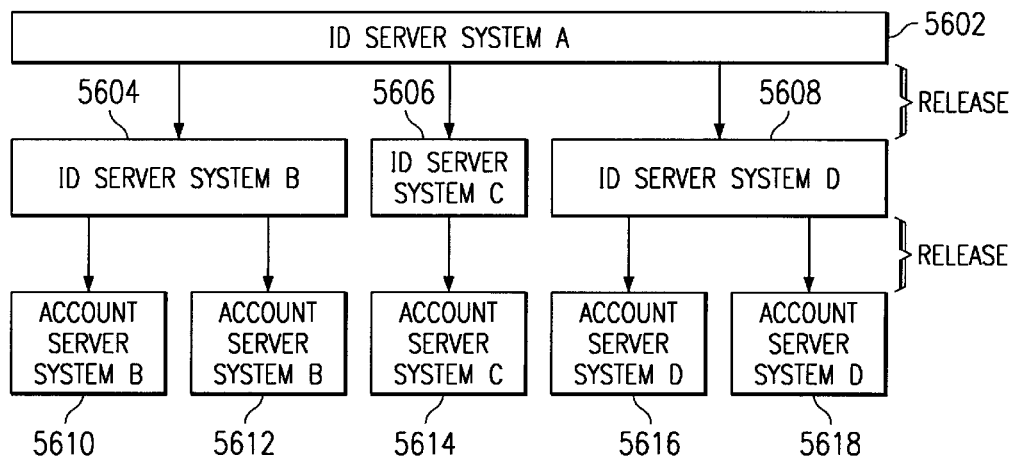
FIG. 56 illustrates a schematic view of the address linking between ID servers and different systems.

Referring now to FIG. 56, there is illustrated a simplified schematic of how information is propagated through the network from one ID server, a source ID server 5602, down to a plurality of lower servers. In the illustrated embodiment of FIG. 56, there are illustrated three lower ID servers, an ID server 5604, an ID server 5606 and an ID server 5608, for three different systems, SYS B, SYS C and SYS D. The ID server 5604 has associated therewith two account servers 5610 and 5612 with ID server 5606 having a single account server 5614 associated therewith and ID server 5608 having two account servers 5616 and 5618 associated therewith.

In operation, there will be a "release" operation that allows information to be transferred from one system to another. In the first operation, there will be a request made by one of the lower ID servers for information, which information will then be released to that ID server, i.e., this indicating that the data being released is a valid data. This is then transmitted down to the external side of one or more of the servers 5604–5608. At each of the servers 5604–5608, the data is converted to the database structure on the internal side thereof as internal data to that ID server. This is then propagated or released in a second operation to one or more of the account servers associated therewith, i.e., to a lower level. Thereafter, when information is changed, then a change or release is "pushed" from the higher level to the lower levels and this change then propagated downward. For example, if ID server 5602 for SYS A had propagated data such as a catalogue down to one or more of the servers 5604–5608, and then desires to create a change, it must change the information at every location that it is presently disposed at. Suppose that this information were disposed at two or more of the account servers 5610–5618. In order to facilitate this change, the ID server 5602 would merely have to push the change to each of the servers to which the original information had been released. Once the lower level ID servers 5604–5608 receive the change information, then they will make the corresponding change in all of the servers therebelow. The reason for this is that the ID server 5602 is aware of all locations to which data was originally released or pushed to and the ID servers 5604–5608 are aware of all the addresses of that particular information and can then propagate down the change to those servers.

Figure 56A:
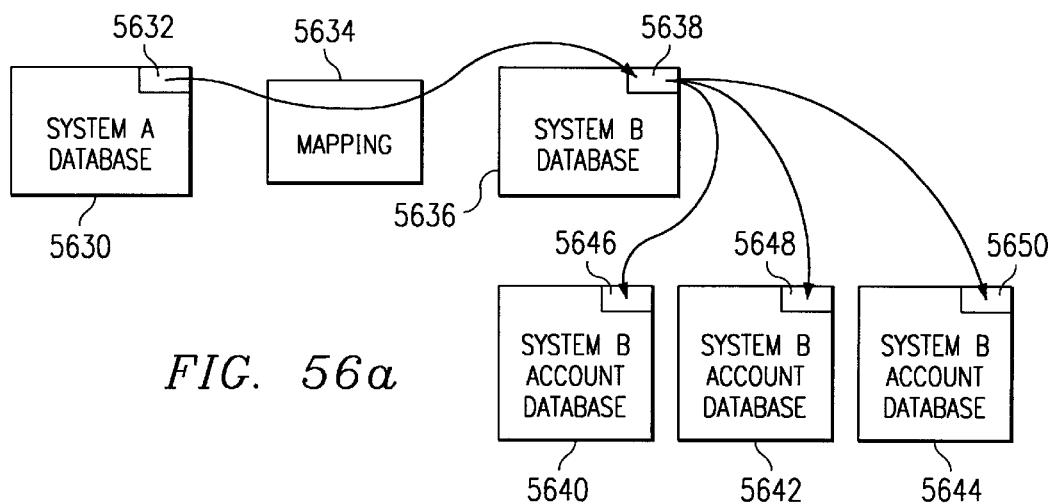
FIG. 56a illustrates a simplified schematic of the propagation of an address through the network.

The system of FIG. 56 is illustrated in a simplistic form in FIG. 56a. In FIG. 56a, there is illustrated a database 5630 associated with SYS A ID server 5602. A particular data field or addressable location 5636 is illustrated. This is passed through a mapping function 5634 for storage in a database 5636 as an addressable information field 5638. This information in addressable field 5638 is then propagated down to each of three databases 5640, 5642 and 5644 at addressable locations 5646, 5648 and 5650, respectively. When the change is required in the addressable location 5632 in the ID server 5602, this change merely needs to be "pushed" to the database 5636 into the addressable location 5638. This is facilitated, as described hereinabove, by pushing into the external side and then an Extent operating to reflect this change over to the SYS B database 5636. Once the change has been stored in addressable location 5638, by utilizing the links that were created in the database 5636, each of the addressable locations 5646–5650 can have a change pushed thereto. As such, there is a "one source" link to all of the information that exists within the network, this being that addressable location in the database 5638. By making the change at this one source, then all of the data in the system can be changed.

Figure 57:
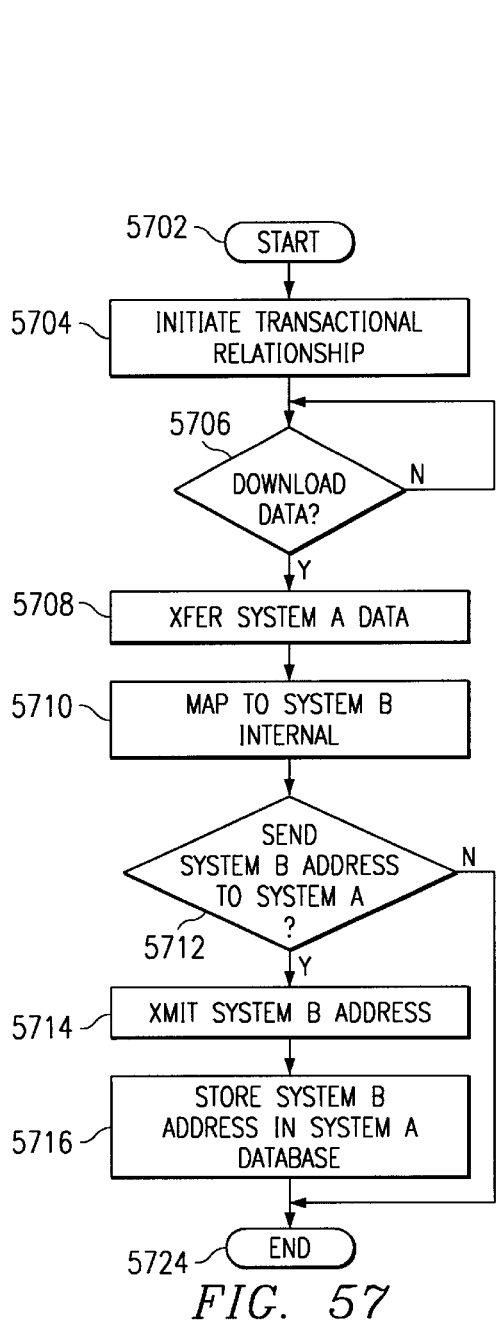
FIG. 57 illustrates a flow chart depicting the transfer of data from one system to another.

Referring now to FIG. 57, there is illustrated a flow chart depicting the operation wherein data is transferred from one system to the external side of a second system. The program is initiated at a block 5702 and then proceeds to a function block 5704 wherein a transactional relationship is initiated. In this operation, a contact will be made from, for example, SYS B to SYS A requesting information. This information may be in the form of their vendor list, their product catalogue, etc. Also, the manner by which a transaction between the two companies will be effected is also determined. Once the relationship has been initiated, the program will flow to a decision block 5706 to determine if data in the form of vendor numbers, product catalogues, etc., is to be downloaded. If so, the program will flow along the "Y" path to a function block 5708 to transfer the SYS data to the external side of SYS B. At SYS B, this external data from SYS A is then mapped to the internal side of SYS B, as indicated by a function block 5710. The program then flows to decision block 5712 in order to determine if the SYS B address is to be sent to the SYS A system. This is optional. This is an operation wherein the actual location in SYS B on the internal side thereof can be transmitted to SYS A. This would allow, for example, SYS A to actually point to the location within SYS B at which the data will be populated, as described hereinabove. However, in the preferred embodiment of the disclosure, the addressing is typically maintained at SYS B and SYS A and is only allowed access to the external side of SYS B. If the option is selected wherein the internal address is to be sent back to SYS A, then the program will proceed to a function block 5714 to transmit this SYS B address back to the internal side of SYS A and then to a function block 5716 to store the SYS B address in the SYS A database. However, in the preferred embodiment, the program will flow along the "N" path to an End block 5724.

Figure 58:
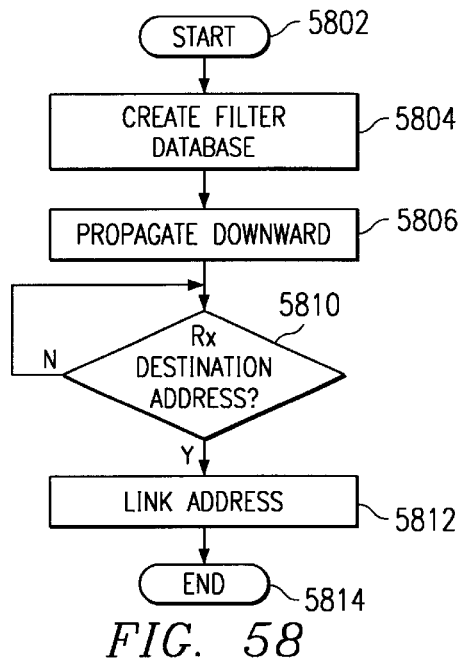
FIG. 58 illustrates a flow chart depicting the operation of creating the internal database and populating the internal database downward.

Referring now to FIG. 58, there is illustrated a flow chart depicting the operation of propagating the data from the internal side of SYS B down to the internal components thereof, such as the conversion server, the router, etc. The program is initiated at a start block 5802 and then proceeds to a function block 5804 to create a filter database, i.e., to extract the desired information from the external side that was received from SYS A and map it to the internal side of SYS B. i.e., create data packets internal to SYS B. This was described hereinabove with reference to FIG. 45. The program then flows to a function block 5806 to propagate downward the information to the destination ones of the account servers, such as the conversion server, the router, etc. When this occurs, the destination device will return the address at the destination device at which the information is stored, this indicated by decision block 5810. When the destination address is received, the program will flow from decision block 5810 to a function block 5812 wherein a linkage created in the database associated with the internal side of the ID server of SYS B. The program will then flow to an End block 5814. It is noted that when the link addresses are created, this link provides a link between the ID server and SYS B and the destination device and also a link address is provided between the SYS B database at the ID server and the external side thereof, such that a change in the external side can be propagated through to the destination device, since the ID server on the internal side of SYS B has knowledge of where the information came from, i.e., a link to the external side, and knowledge of where the information that was mapped from the external side is stored.

Figure 59:
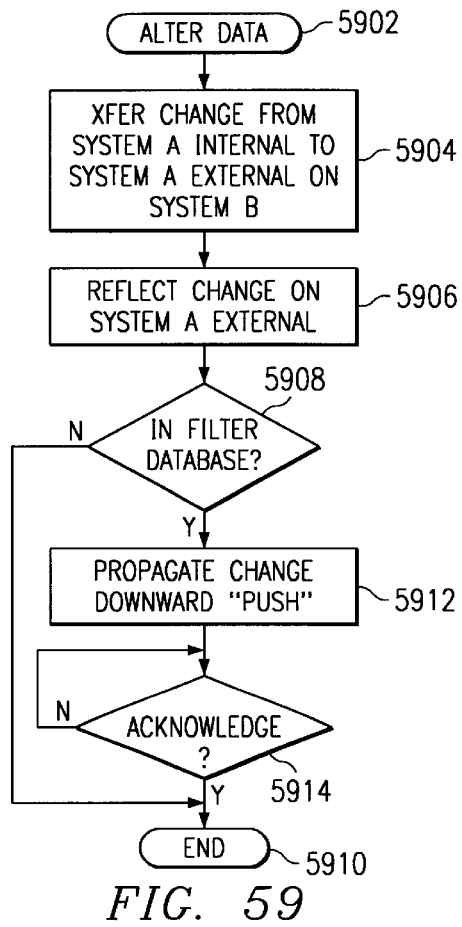
FIG. 59 illustrates a flow chart depicting the operation of changing all of the data with a single "push" command.

Referring now to FIG. 59, there is illustrated a flow chart depicting the operation of altering data in SYS A, which is initiated at the block 5902 and then proceeds to a function block 5904, wherein a transfer operation effected for a change in the SYS A database. The SYS A database on the internal side thereof has knowledge of the fact that information in this database resides in other locations on a network and remote locations on other networks. When a change is made to the database, these changes are noted and propagated to the external sides of systems at which the database was downloaded. This is indicated by a function block 5906. Once a flag or such is set on the external side of any one of the systems to which data from SYS A was downloaded, the internal side will recognize this flag as being set, i.e., recognize the change, and then a determination will be made as to whether this information was actually mapped to the internal side thereof. This is indicated by an operation in a decision block 5908. If the information is not in the filtered database, i.e., it was never mapped, then the program proceeds along the "N" path to an End Block 5910. If the data was mapped, then the program will flow along the "Y" path to map the new data over to the internal side of SYS B, i.e., make the change in the database at the ID server, and then "push" this change downward to the destination devices as indicated by a function block 5912. Once an acknowledgment is received, as indicated by a decision block 5914, the program proceeds to the End block 5910.

Conversion Server

Referring now to FIG. 60, there is illustrated a diagrammatic view of the Conversion Server operation. The Conversion Server, as described hereinabove, provides an operation wherein data and/or ID packets are transferred thereto for general processing in the intermediate or ID packet domain. However, when data is "pulled" from a host system or "pushed" to the host system, the host system will operate in its native database structure and language, i.e., there will be a predetermined format for that data. When two hosts must transfer data therebetween, some type of adaptor or conversion operation is required. The databases need not be totally different systems, but can merely be configured differently. For example, there may be an option on one database to select the format of a vendor code that is comprised of alpha characters as opposed to numeric characters, or it could be that the vendor is defined with a different value, albeit in the same format (this due to being defined independent of other systems). The vendor would be assigned a universal packet unique to that vendor such that, whenever information was being transferred from one system to the other, it would first be converted to the ID packet, this information transferred over to the next system and then converted from the ID packet over to the native format for the destination system.

With further reference to FIG. 60, there are illustrated two hosts, a host A 6002 and a host B 6004. Host A has associated therewith a native database 6006 which is formatted and structured in accordance with the structure of the database. Similarly, the host B has associated therewith a native database 6008. Whenever information is transferred between the two databases, there must be some type of conversion operation. Consider the example where data is transferred from host A to host B. In this configuration, data must be pushed from the database 6006 over to the system (or it could be pulled, which will be described in more detail hereinbelow hereinbelow). A data manager 6010 is provided at host A which is operable to run a program that will fetch data from the native database 6006 and transfer it to the system. As described hereinabove, this data manager 6010 is an Extent that is a program that runs on or proximate to the host 6002. This Extent, when initiated, will fetch data in blocks and in a predetermined order. There are many operations that can be performed on the data in order to efficiently extract it and transfer it to the system. In addition, as also described hereinabove, every time data is fetched from the database 6006, there will be a proprietary address assigned to a proprietary column in the database 6006 in association with a time stamp. Of course, if a proprietary address had already been assigned, it will not be updated. This is for the purpose of keeping track of the data in the database 6006 without regard to any restructuring of the data therein. This is not a host A address.

Once data is pulled from database 6006, it is routed in its native format to a data conversion block 6012. This is the Conversion Server. As described hereinabove, this operation requires first creating a transaction packet and transferring the data in accordance with various channel and feed ID packets. This will first, as described hereinabove, be sent to the router for redistribution to the Conversion Server. For simplicity, a direct path is illustrated to the conversion operation.

In the conversion operation, the data is converted from the native format for database 6006 into an ID packet. These ID packets, as described hereinabove, were generated at the ID server and populated down to the Conversion Server. This Conversion Server will convert the data from the native data to an ID packet and store these in a database, represented by a table 6014. In this table, the data will be structured such that there is a relation between the ID packet, the address in the A database (this will be the address that is stamped into the data by the data manager 6010) and the information associated with the information from the database 6006 in addition to a pointer therefor. This pointer would be such a thing as a vendor ID. Once this has been created, the data can then be transferred to a processing block 6016 for processing the ID packet domain. This process typically takes place at the Conversion Server but can be transferred to another Conversion Server through the system or to another processing node. In any event, all processing can be effected with the ID packets in the ID packet domain. Such things as layering, consolidation and merging can be performed utilizing the ID packets. Since an ID packet is a defined length and each ID packet is unique, this facilitates the layering operation and also facilitates transfer of information (this due primarily to the finite length of a packet rather than the variable length packet). By substituting the ID packet as the index, then groups of data can be transferred with a single ID packet, i.e, a vendor ID, the address, etc., associated therewith, thus reducing data transmission. This advantage will be realized in EDI to a large extent.

Once processed, the processed data in the form of the ID packets are sent to a second data Conversion Server 6018 for conversion from the ID packet to the native language or structure of the database 6008. This is reflected in a storage table 6020. This is then transferred to the database 6008 by first transferring it in the native language to a data manger 6022 associated with the host B.

Although this transaction is illustrated as being pushed from host A to host B, it could be that host B would request information from host A and, "pull" the data therefrom. Further, there can be a process running in the process block 6016 that requires more data and can actually pull data from the respective host A or host B for the processing operation. This is merely a function of the type of Extent that runs on any single node in the system, noting that the operation of transferring between nodes is facilitated with Extents, i.e., the Extents comprise the input/output of each node.

Figure 61:
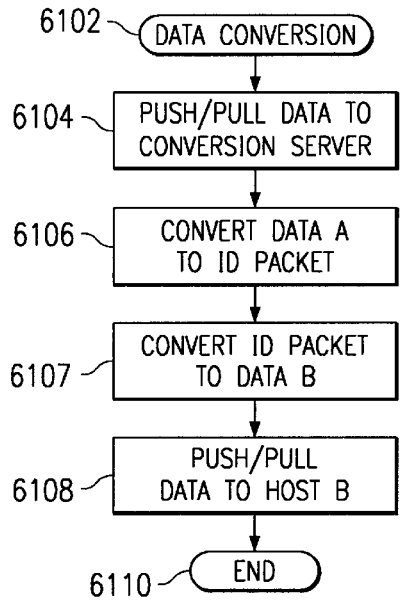
FIG. 61 illustrates a flow chart depicting the operation of converting data between two dissimilar systems.

Referring now to FIG. 61, there is illustrated a flow chart depicting the operation of the conversion operation, which is initiated at a block 6102 and then proceeds to a function block 6104 wherein the data is pushed/pulled and transferred from host A, for example, to the Conversion Server. The program then flows to a function block 6107 to convert the data to an ID packet format and then to a function block 6106 to convert the data to the native language of host B. The program then flows to a function block 6108 to push/pull data between the Conversion Server and the host B and then the program flows to an End block 6110.

Figure 62:
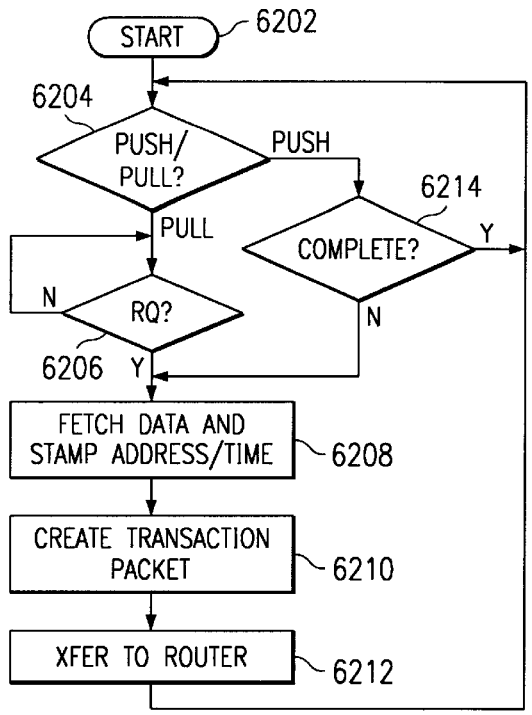
FIG. 62 illustrates a flow chart for the Extent that operates to push/pull data from a node.

Referring now to FIG. 62, there is illustrated a flow chart depicting the operation of the data manger, i.e., the Extent running at one of the hosts. This is initiated at a block 6102 and then proceeds to a decision block 6204 to determine if this is a push or pull operation. If it is a pull operation, the program will flow to a decision block 6206 to await an external request for data from another node in the system, at which time it will flow along a "Y" path to a function block 6208 to fetch data and then stamp the address and time if necessary. The program will then flow to a function block 6210 to create a transaction packet and then to a function block 6212 in order to transfer this data to a router, which operation will result in the data being transferred to the Conversion Server. The reason for this is that the Extent creates a transaction packet having associated therewith feed and channel ID packets that define the route to the Conversion Server and eventually to the destination server, i.e., host B in the example hereinabove. After transferring to the router, the program will flow back to the input of function block 6204.

If the operation were a push operation, then the program would flow from decision block 6204 to a decision block 6214 in order to determine if the operation in the push mode has been completed. If not, the program flows to the function block 6208 in order to fetch the data, create the transaction packet and then transfer the transaction packet to the router. This will continue until all of the data necessary is transferred, at which time the program will flow along the "Y" path back to the input of decision block 6204 from decision block 6214.

Referring now to FIG. 63, there is illustrated a diagrammatic view for one operation of the Conversion Server, i.e., that utilized for a consolidation operation. In a consolidation operation, there is provided some type of mapping function which takes information from two similar or dissimilar databases and consolidates them into a single format. One example of this is a company having a large number of sub-companies, each having a general ledger associated therewith. In this general ledger, there will be associated a plurality of charts of accounts (COA). There may be thousands of account definitions in each Chart of Account for each of the sub-companies. The problem is that a central office does not desire to have all of this detail, i.e., they wish to consolidate a large amount of information into a single account record. For example, it could be that one company would discriminate expenses associated with delivering documents into such things as First Class Mail, Express Mail, overnight couriers, hand delivery, etc. and keep track of each one of these expenses in a separate chart of account. It may be that a central system only desires to have a single account referred to as "Postage" wherein all of these accounts would be mapped thereto. Therefore, there must be provided some type of mapping function which allows this to occur. In the embodiment of FIG. 63, there is provided a first company having a COA 6302 wherein there are provided 350 separate accounts, and a second company having a COA 6304 with 250 accounts defined therein. It is desirable to map these into a single COA 6306 with only 150 accounts. Therefore, for each account in the separate COAs, there must be some type of mapping function. There is provided a mapping function 6310 for mapping from COA 6302 into 6306 and a mapping function 6312 for mapping from the COA 6304 into the COA 6306. Additionally, it may be that this mapping function must work between two dissimilar systems.

With use of the Conversion Server described hereinabove, an ID packet is created which defines the final consolidated account in the COA 6306. This ID packet may be, for example, defined as "postage expense." The ID packet would have an association in the ID server that would associate it with all of the other accounts associated with its company and in its company's native database. Therefore, whenever information for one or all of the accounts associated with the one ID packet were transferred to the associated mapping block, i.e., the Conversion Server, it would be recognized through a matching or searching operation that this particular account and the associated records would be associated with this ID packet and then they would be transferred to the COA 6306 in an ID packet format. At the destination, this ID packet would then be converted into the account associated therewith in its native database and then an update performed.

Figure 64:
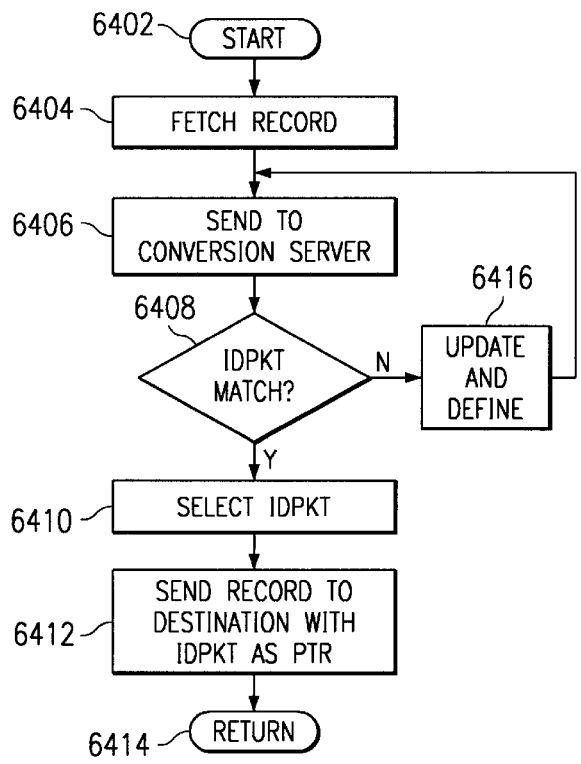
FIG. 64 illustrates a flow chart depicting the consolidation operation.

Referring now to FIG. 64, there is illustrated a flow chart depicting this operation, which is initiated at a start block 6402 and then proceeds to a function block 6404 to fetch the record or the account in the above example. This is then forwarded to the Conversion Server, as indicated by a function block 6406 and then proceeds to a decision block 6408 to determine if there is an ID packet match. If the ID packet exists, then a simple conversion is performed and the program flows to a function block 6410 to select the ID packet and then transfer the information associated with this ID packet to the destination system utilizing the ID packet as a pointer, as indicated by a function block 6412, the program then flowing to a block 6414 to return the program. However, if the system determined that there were no ID packet match, i.e., that nobody had associated the account with a particular ID packet, this would result in an error and the program will flow along an "N" path from decision block 6408 to a function block 6416 in order to update and define the particular ID packet. Once an ID packet is defined, it would be defined at the ID server and then propagated down to the Conversion Server. The program would then flow back to the input of the decision block 6408 to again perform the matching operation, at which time it would proceed along the path to the destination.

Figure 65:
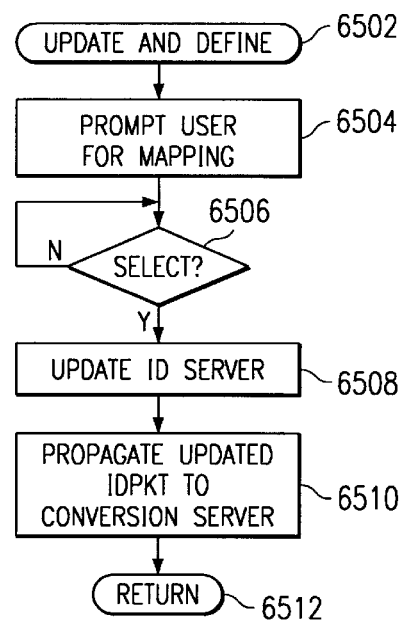
FIG. 65 illustrates a flow chart depicting the update operation and the consolidation operation.

Referring now to FIG. 65, there is illustrated a flow chart depicting the operation of the update and definition process, which is initiated at a block 6502 and then proceeds to a function block 6504. Function block 6402 represents a system wherein the user will be prompted to make a selection, this operation typically performed at the ID server. The user will typically be provided a large number of accounts from which to select, these being the accounts at the destination, i.e., the point to which they are consolidated. The user will make a selection to, for example, associate a courier service with postage expense. This may be performed by the user at the sub-company or it may be performed at a central area. In any event, this ID packet must be generated at the ID server associated with the system that is transferring data. It could be, however, that the ID packet was generated at a central ID server and then propagated down to the local ID server.

Once the user or system administrator has made a selection, as indicated by decision block 6506, the program will flow to a function block 6508 to update the ID server and the associated packet with this relational information. Once the ID packet has been updated, i.e., the same ID packet that existed before but with the additional relational links provided, the program will flow to a function block 6510 wherein this updated ID will be propagated down to the Conversion Server to replace the previous ID packet. The program will then flow to a return block 6512.

Router

Figure 66:
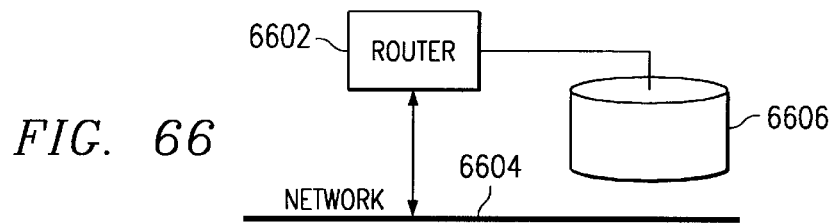
FIG. 66 illustrates a diagrammatic view of the router.

Referring now to FIG. 66, there is illustrated a diagrammatic view of illustrating a router 6602 that is interfaced with a local network 6604. The router 6602, as described hereinabove, is basically the traffic director for the entire transaction that occurs in the system. The router 6602 has associated therewith a database 6606, wherein the router 6602 is operable to store various Extents and data, including some logging information. The router 6602 is operable to receive a message from any node in the system at any point in the process wherein the router 6602 is to relay that message or information. The message and its associated data will come to the router 6602 with the particular Feed ID and channel information (Channel ID) as described hereinabove. The router will receive the information and process it in accordance with the particular program or transaction associated therewith (the transaction defined by a unique Transaction ID). This is determined from the Channel ID and Feed ID. With the Feed ID as described hereinabove, the router 6602 is aware of the position within the transaction at which the transaction is presently disposed. The router 6602, in accordance with the Extent associated therewith, can then make a decision as to the next node in the path to which the transaction is to be routed for processing and that transaction packet will then be transferred to the next node in the path, this possibly being a conversion server, a destination or some other node. When the data is received, it is stored locally or in the archive server somewhere on the network 6604, and then the data is transferred as will be described hereinbelow, the reason for this being to ensure that the transaction is complete. If for some reason, the router 6602 were not to receive an acknowledgment signal from the node to which the transaction packet were transferred indicating that the transaction were received and properly processed, the router 6602 could "replay" that portion of the transaction from the archived image in the archive server or from local archiving. The router also keeps track of the amount of time that should pass before an acknowledgment is received from the node to which the transaction packet was transmitted representing that the information was received. For example, if data were transferred to a conversion server for performing a conversion operation thereon and then transmission back to the router, the router would be aware of the amount of time that would be required for the conversion server to achieve such conversion. If a certain amount of time had passed without receiving the transaction packet back for further routing in accordance with the overall transaction, the router 6602 would then "poll" the conversion server to determine the status of the processing and then possibly replay the previous transmission or indicate a system failure if that were the case.

Figure 67:
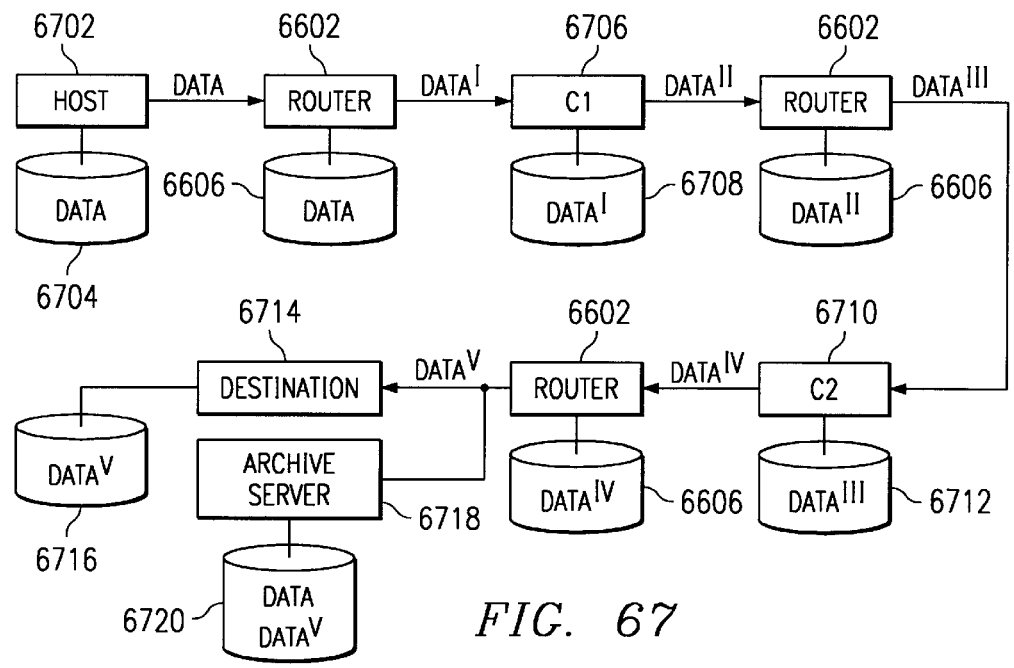
FIG. 67 illustrates a transaction process through the system with the data conversions illustrated.

Referring now to FIG. 67, there is illustrated a flow diagram for illustrating how a transaction packet is transferred through the system from the host or originating node to a destination node and how the data is stored during this operation. A host 6702 is illustrated having a database 6704 associated therewith. In the exemplary transaction, the data in the database 6704 is extracted and transferred to the router 6602 along the network 6604. The router 6602 and its database 6606 stores the data in the form that it was retrieved from database 6704. At this point, the data basically is relayed, but it might be different than the data originally received. This data is referred to as DATA'. This DATA' is transferred to a conversion server 6706 which is operable to convert the data to a new version as DATA". However, prior to converting the data, the data received from the router 6602 at this point in the transaction, DATA', is stored in a database 6708. If, for some reason, the data did not get transferred back to the router 6602 as would be the case in this transaction, then the conversion server 6706 could reconvert the data and again try to transfer it to the router 6602. Once the DATA" is received at router 6602, a copy of this data is stored in database 6606 and then the data either transferred out or modified slightly as DATA'". It is important to note that anytime a copy of data is stored by any of the nodes in the system, other than the original host node, this may typically be stored in the separate archive server.

Also, the data stored as DATA' and DATA", etc., comprises not only the data that is received, but the entire message associated therewith in the form of the transaction packet and the such. This will allow a replay from that exact point in the transaction.

The router 6602 is illustrated as transferring the DATA'" to a second conversion server 6710 which also has a database 6712 associated therewith, wherein the received DATA'" will be stored therein. The data is then converted to DATA$^{iv}$ which is then transferred back to the router 6602, but, wherein the DATA$^{iv}$ will be stored in database 6606. This is the end of the transaction and the next step will be to transfer the data to the destination node 6714. The data will be transferred as DATA$^{v}$, this being the final data. Again, the router 6602 may modify this data slightly or just relay the data. When the data is transferred to the destination server 6714, it is stored in the destination server 6714 database 6716 as the received data and then processed in accordance with the processes at the destination node 6714. In addition, the router 6602 will transfer the final data to an archive server 6718 which has a database 6720 associated therewith. In the database 6720, both the original data, DATA, and the final data, DATA$^{v}$ will be stored therein. As soon as any of the intermediate data is determined to have been accurately processed and transferred, the copy thereof will be erased from the link. However, prior to this last transfer, i.e., when the router 6602 has been apprised of the fact that the data has been effectively transferred to the destination at 6714, a copy of the data in each form along the entire transaction process will be stored in a database somewhere, such that it can be retrieved. It may be that all the data is stored in database 6720 associated with the archive server 6718 or stored in the database 6606. In any event, there is provided a pointer that allows the router 6602 access to the data at any point in the transaction and provides the ability to have a logging capability. As described hereinabove, each step of the transaction process is recorded such that a failure, if it occurs, will be determined by the value of the Feed ID, it being remembered that the Feed ID is incremented for each step in the transaction, and the state of the data thereat. Therefore, by examining all the data in the transaction process, as the data is processed through each step of the transaction, the position in the transaction that the failure occurred can be determined. However, once the transaction is complete, it is not necessary to maintain the intermediate copies of the data in the various process forms along the transaction path.

Figure 68:
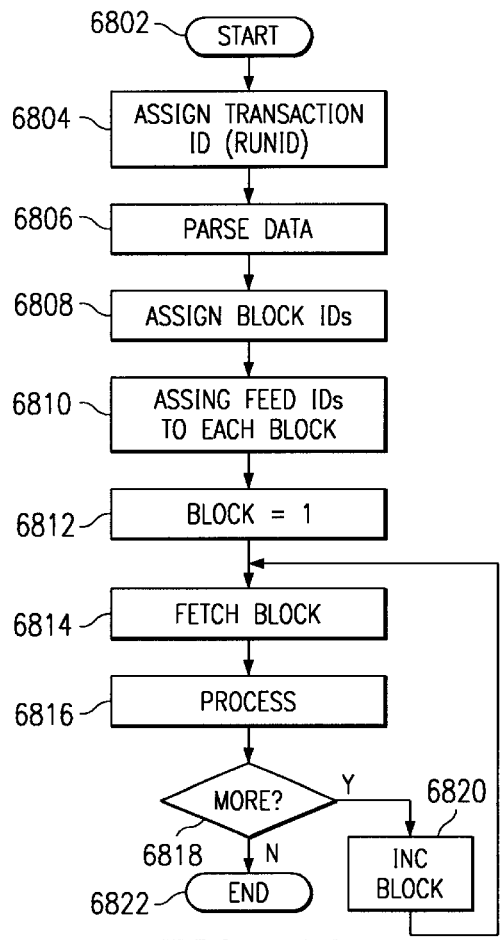
FIG. 68 illustrates a flow chart for the initiation of a transaction.

Referring now to FIG. 68, there is illustrated a flow chart depicting the operation of initiating a process. The process is initiated at a block 6802 and then proceeds to a block 6804 wherein transaction IDs are assigned to a particular transaction, this being the "Run ID." The program then proceeds to the function block 6806 wherein the data is parsed. As described hereinabove, data is typically parsed into blocks into data to divide the data up for processing purposes. Otherwise, once a transaction is initiated, the entire system must be dedicated to processing the all data associated with that transaction. By parsing the data into blocks, the transaction can be divided up into smaller, more manageable transactions. The program then proceeds to function block 6808 to assign block IDs to each block, it being remembered that each block will be associated with the particular Run ID of the transaction. The program then flows to a function block 6810 to assign Feed IDs and Channel IDs to each block and to function block 6812 to associate the first block to the value of "1." The program then flows to a function block 6814 to fetch that particular block and then to a function block 6816 to process the fetched block of data in accordance with the particular Extent that is being operated. The program then flows to a decision block 6818 to determine if more blocks are required, i.e., have the maximum number of blocks been retrieved? If not, the program will flow through the function block 6820 to increment the block value and then to the input of function block 6814. When all blocks have been fetched and processed, the program will flow to an End block 6822.

In the flow chart of FIG. 68, when the Feed IDs are assigned to each block, the Extent associated therewith can determine that different routers' can be used for different blocks, i.e., the actual transaction can be divided up into different paths with different Channel IDs in the network. This, of course, assumes that there are multiple routers available and the Extent will have a router list defining the available routers. Any of the routers can be utilized depending upon their availability and the underlying program associated with the Extent. There may even be a priority associated with routers in the router table. This in effect allows the channel IDs to be conditional and flexible. This will in effect allow a particular Extent to have access to multiple channel Ids, the primary connector being a common RUN ID. When a node such as a router receives the message, it can determine from the channel ID where the next node in the path is.

Figure 69:
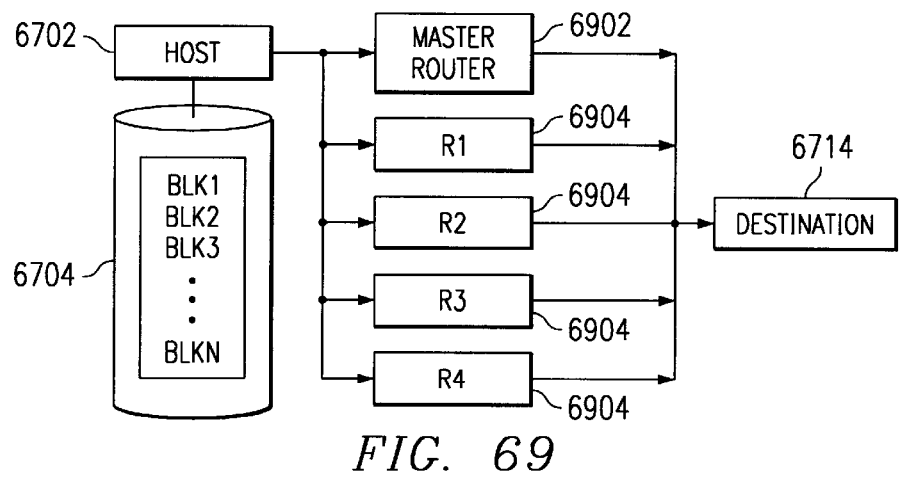
FIG. 69 illustrates a diagrammatic view of multiple routers used in a transaction.

Referring now to FIG. 69, there is illustrated a diagrammatic view of the multiple processing paths through the network. The host 6702 is operable to extract the various blocks from the database 6704 and then process them through multiple routers. There is provided, in one embodiment, a master router 6902 that monitors the operation of a plurality of other routers 6904 on the system that are available to the host 6702 and its associated Extent. The host 6702 could divide the blocks equally among all of the routers. When each of the routers receives information, it will apprise the master router 6902 of the process that is being run thereon and, when the individual router 6904 or the master router 6902 transfers the data finally to the destination of 6714, then each of the routers will apprise the master router 6902 of the completion of the task. The master router 6902 may, in one embodiment, keep track of copies of the data transferred thereto. This data is either stored on the local databases of each of the routers 6904 or the router 6902, or on the archive server 6718. In any event, there is provided a single traffic manager for the transaction in this embodiment.

Figure 70:
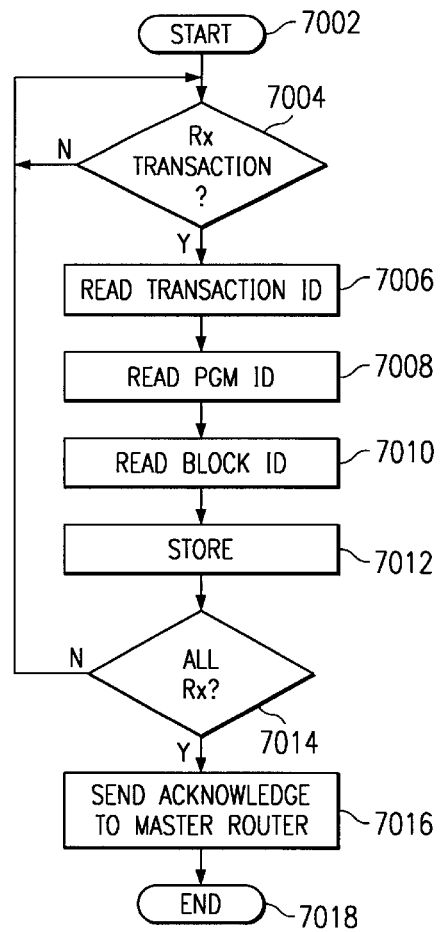
FIG. 70 illustrates a flow chart depicting the operation of reading the data and assembling it into a transaction packet.

Referring now to FIG. 70, there is illustrated a flow chart depicting the operation of the destination node 6714 receiving the data, which is initiated in block 7002 and then proceeds to a decision block 7004 to determine if a transaction message has been received. If so, the program will flow along a "Y" path 7006 to read the transaction ID on the transaction and then to a function block 7008 to read the program ID which is also associated with each transaction that it is transmitting. The reason for this is to ensure that each block that is received from whatever router 6904 is associated with the particular transaction. The block ID is then read as indicated by function block 7010 and then this block of data is stored as indicated by function block 7012. When all blocks have been received as indicated by decision block 7014, then they can be assembled, it being noted that they could actually be received out of sequence. However, with the block IDs, they can be sequenced by the destination 6714 and the Extent running thereon. Once all blocks have been received, the program flows to a function block 7016 to send an acknowledgment back to the master router 6902. Alternatively, each router could apprise the master router 6902 of the completed transfer. The program then flows to an End block 7018.

Figure 71:
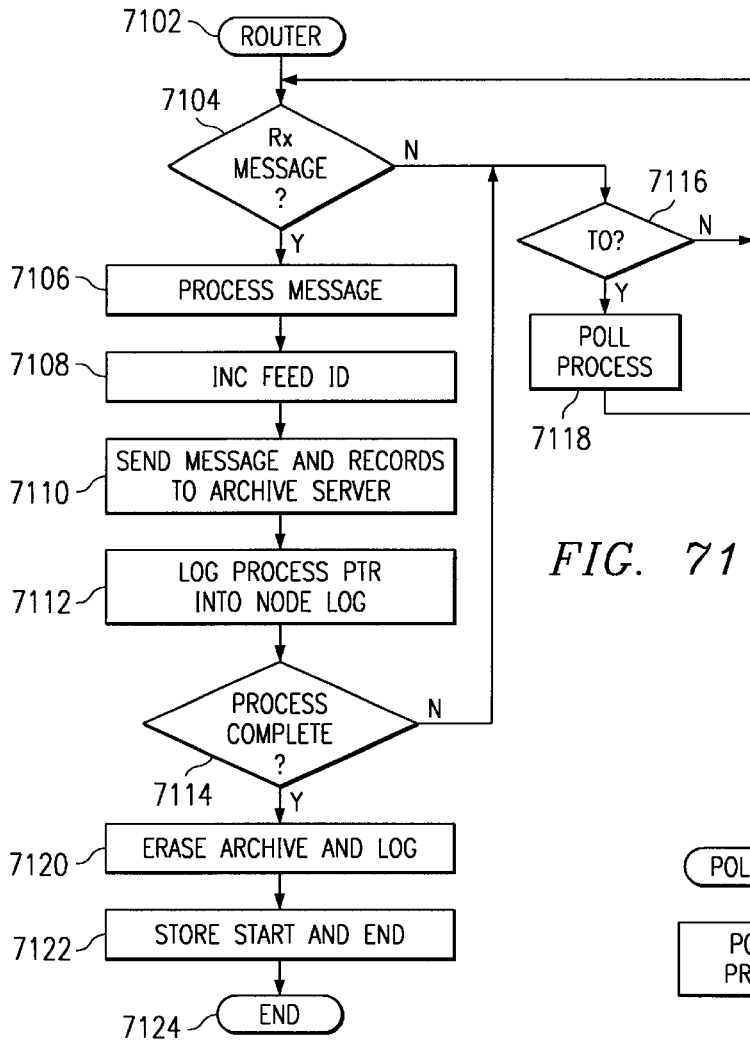
FIG. 71 illustrates a flow chart for the operation of the router.

Referring now to FIG. 71, there is illustrated a flow chart depicting the operation of the router. The program is initiated at a block 7102 and then proceeds to a decision block 7104 to determine if a message has been received, wherein the program will flow along a "Y" path to a function block 7106 to process the message and then to a function block 7108 to increment the Feed ID and then to a function block 7110 to send the message and records to the archive server or store locally. This is a copy of the message that was received and the data associated therewith. This is for the purpose of logging the data at this point in the transaction, as described hereinabove. A process pointer is then created which is logged into a node log, that node log associated with that particular router, this indicated by function block 7112. This information could also be logged into a master log on the master router 6902. The program then flows to a decision block 7114 to determine if the process is complete. If not, the program will flow to a decision block 7116 along the "N" path to determine if a "time out" condition has occurred. If there has not been a sufficient amount of time that has passed since the information was transmitted to another node for processing, the program will flow along the "N" path back to the input of decision block 7104. Decision block 7104 will, if no message has been received, proceed along the "N" path back to the input of the time out block 7116. This will continue in this loop until a time out situation has occurred or another message has been received and processed. If the time out condition for a particular process has occurred, the program will then flow along a "Y" path to poll the particular process in the other node as indicated by function block 7118 and then proceed back to the input of decision block 7104.

Once the process has been complete, the program will flow from the decision block 7114 to the function block 7116. This completion of the process means that all steps in the process have been complete, i.e., the entire transaction has been complete and information has been transferred to the destination node. Once this occurs, the individual records for each step in the transaction can be erased from the archive server (on the local node) indicated by the function block 7120 and then the program flows to a function block 7122 wherein the start and the end records will be stored as described hereinabove, and then the program flows to an End block 7124. The start records provide a means for the entire transaction to be restarted.

Figure 72:
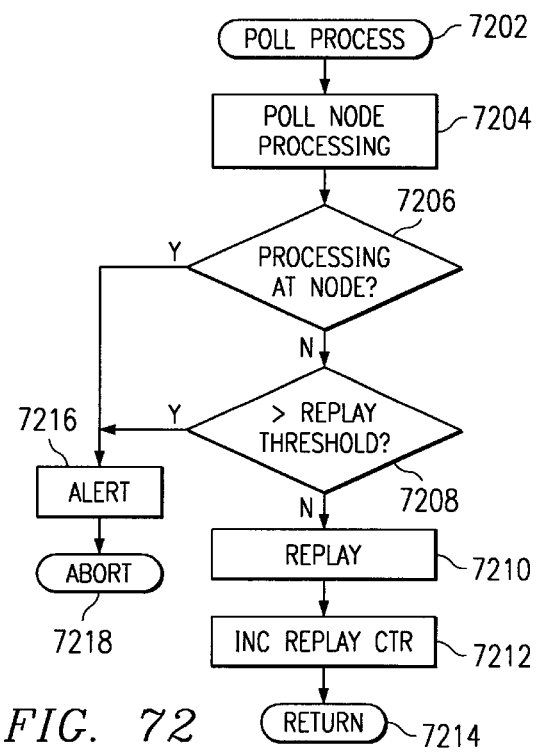
FIG. 72 illustrates a flow chart for the polling process.

Referring now to FIG. 72, there is illustrated a flow chart depicting the polling process which is initiated at a block 7202 and then proceeds to a function block 7204 wherein the particular node that is currently processing the transaction will be polled. This is an operation wherein the router will send a request to the particular node to determine the status of the transaction. The program will flow to a decision block 7206 to determine if the node that is polled is currently processing data. If not, the program will flow along a "N" path to first determine if the maximum number of replays has occurred at a decision block 7208 and, if not, the program will flow to a function block 7210 along the "N" path to replay the image of the data at the previous point in the transaction. The program will then flow to a function block 7212 wherein the replay counter will be incremented and then flow to a Return block 7214. If, however, the decision block 7206 had determined that the processing had stalled or that it was not processing at all, then the program would flow along a "Y" path to a function block 7216 to send an alert and then to a block 7218 to abort the operation.

Load Monitor

Figure 73:
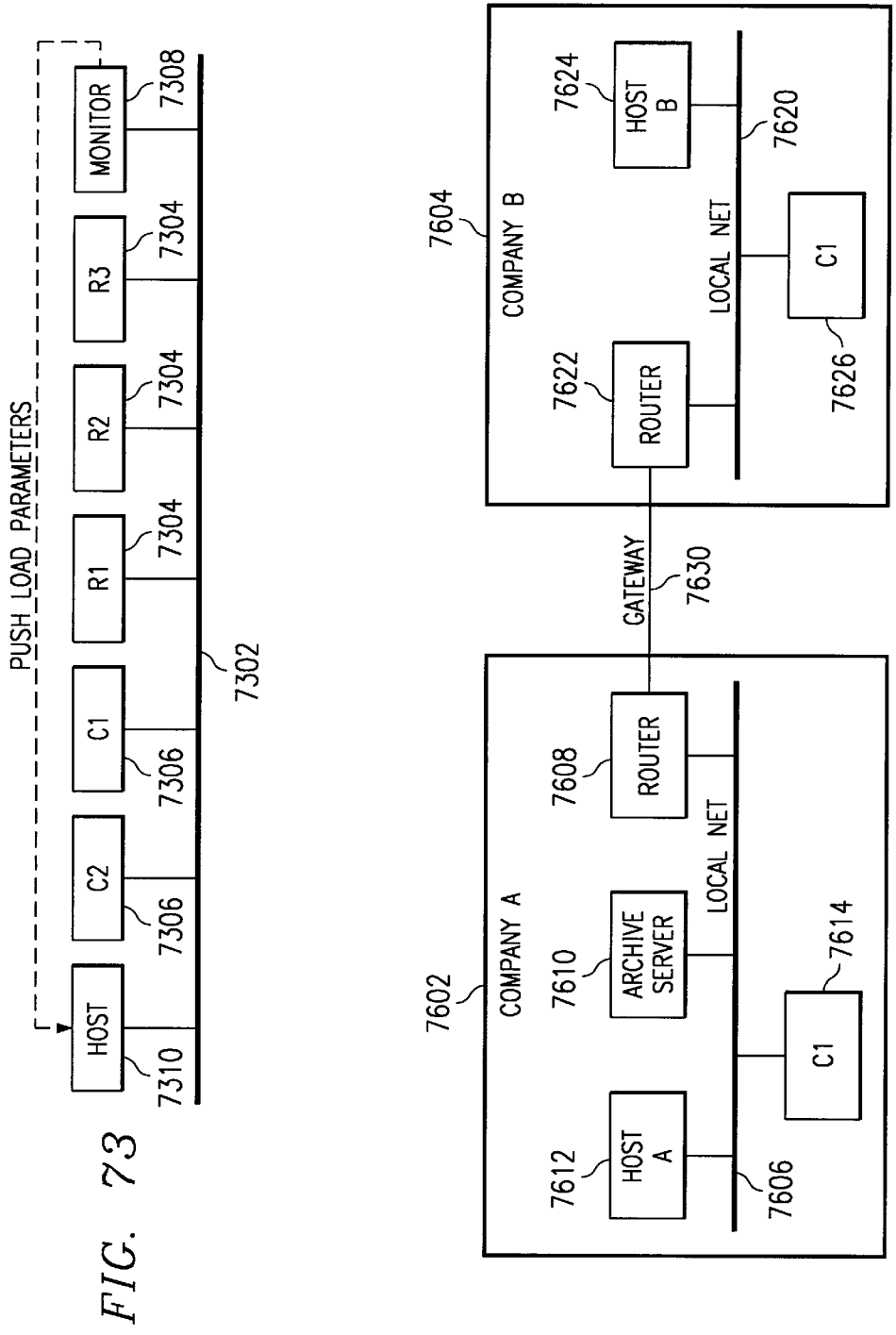
FIG. 73 illustrates a diagrammatic view of the monitoring operations.

Referring now to FIG. 73, there is illustrated a diagrammatic view of local network 7302 wherein a plurality of routers 7304 are provided and a plurality of conversion servers 7306 are provided. There is provided a monitor block 7308 that is operable to monitor the load on each of the nodes that can be accessed for any given transaction over the network 7302 which is typically originated at the host 7310. The load monitor 7308 is a load monitor. It determines the transaction load on each of the nodes and then "pushes" this information to the host to apprize the host of which nodes, such as routers, are available for transactions. This is such that, although they may not actually be totally loaded down at the present moment but, due to the fact that the router has knowledge of the amount of data that is coming to it from another node in a particular transaction, the router can determine that its future load will be too great to handle other transactions. The load monitor 7308 will be apprized of the load for each of the subject nodes that report load, such as the routers, and then the load monitor will inform the transaction originating node, such as the host 7310, that any particular node in the path is not available for a particular transaction.

Figure 74:
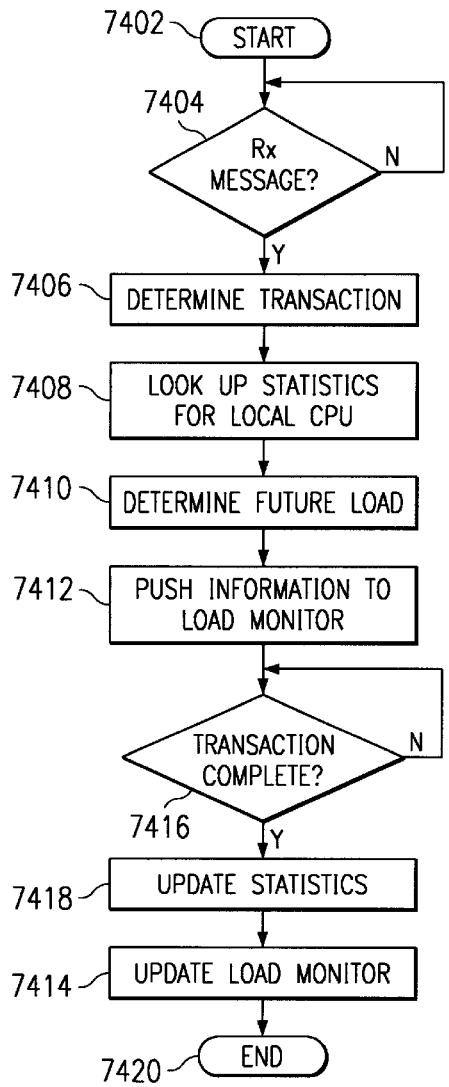
FIG. 74 illustrates a flow chart for determining transaction load at a node.

Referring now to FIG. 74, there is illustrated a flow chart depicting the determination of the transaction load on a particular node, such as the router, which is initiated at a block 7402 and then proceeds to a decision block 7404 to determine if the message has been received. If so, the program will flow to a function block 7406 to determine the transaction that is being run. Typically, a particular router or node will have run the particular transaction in a prior operation and it will have knowledge of the amount of CPU time that is required to be dedicated to a particular transaction, memory, disk space, communication load or any other resources necessary to efficiently complete the transaction. For example, if a number of blocks of data were to be transferred to any particular transaction, the particular router, for example, would have knowledge of how much CPU time will be required in the immediate future. This will determine how many other transactions it can actually service. It is noted that the actual message that it receives initially will not necessarily require a lot of CPU time to handle this transaction. However, it could be that a router could receive multiple messages from different nodes or from the same node indicating multiple transactions that are to be routed through the router along different channel Ids and for different RUN IDs. It could also be that the router is awaiting large amounts of data to be transmitted thereto from a conversion server in a particular transaction and, therefore, the router may want to reserve its processing time to handle this particular transaction. This is facilitated by examining statistics for a particular transaction that are stored in association with the local CPU of that particular node as indicated by function block 7408. These are examined in response to receiving a message in the form of the transaction packet that provides all information to the router as to the type of transaction that is associated with that transaction. Note that the originating node does not request of the router if it can handle the load or even provide specific information as to the transaction being handled. It is the transaction type and the locally running Extent that identifies the transaction to the router.

Once received, a determination is made as to the immediate future load needs for that particular router or node as indicated by function block 7410. Once the load is determined, i.e., in the percent of future CPU time or resources that are required for a particular transaction, this load information is pushed to the load monitor 7308 as indicated by a function block 7412. The program then proceeds to a decision block 7416 to determine if the transaction is complete, i.e., all of the necessary transactions have been processed from the various conversion servers, etc., along the transaction path. Once this is complete, the statistics will be updated, as indicated by a function block 7418, to take the average of the statistics for the given transaction over multiple transactions. When the transaction is initially set up in the system, there will be some average time attributed to that transaction as an initialization of the system. This will then be updated for a particular node, since there could be faster CPU's or slower CPU's involved in various nodes. Once the statistics have been updated locally, then the load monitor 7308 is apprized of the fact that the transaction is complete and the load has actually decreased on the particular node, as indicated by function block 7414. The program then proceeds to an End block 7420.

Figure 75:
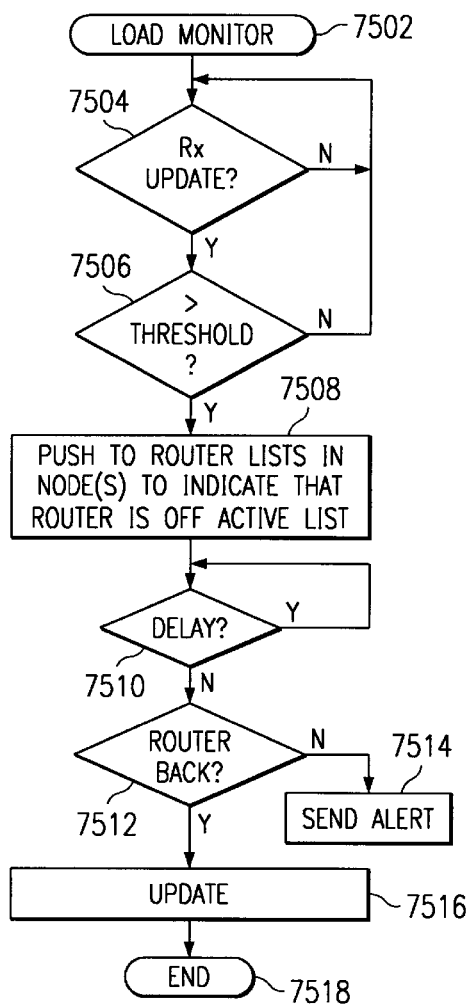
FIG. 75 illustrates the load monitor operations.

Referring now to FIG. 75, there is illustrated a flow chart depicting the operation of the load monitor 7308. This is initiated at a block 7502 and then proceeds to a decision block 7504 to determine if an update has been received thereby, this being a "push" operation. Once an update is received, the program proceeds from the decision block 7504 along a "Y" path to a decision block 7506 to determine if the received load on the node has exceeded the threshold for that node. If not, the program will flow back to the input of the decision block 7504 along the "N" path. Whenever it does exceed the threshold, this indicates that this particular node should be taken offline as to other nodes in the system that wish to use this particular node along the channel ID path. It should be understood that this threshold can be "transaction based." That is, in certain transactions a large amount of CPU time is required for the router or the conversion server or other features on a given node. Some transactions, however, may use very little of the CPU time. Therefore, a node may inform the load monitor that its CPU time for a given transaction will be considerably tied up but that it can allocate a certain amount of its CPU time to short processes, and therefore, it will still service these other short processes. Therefore, whenever the load update is received, this load update can indicate the particular transaction that it is handling and that load with respect to that transaction is very high and the load monitor 7308 can then determine if this particular load for that transaction exceeds the thresholds for that transaction.

Once it has been determined that the threshold has been exceeded, the program will flow along the "Y" path from decision block 7506 to a function block 7508 to "push" this load information to the router list in the nodes, such as that of the host 7310. These router lists are contained within the Extent that is utilized for a particular transaction. The load monitor 7308 is aware of the locations of each of these Extents that require updating on the router list. This push operation indicates to these particular nodes that the router is not part of the active list anymore. It may even be that a main router list is maintained at a central location and the Extents are operable to check these router lists. The program then proceeds to a decision block 7510 to insert a predetermined amount of delay in the decision making process and then to a decision block 7512 to determine if information has been received back from the router as to a "release" of the router status for the transaction. The load monitor 7502 has knowledge of how long a particular router should be occupied by a given transaction. If the delay is exceeded, i.e., the router has not come back online, this might indicate a stalled router. If information has not been received within a certain amount of time, as indicated by the delay block 7510, then an alert will be sent, as indicated by a function block 7514. Also, the load monitor may have the capability to actually poll the router to determine if it is still functional. This is a situation wherein a service technician will be apprised of a potential fault in the system. However, if the router does come back online within the appropriate amount of time, then the decision block 7512 will flow along the "Y" path thereof to a function block 7516 wherein the router list will there again be updated by pushing information out to the nodes. The program will then flow to an End block 7518.

It should be noted that this load monitor operation is one that determines loading of the system and availability of resources based upon the future load that will be placed upon a particular node, which decision is made by the node itself and, in effect allows the load to the system to be balanced over the system as a whole. The reason that this can occur is that each of the nodes has knowledge of the transaction that is going to be performed, i.e., it knows how much data will be transferred thereto, how much time will be involved and subsequent transactions such as receiving information back from a conversion server, etc. It may be that, at the time the particular transaction is initiated, that the actual CPU time involved in the initial handling of the message is very small. It is the knowledge of the transaction that is going to be processed that allows a particular CPU to indicate a heavy future load due to expected data and transaction information or traffic that will occur. This is only possible since the transaction being performed is known at a particular node.

Referring now to FIG. 76, there is illustrated a diagrammatic view of a transaction that occurs between two companies, a company 7602 referred to as company "A" and a company 7604 referred to as company "B". Company A has a local network 7606, a router 7608, an archive server 7610, a host node 7612 and a conversion server 7614. Similarly, Company B has a local network 7620, a router 7622, a host node 7624 and a conversion server 7626, all these by way of example, it being understood that many other nodes as described hereinabove could be implemented, for example, an archive server at Company B.

When a transaction occurs wherein host 7612 at Company A desires to transfer to host 7624 at Company B as a destination certain information, all of the necessary conversions in the company will be carried out in a given transaction, which transaction results in information being transferred from router 7608 at Company A along a gateway at 7630 to the router 7622 for Company B. Router 7608 is the traffic manager for Company A, whereas router 7622 is the traffic manager for information at Company B. Therefore, router 7608 will store all transactional information regarding each step of the transaction, copy the data, etc., in the archive server 7610. However, if there is a problem with the gateway 7630 or with the operation of the router 7622, the router 7608 will carry out the transaction all the way up to the completion thereof which is ready for transfer to the router 7622. If the transfer of that information fails, the router 7608 views this as a completed transaction from the standpoint of processing, and will store the beginning and end information on the archive server 7610 and then provide an alert to Company B. When the router at Company B comes back online and it is only necessary for the router 7622 then to "pull" the information from the archive server 7610. The router 7622 has knowledge that a transaction was initiated, but never completed and, as such, it really needs to go back to the last point in the transaction at Company A to pull the information therefrom.

Figure 77:
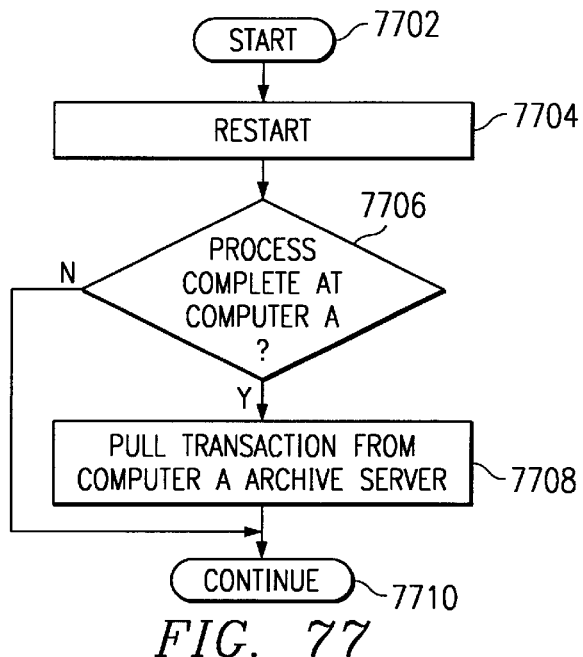
FIG. 77 illustrates a flow chart for the "pull" operation from the archive server.

Referring now to FIG. 77, there is illustrated a flow chart depicting the operation of pulling information from one company to another over the gateway. This is initiated at a block 7702 and then proceeds to a function block 7704 wherein a restart operation occurs, wherein the failed component at Company B comes back online, or is available for processing. It may be that the router 7622 was just busy with another transaction and caused the router 7608 to terminate the transfer until requested by router 7622. When the restart operation is complete, the program will flow to a decision block 7706 to determine if the process was complete at Company A. If so, the program will flow along the "Y" path to function block 7708 to pull the transaction from the archive server 7610 at Company A and then to a block 7710 to continue. If the process were not complete, then the program would have flown around block 7708 to the block 7710 to await completion of the transaction at Company A and subsequent transfer thereof to Company B.

Figure 78:
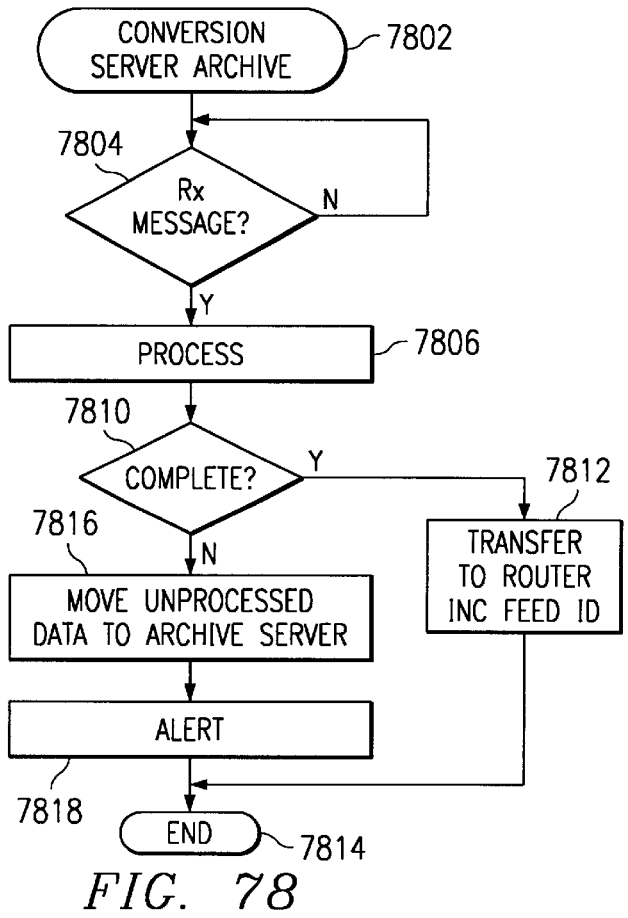
FIG. 78 illustrates a flow chart for the operation of the conversion server as it interfaces with the archive server.

Referring now to FIG. 78, there is illustrated a flow chart depicting the operation at a conversion server wherein a conversion server fails, initiated out of block 7802. The program then flows to decision block 7804 to await the receipt of a message and then to function block 7806 to process the data in accordance with the Extent and the functionality of the conversion server for that particular transaction. The program then proceeds to a decision block 7810 to determine if the operation at the conversion server has been completed. If so, the program will flow along the "Y" path to a function block 7812 to transfer the completed and converted information to the router and then the Feed ID will be incremented in the transaction path as described hereinabove. The program will then flow to an End block 7814.

However, if the operation is not complete, then the operation will flow from the decision block 7810 along the "N" path to a function block 7816 to move the unprocessed data to the archive server. This is the data that was originally received by the conversion server, i.e., this is an image of the data at that point in the transaction. Once this is moved to the archive server then an alert is sent to a technician, as indicated by a function block 7818 or this alert can be sent back to the router. It could be that the router can make a decision to forward this to another conversion server as a conditional branch, i.e., substitute another conversion server in the channel ID for that particular transaction.

In operation of the conversion server or of any processing node in the system, there are provisions for the processing node to stop processing. The termination of processing could be the result of a failure at the node in the processing operation thereof, and instruction from a router or some type of master process director to pause the processing operation or an approval step. Each of these will be described hereinbelow.

If, during the processing, there is a failure in the processing, this could result in the processing node being at a condition wherein the processing capability, i.e., the resources, of the node are occupied by this terminated process. In this event, all of the information associated with that process, including the data, the state thereof and any log information associated with the process will be transferred to an external archive server. This will clear up the memory and storage resources on the processing node and also clear up the processing capability thereof to allow this processing node to be utilized for other processing. Thereafter, an alert will be sent out to a technician or the such that the processing has failed and that a pointer will be provided indicating to the technician or such where the data is stored, such that a technician can then examine this data and continue the processing if necessary with the same node or with another node. There could even be an instruction provided to the router to replay the transmission to the conversion server or instruct the conversion server to replay the process from the starting point again after some modification was made to the Extent (if necessary) that runs the processing program.

In a pause condition, an external command can be generated and forwarded to the processing node such as the conversion server to pause the operation thereof. This may be facilitated for the purpose of passing through another process that has a higher priority or making some decision as to termination of the process. This is similar to that associated with the print manager on a computer where any number of print jobs have been queued. It is possible to actually, in the middle of printing, to pause a print job. This takes the print job out of the queue and allows other print jobs to process in the queue. Alternatively, the entire printer operation can be paused also. In the pause feature in the present disclosure with respect to the processing node, once it is paused, then the information and data associated therewith is moved from the processing node to a remote device until some action is taken, such as restarting the process.

In the approval method, a process is run on the processing node that requires an approval prior to allowing the process to continue. It may be that certain transactions have been generated and completed at the processing node such as the conversion server that are ready to be transferred to another node to continue the processing thereof. Once the processing is complete at that node, a request for approval is sent out to a technician or the such. If the technician then will take whatever action is necessary and send the appropriate approval, upon receiving the approval, the processing will continue. However, if the approval is not received in a certain amount of time, then the information at that processing state is transferred to an external node such as the archive server until the request for approval is received. Once the request for approval is received, then that processing node can access the information back and continue processing at the node from the last point in the processing operation. The reason for this is to clear up the resources on that processing node. Alternatively, it could be that, as soon as the processing is complete, the information is transferred to the archive server and the request for approval sent out.

Although the preferred embodiment has been described in detail, it should be understood that various changes, substitutions and alterations can be made therein without departing from the spirit and scope of the invention as defined by the appended claims.

What is claimed is:

1. A method for load balancing a distributed processing system having a plurality of processing nodes associated therewith, comprising the steps of:
   receiving a portion of a process at one of the processing nodes for processing of that portion thereat;
   determining the amount of processing that will be required to complete the received portion of the process as a processing load on that one processing node based on the transaction being processed;

wherein the process is a portion of a larger process that is comprised of a plurality of discrete processes, wherein the one of the nodes is operable to operate on a plurality of processes and the step of determining is operable to determine the amount of time that is required for the entire process to be completed;

determining if the amount of processing exceeds a predetermined threshold; and if the amount of processing exceeds the predetermined threshold, then transferring information to other nodes in the network that the one of the processing nodes is unavailable for further processing.

2. The method of claim 1, wherein the processing at the one of the nodes comprises a process that requires a stream of data to be received from another one of the nodes in the system.

3. The method of claim 2, wherein the another one of the nodes is the one originating the process that is sent to the one of the nodes.

4. The method of claim 1, wherein the step of determining if the amount of processing exceeds the predetermined threshold is facilitated at another load monitoring node on the network remote from the one node and the step of determining the amount of processing is operable to push this information to the load monitoring node and the load monitoring node is operable to transfer information to other nodes in the network that the one of the processing nodes is unavailable for further processing.

5. The method of claim 4, wherein the one processing node is operable notify the load monitoring node of any change in the processing load thereon and, when the step of determining if the processing load is above the predetermined threshold determines that it is below the predetermined threshold, then transferring information to other nodes in the network that the one of the processing nodes is available for further processing.

6. The method of claim 4, wherein the load monitor node is operable to compare the amount of time that the one processing node is at a processing load that is above the predetermined threshold level to a predetermined expected level and, if it exceeds this time, taking a predetermined action.

7. The method of claim 6, wherein the predetermined action is to send a request for status to the one processing node.

8. A method for load balancing a distributed processing system having a plurality of processing nodes associated therewith, comprising the steps of:

originating a transaction at an originating one of the processing nodes, which transaction is comprised of a plurality of discrete processes that are to be carried out a plurality of the processing nodes on the network and in a predetermined order along a transaction path, and associating a predetermined transaction ID with the transaction that defines the transaction and the associated path uniquely on the network;

transferring a message from each of the processing nodes in the transaction path to the next of the processing nodes in the transaction path after processing the portion of the transaction associated therewith;

at least one of the processing nodes, in response to receiving the transferred message, determining the amount of processing that will be required to complete the portion of the transaction associated therewith as a processing load on that one processing node;

determining if the amount of processing exceeds a predetermined threshold; and if the amount of processing exceeds the predetermined threshold, then transferring information to at least one other of the nodes in the network other than the at least one of the processing nodes that the at least one of the processing nodes is unavailable for further processing.

9. The method of claim 8, wherein the processing at the one of the nodes comprises a process that requires a stream of data to be received from another one of the nodes in the system.

10. The method of claim 9, wherein the at least one other of the nodes is the originating one of the processing nodes.

11. The method of claim 8, wherein the step of determining is based upon the transaction being processed.

12. The method of claim 11, wherein the at least one of the nodes is operable to operate on a plurality of processes that comprise the transaction and the step of determining is operable to determine the amount of time that is required for the entire process to be completed.

13. The method of claim 8, wherein the step of determining if the amount of processing exceeds the predetermined threshold is facilitated at another load monitoring node on the network remote from the at least one node and the step of determining the amount of processing is operable to push this information to the load monitoring node and the load monitoring node is operable to transfer information to other nodes in the network that the at least one of the processing nodes is unavailable for further processing.

14. The method of claim 13, wherein the at least one processing node is operable notify the load monitoring node of any change in the processing load thereon and, when the step of determining if the processing load is above the predetermined threshold determines that it is below the predetermined threshold, then transferring information to other nodes in the network that the one of the processing nodes is available for further processing.

15. The method of claim 13, wherein the load monitor node is operable to compare the amount of time that the at least one processing node is at a processing load that is above the predetermined threshold level to a predetermined expected level and, if it exceeds this time, taking a predetermined action.

* * * * *